(12) United States Patent
Neil

(10) Patent No.: US 9,250,422 B2
(45) Date of Patent: Feb. 2, 2016

(54) ZOOM LENS WITH FORWARD-LOCATED APERTURE STOP

(71) Applicant: Iain A. Neil, Cummugny (CH)

(72) Inventor: Iain A. Neil, Cummugny (CH)

( * ) Notice: Subject to any disclaimer, the term of this patent is extended or adjusted under 35 U.S.C. 154(b) by 170 days.

(21) Appl. No.: 13/832,265

(22) Filed: Mar. 15, 2013

(65) Prior Publication Data

US 2013/0250160 A1 Sep. 26, 2013

Related U.S. Application Data

(60) Provisional application No. 61/615,286, filed on Mar. 25, 2012.

(51) Int. Cl.
*G02B 15/14* (2006.01)
*H04N 5/225* (2006.01)
*G02B 15/167* (2006.01)
*G02B 15/177* (2006.01)

(52) U.S. Cl.
CPC .............. *G02B 15/14* (2013.01); *G02B 15/167* (2013.01); *G02B 15/177* (2013.01); *H04N 5/2254* (2013.01)

(58) Field of Classification Search
CPC .... G02B 15/14; G02B 15/177; G02B 15/167; H04N 5/2254; H04N 5/225
USPC ................. 348/335, 337, 345, 240.99, 240.3; 359/686, 676, 781–783
See application file for complete search history.

(56) References Cited

U.S. PATENT DOCUMENTS

| 4,367,927 | A | * | 1/1983 | Fujii | 359/681 |
| 5,523,888 | A | * | 6/1996 | Nishio | 359/686 |
| 5,726,810 | A | * | 3/1998 | Meyers | 359/684 |
| 5,999,330 | A | * | 12/1999 | Goosey, Jr. | 359/689 |
| 6,088,169 | A | * | 7/2000 | Ohno | 359/682 |
| 6,154,322 | A | * | 11/2000 | Nakayama | 359/691 |
| 6,308,011 | B1 | * | 10/2001 | Wachi et al. | 396/72 |
| 6,934,092 | B1 | * | 8/2005 | Nakayama | 359/691 |
| 6,970,298 | B1 | * | 11/2005 | Itoh | 359/680 |
| 7,224,535 | B2 | | 5/2007 | Neil | |
| 7,227,682 | B2 | | 6/2007 | Caldwell et al. | |
| 7,436,449 | B2 | * | 10/2008 | Mihara | 348/362 |
| 7,855,838 | B2 | | 12/2010 | Jannard et al. | |
| 8,446,520 | B2 | * | 5/2013 | Iiyama et al. | 348/360 |
| 8,537,268 | B2 | * | 9/2013 | Iiyama et al. | 348/360 |
| 2002/0027721 | A1 | * | 3/2002 | Mihara | 359/686 |
| 2005/0063069 | A1 | * | 3/2005 | Nishimura | 359/680 |
| 2010/0259834 | A1 | * | 10/2010 | Li et al. | 359/686 |
| 2011/0304921 | A1 | * | 12/2011 | Nagahara | 359/680 |

(Continued)

OTHER PUBLICATIONS

Neil, I. A., "Zoom lenses for the thermal infrared", *SPIE* vol. 399, Geneva, Switzerland, 1983.

(Continued)

*Primary Examiner* — Aung S Moe
(74) *Attorney, Agent, or Firm* — Opticuz IP Law PLLC

(57) ABSTRACT

A zoom lens including, along an optical axis and in order from an object space to an image space: first lens group with negative power; an aperture stop; a second lens group with positive power; a third lens group with positive power; and a fourth lens group. The second and third lens groups and the aperture stop are axially movable for zooming. At least one lens element in the first lens group is moveable to provide for focusing. The aperture stop moves independently of the lens groups during zooming and has a clear aperture that changes size during zooming.

20 Claims, 46 Drawing Sheets

(56) References Cited

U.S. PATENT DOCUMENTS

2012/0268831 A1 10/2012 Yamanishi
2013/0094095 A1* 4/2013 Minefuji ............... 359/680

OTHER PUBLICATIONS

Neil, I. A., "General purpose zoom lenses for the thermal infrared", *SPIE* vol. 518, Cambridge, Ma. U.S.A., 1984.

Neil, I. A. and Turnbull, M.Y., "Zoom lens tolerances and design concepts", *SPIE* vol. 590, Cannes, France, 1985.

Neil, I. A., "An ultra high performance zoom lens for the visible waveband", *SPIE* vol. 1354, Monterey, CA. U.S.A., 1990.

Neil, I. A., "Ultra high performance long focal length close focusing zoom lens for the visible waveband", *SPIE* vol. 1780, Berlin, Germany, 1992.

Neil, I. A and Kreitzer, M., "Ultrahigh performance close focusing large ratio zoom lens for the visible waveband", *OSA* vol. 22, Rochester, N.Y., 1994.

Neil, I. A., "Ultra high performance long focal length lens system with macro focusing zoom optics and abnormal dispersion liquid elements for the visible waveband", *SPIE* vol. 2539, San Diego, Ca. U.S.A., 1995.

Neil, I. A., "First order principles of zoom optics explained via the macro focus conditions of fixed focal length lenses", SPIE vol. 2539, San Diego, Ca. U.S.A., 1995.

Neil, I. A., "Liquid optics create high performance zoom lens", *Laser Focus World*, vol. 31, No. 11, Nov. 1995.

Neil, I. A., "Optimization glitches in zoom lens design", *SPIE* vol. 3129, San Diego, CA, U.S.A., 1997.

Neil, I. A., and Betensky, E. I., High performance, wide angle, macro focus, zoom lens for 35mm cinematography, *SPIE* vol. 3482, Kona, Hawaii, U.S.A., 1998.

Neil, I. A., "Review of recent zoom lens developments for 35mm cinematography at Panavision", ODF 2000, Tokyo, Japan, 2000.

Neil, I. A., "Lenses in Cinematography", *OSA* vol. 15, No. 1, Jan. 2004.

Neil, I.A., "Compound zoom lenses", *SPIE* vol. 5865, San Diego, Ca, U.S.A., 2005.

Neil, I.A., "Optical design dependence on technology development", *SPIE* vol. 7428-01, San Diego, Ca. U.S.A., Aug. 2009.

Neil, I.A., "Optical design dependence on technology development", Opt. Eng. 50, 121706 (2011), pub. on line in the SPIE Digital Library (http://SPIEDigitalLibrary.ord/oe).

Neil, I. A., "High performance zoom lenses with a forward located stop", SPIE vol. 8488, San Diego, Ca. U.S.A., Aug. 12-16, 2012.

* cited by examiner

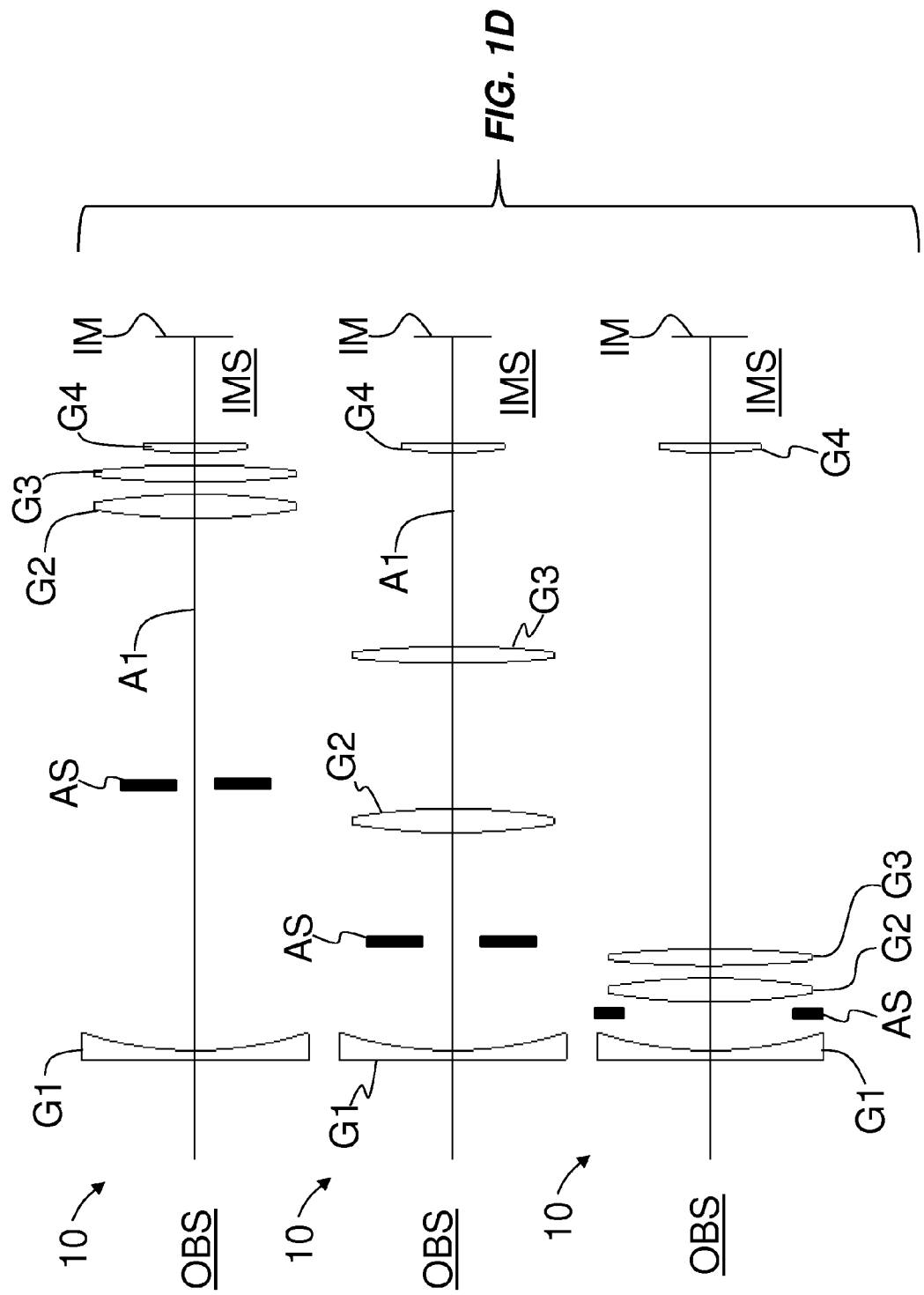

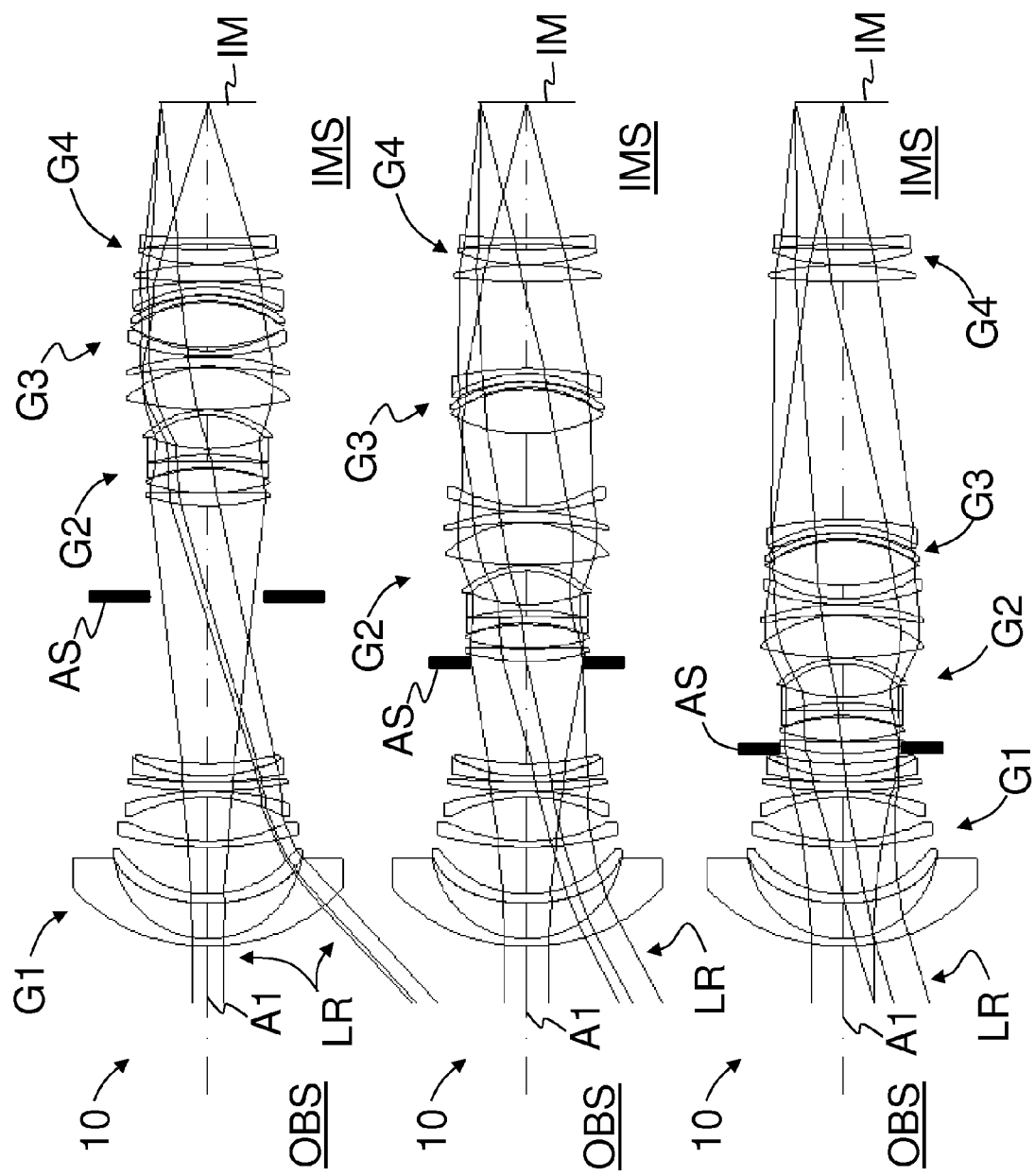

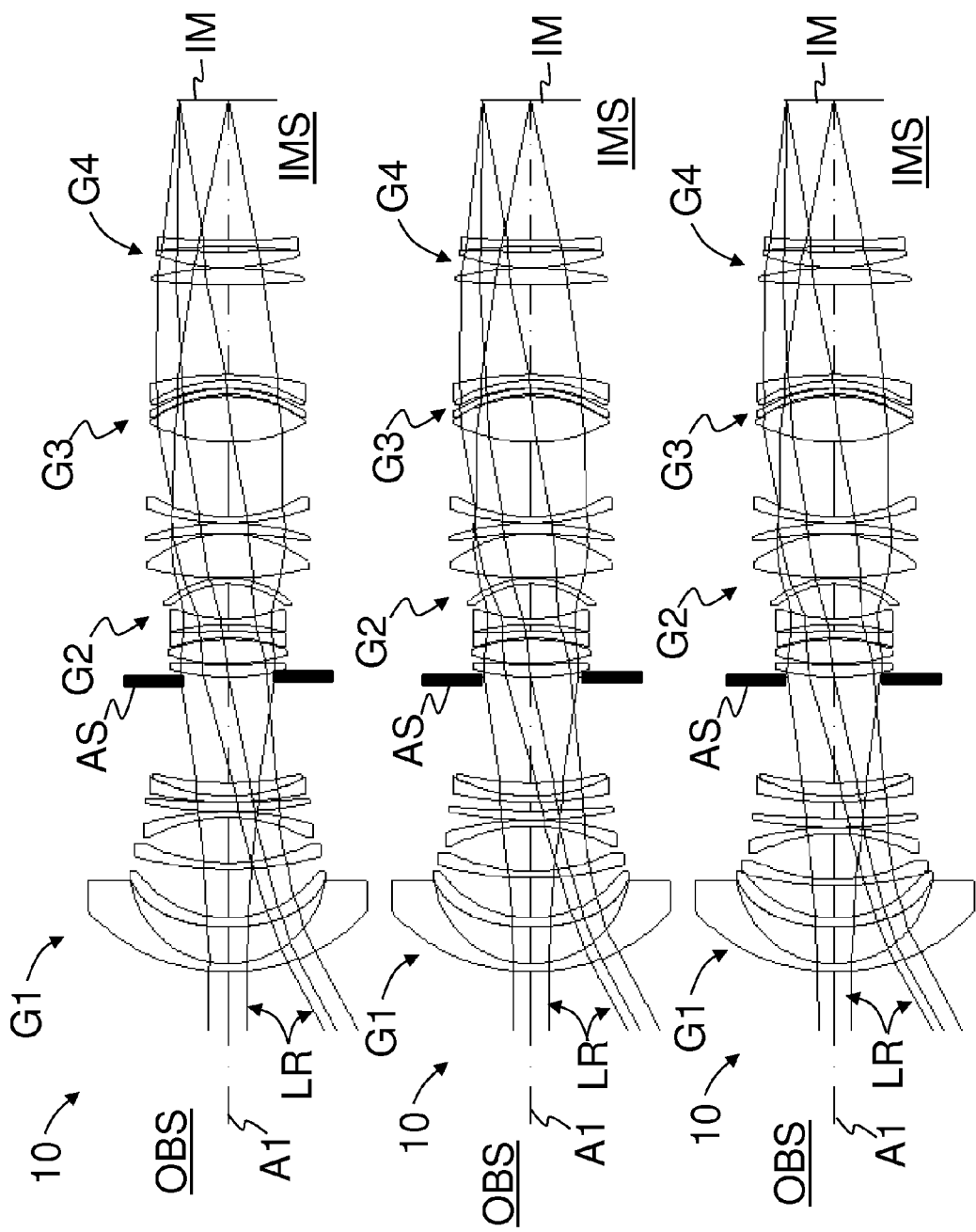

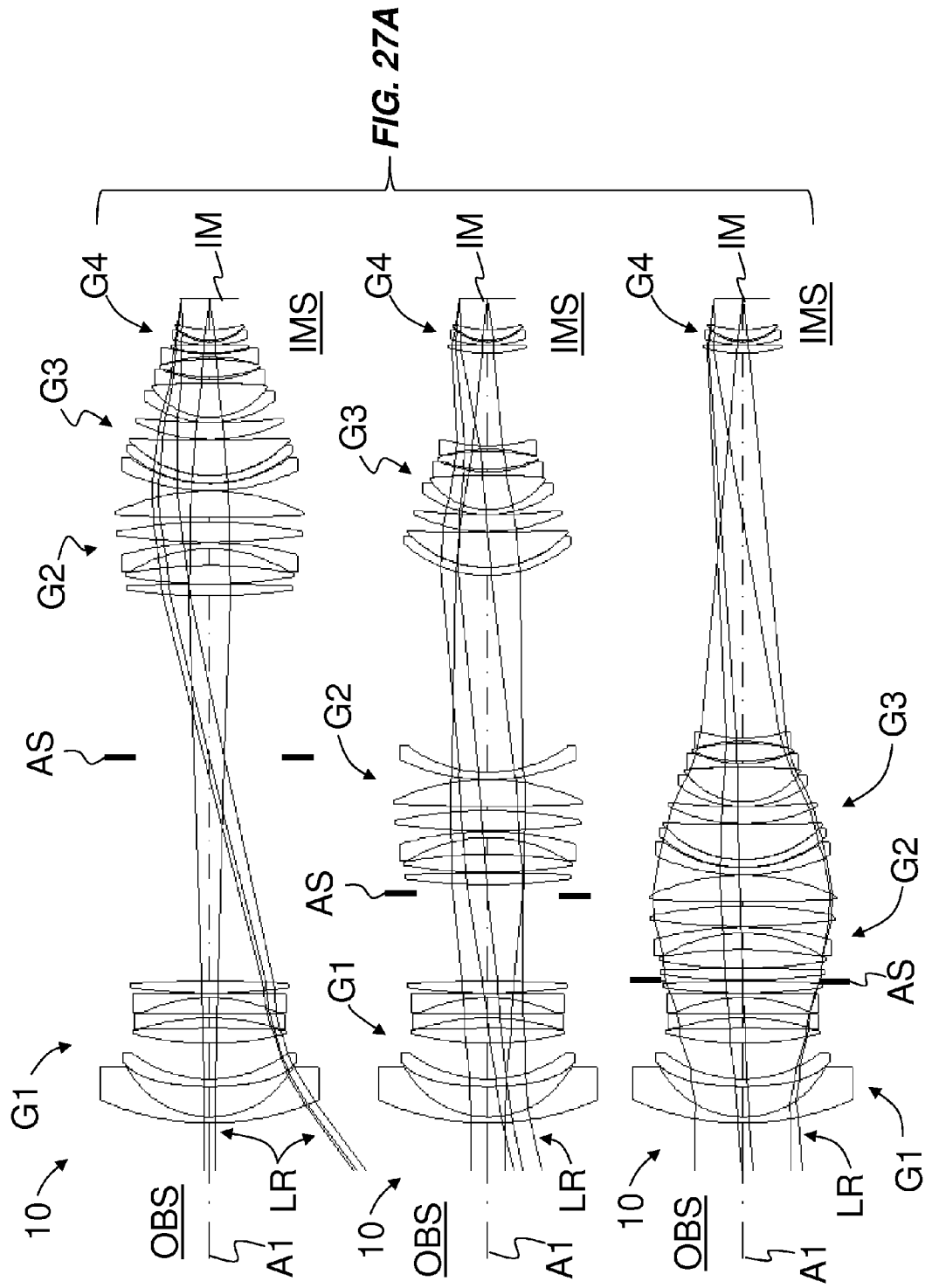

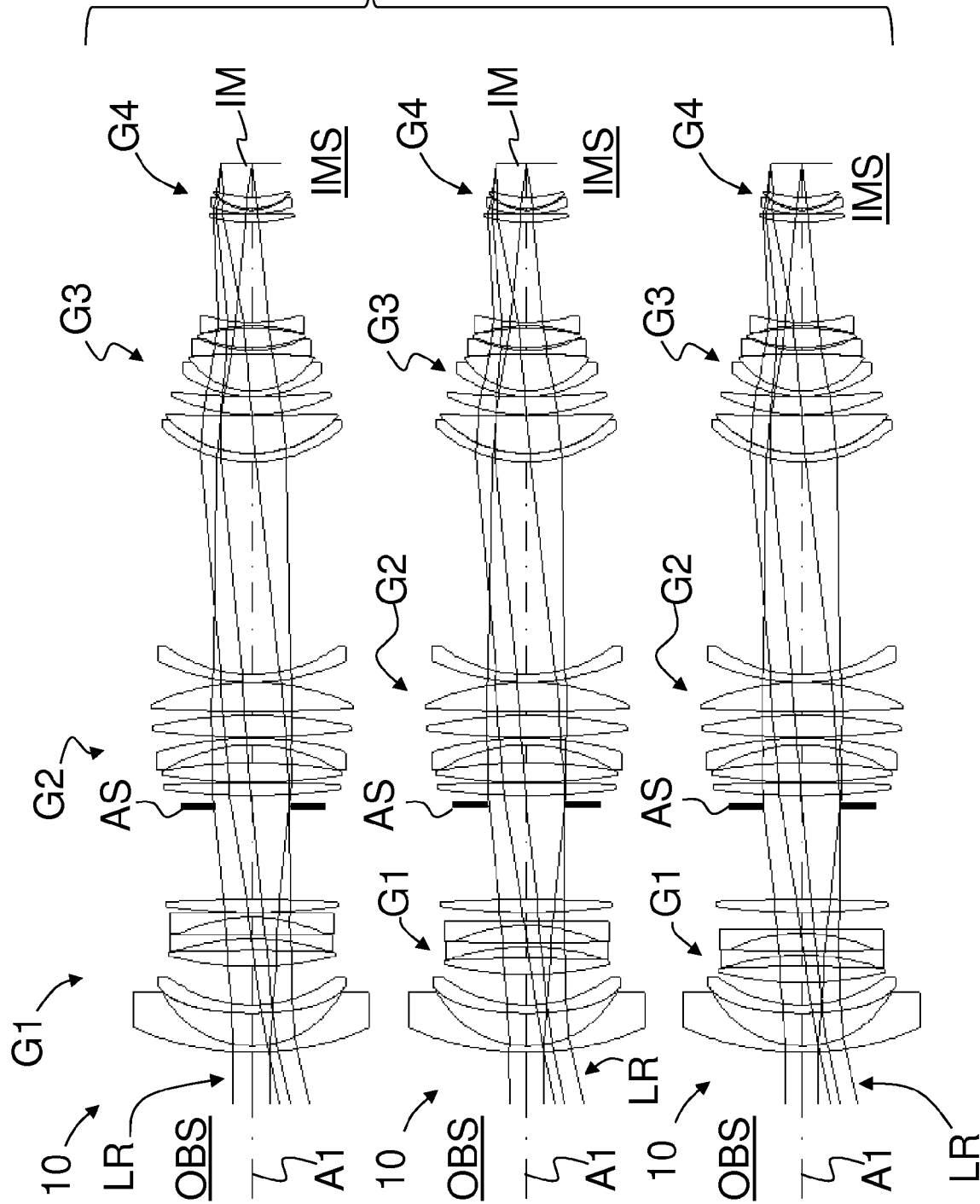

ZOOM LENS WITH FORWARD-LOCATED APERTURE STOP

CLAIM OF PRIORITY

This application claims the benefit of priority under 35 U.S.C. §119(e) of U.S. Provisional Application Ser. No. 61/615,286, filed on Mar. 25, 2012, and which is incorporated by reference herein.

FIELD

The disclosure relates to zoom lenses, and in particular to a family of zoom lenses having relatively compact front diameter optics and corresponding potential minimized weight and cost by having a forward-located aperture stop.

BACKGROUND ART

Contemporary zoom lens power configurations normally have an optical axis and are commonly based on a negative (−) and positive (+) combination of lens groups to provide zooming which are usually, but not always, preceded by a positive (+) lens group which provides focusing and following those lens groups a positive (+) lens group is employed to converge the radiation to a sensor in image space.

This arrangement of negative and positive optical powers in the zooming portion has a possible disadvantage of making the first positive lens group large in diameter, weight and cost especially where wide fields of view and focusing is required and in particular where focus breathing is controlled during focusing.

This arrangement may cause the first positive lens group to typically require the use of several lens elements, perhaps even up to 7 lens elements or more, which may contribute about 50% of the weight of the entire optical system and whose optical materials may contribute about 50% of the cost of all the optical materials employed in the entire optical system.

Thus, it is highly desirable to minimize the diameter, weight and corresponding cost of the first lens group of the optical system.

SUMMARY

An aspect of the disclosure is a zoom lens comprising along an optical axis and in order from an object space to an image space at least a first lens group with negative (−) power, an aperture stop, a second lens group having positive (+) power, a third lens group having positive (+) power and a fourth lens group. The second and third lens groups are positively powered zoom lens groups that enable the use of the negatively powered front (first) lens group. The front (first) lens group has a relatively small diameter, weight and cost in comparison to conventional zoom lenses that have up to a moderately large zoom ratio of less than ten times and that may incorporate a positively powered front lens group.

The negatively powered front (first) lens group may provide focusing by movement of at least one of the lens elements contained therein, and may exhibit low breathing in at least a portion of the zoom range. The fourth lens group is adjacent the image space and is used to match the optical characteristics of the zoom lens to an image sensor and in particular to deliver the radiation passing through the zoom lens and on to the image sensor with nearly telecentric light paths and suitably high relative illumination, thereby increasing the efficiency of many electronic sensors. The fourth lens group may have positive optical power.

Another aspect of the disclosure is a zoom lens that has along an optical axis and in order from an object space to an image space that includes an image plane: a first lens group having negative (−) power; an aperture stop; a second lens group having positive (+) power; a third lens group having positive (+) power; and a fourth lens group. The second and third lens groups and the aperture stop are axially movable for zooming.

Another aspect of the disclosure is the zoom lens as described above, wherein the fourth lens group has positive (+) power.

Another aspect of the disclosure is the zoom lens as described above, wherein the positive power of the fourth lens group is less than the positive power of the second lens group and third lens group.

Another aspect of the disclosure is the zoom lens as described above, wherein the fourth lens group has an optical power, wherein all of the lens groups have a magnitude of their optical power, and wherein the magnitude of the optical power of the fourth lens group is no more than half the magnitude of the optical power of the first, second or third lens groups.

Another aspect of the disclosure is the zoom lens as described above, wherein the aperture stop axially moves during zooming, and has a clear aperture that varies during zooming.

Another aspect of the disclosure is the zoom lens as described above, wherein the fourth lens group is axially stationary.

Another aspect of the disclosure is the zoom lens as described above, wherein the first lens group includes at least one aspherical optical surface.

Another aspect of the disclosure is the zoom lens as described above, wherein the first group includes at least one axially movable lens element that provides focusing.

Another aspect of the disclosure is the zoom lens as described above, wherein the zoom lens has a zoom range, a focus range and a focus breathing, and wherein the focus breathing varies over the zoom range and the focus range by no more than five percent.

Another aspect of the disclosure is the zoom lens as described above, wherein the first lens group comprises at least one axially stationary lens sub-group and at least one axially movable lens sub-group, wherein the at least one axially movable lens sub-group provides said focusing.

Another aspect of the disclosure is the zoom lens as described above, wherein the zoom lens has a field of view with a size, and wherein said focusing causes less than a 10% change in size of the field of view.

Another aspect of the disclosure is the zoom lens as described above, wherein the zoom lens includes a plurality of zoom positions, and wherein at all of the zoom positions, the size of the field of view changes by no more than 10%.

Another aspect of the disclosure is the zoom lens as described above, wherein the zoom lens includes a plurality of zoom positions each having a plurality of full field ray angles, and wherein at all zoom positions the full field ray angle is less than +/− five degrees as measured relative to perpendicular to the image plane.

Another aspect of the disclosure is the zoom lens as described above, wherein the variation in full field ray angle subtending the upper and lower rim rays is less than +/− five degrees as measured relative to the perpendicular to the image plane between any of the plurality of zoom positions.

Another aspect of the disclosure is the zoom lens as described above, wherein the zoom lens has a zoom range and full field relative illumination, and wherein the full field relative illumination is at least 40% throughout the zoom range.

Another aspect of the disclosure is the zoom lens as described above, wherein the zoom lens has a zoom range, a range of focus, and a full field relative illumination, and wherein the full field relative illumination is at least 50% throughout the zoom range and throughout a range of focus.

Another aspect of the disclosure is the zoom lens as described above, further comprising at least one variable-aperture field stop.

Another aspect of the disclosure is the zoom lens as described above, wherein the at least one variable aperture field stop is located in either the second lens group or the third lens group.

Another aspect of the disclosure is the zoom lens as described above, wherein each of the second, third and fourth lens groups includes at least one lens element, and wherein the first lens group has a diameter that is no greater than twice a diameter of any lens element in the second, third or fourth lens group.

Another aspect of the disclosure a camera system that includes the zoom lens as described above; a lens barrel having a back end, the lens barrel operably supporting the zoom lens; a camera housing having an interior and a front end that supports a lens mounting fixture to which the back end of the lens barrel attaches; an image sensor operably disposed within the camera housing interior and at the image plane of the zoom lens when the lens barrel is attached to the camera housing; and camera electronics electrically connected to the image sensor.

Another aspect of the disclosure is a zoom lens that includes along an optical axis and in order from an object space to an image space that includes an image plane: a first lens group having negative (−) power and having at least one lens element that is axially movable for focusing; an aperture stop; a second lens group having positive (+) power; a third lens group having positive (+) power; a fourth lens group having positive (+) power; wherein a magnitude of the positive power of the fourth lens group is less than a magnitude of the negative power of the first lens group and less than respective magnitudes of the positive powers of the second and third lens groups; and wherein the second and third lens groups and the aperture stop are axially movable for zooming.

The following publications and patents are incorporated by reference herein

Publications

Neil, I. A., "Zoom lenses for the thermal infrared", *SPIE* Vol. 399, Geneva, Switzerland, 1983.

Neil, I. A., "General purpose zoom lenses for the thermal infrared", *SPIE* Vol. 518, Cambridge, Ma. U.S.A., 1984.

Neil, I. A. and Turnbull, M. Y., "Zoom lens tolerances and design concepts", *SPIE* Vol. 590, Cannes, France, 1985.

Neil, I. A., "An ultra high performance zoom lens for the visible waveband", *SPIE* Vol. 1354, Monterey, Calif. U.S.A., 1990.

Neil, I. A., "Ultra high performance long focal length close focusing zoom lens for the visible waveband", *SPIE* Vol. 1780, Berlin, Germany, 1992.

Neil, I. A and Kreitzer, M., "Ultrahigh performance close focusing large ratio zoom lens for the visible waveband", *OSA* Vol. 22, Rochester, N.Y., 1994.

Neil, I. A., "Ultra high performance long focal length lens system with macro focusing zoom optics and abnormal dispersion liquid elements for the visible waveband", *SPIE* Vol. 2539, San Diego, Calif. U.S.A., 1995.

Neil, I. A., "First order principles of zoom optics explained via the macro focus conditions of fixed focal length lenses", SPIE Vol. 2539, San Diego, Calif. U.S.A., 1995.

Neil, I. A., "Liquid optics create high performance zoom lens", *Laser Focus World*, Vol. 31, No. 11, November 1995.

Neil, I. A., "Optimization glitches in zoom lens design", *SPIE* Vol. 3129, San Diego, Calif., U.S.A., 1997.

Neil, I. A., and Betensky, E. I., "High performance, wide angle, macro focus, zoom lens for 35 mm cinematography, *SPIE* Vol. 3482, Kona, Hi., U.S.A., 1998.

Neil, I. A., "Review of recent zoom lens developments for 35 mm cinematography at Panavision", ODF 2000, Tokyo, Japan, 2000.

Neil, I. A., "Lenses in Cinematography", *OSA Vol.* 15, No. 1, January 2004.

Neil, I. A., "Compound zoom lenses", *SPIE* Vol. 5865, San Diego, Calif., U.S.A., 2005.

Neil, I. A., "Optical system design reliance on technology development", *SPIE* Vol. 7100, Glasgow, Scotland U.K., 2008.

Neil, I. A., "Optical design dependence on technology development", *SPIE* vol. 7428-01, San Diego, Calif. U.S.A., August 2009.

Neil, I. A., "Optical design dependence on technology development", Opt. Eng. 50, 121706 (2011), pub. on line in the SPIE Digital Library (http://SPIEDigitalLibrary.ord/oe).

Neil, I. A., "High performance zoom lenses with a forward located stop", SPIE Vol. 8488, San Diego, Calif. U.S.A., Aug. 12-16, 2012.

Patents

US 2012/0268831 A1
U.S. Pat. No. 7,855,838 B2
U.S. Pat. No. 7,227,682 B2
U.S. Pat. No. 7,224,535 B2
U.S. Pat. No. 7,123,421 B1
U.S. Pat. No. 6,961,188 B2
U.S. Pat. No. 6,122,111 A1
U.S. Pat. No. 5,638,215 A1
U.S. Pat. No. 4,659,171 A1
U.S. Pat. No. 4,632,498 A1
U.S. Pat. No. 4,411,488 A1
U.S. Pat. No. 3,682,534
U.S. Pat. No. 2,847,907

BRIEF DESCRIPTION OF THE DRAWINGS

FIG. 1D is an optical diagram that illustrates example zoom lens showing the wide-angle (top) to narrow-angle (bottom) configurations;

FIGS. 3A and 3B are lens diagrams that show the through zoom positions (FIG. 3A) and through-focus positions (FIG. 3B) for the first main example embodiment;

FIGS. 27A and 27B are lens diagrams that show the through-zoom positions (FIG. 27A) and through-focus positions (FIG. 27B) for the third main example embodiment;

Figure 1A:
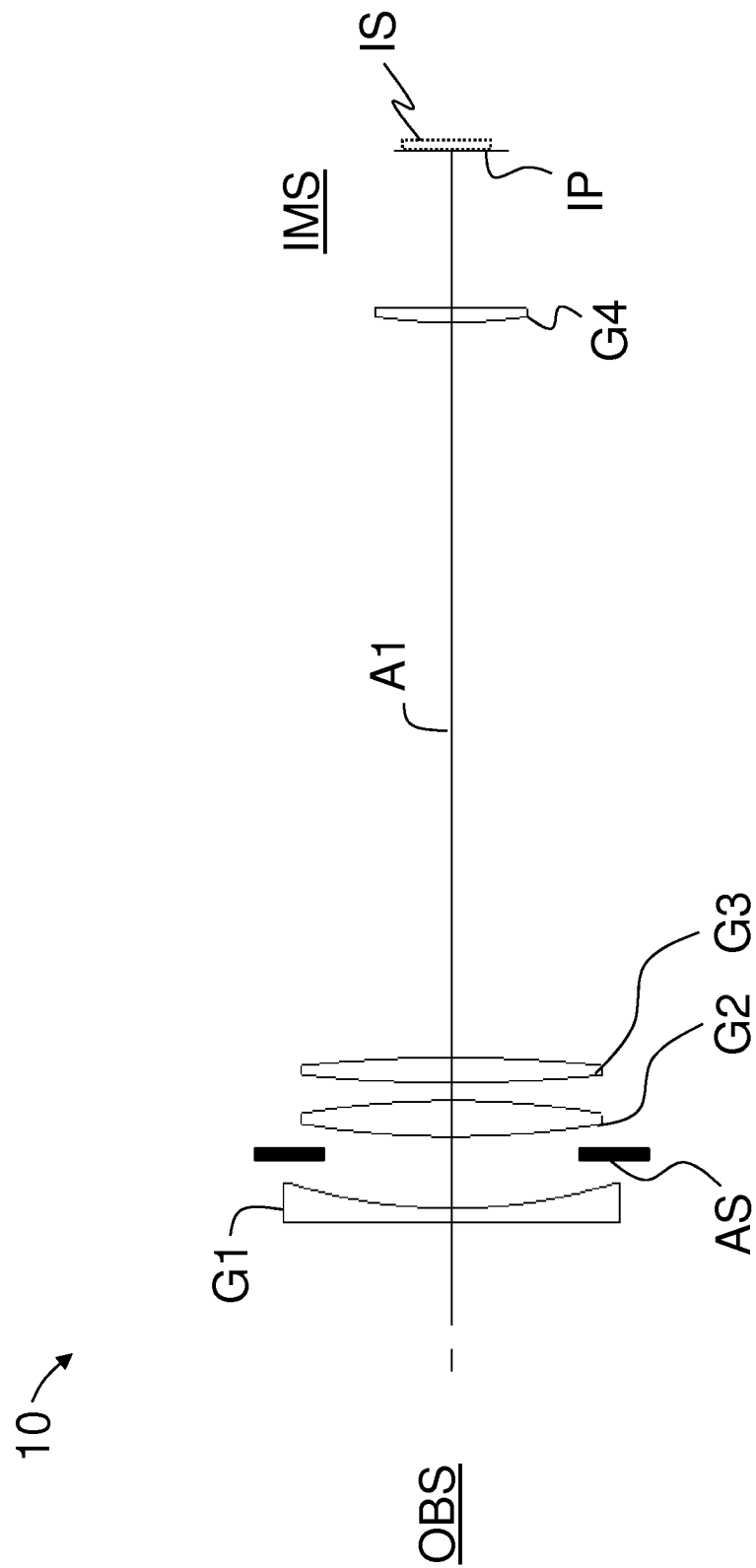
FIGS. 1A through 1C are optical diagrams that illustrate an example zoom lens having four lens groups and showing the lens group positions associated with long, medium and short effective focal length (EFL) configurations, respectively.

The information shown in FIGS. 2-37 was generated by CodeV® optical design software, which is commercially available from Optical Research Associates, Inc., Pasadena, Calif., USA.

DETAILED DESCRIPTION

The claims as set forth below are incorporated into and constituted part of this Detailed Description.

The disclosure relates to zoom lenses, and in particular to a family of zoom lenses having relatively compact front diameter optics and corresponding potential minimized weight and cost by having a forward-located aperture stop (also referred to herein as just "forward aperture stop").

The term "lens group" as used in connection with the zoom lens disclosed herein means one or more individual lens elements. Also, the terms "aperture stop", "optical stop" and "stop" are equivalent terms that can be used interchangeably. A "field stop" as the term is used herein is a stop where the chief rays do not go through the center of the stop at the optical axis, and the general purpose of a field stop is to vignette the edges of the radiation beams.

The three main example embodiments of the zoom lens disclosed herein are directed respectively to:

1) a compact, small-zoom-ratio zoom lens with a wide-angle field of view and with a reasonably fast full aperture;
2) a medium-zoom-ratio zoom lens with a similar wide-angle field of view as compared to item 1), but with a longer focal length and a slower full aperture as compared to item 1); and
3) a large zoom ratio zoom lens with a slightly lesser wide-angle field of view as compared to item 2), but much longer focal length and with a full aperture that is slower as compared to item 2).

In an example, all three main example embodiments of zoom lens 10 employ glass lens elements in lens groups G1 through G4. The lens elements have been substantially minimized in diameter and volume, and this is especially true in the front (first) lens group G1 that has negative power. A reduced diameter and volume may be more significant in the third main example embodiment because overall it is much larger in size and weight than the other two example embodiments. However, as the zoom ratio increases, the size, weight and cost of the two positively powered lens groups G2 and G3 increase and may negate any size, weight and cost saving contributed to the overall optical system by first lens group G1.

In an example embodiment of the zoom lens 10 disclosed herein, the axially movable aperture stop AS has a clear aperture that varies during zooming. In an example embodiment, this feature is accomplished using conventional opto-mechanical means known in the art and operates in cooperation with the rest of the zoom lens components. Such means may include for example traditional cams and a linear iris that has an aperture diameter that substantially changes by equal stop amounts for substantially equal angular rotations by a cam.

The examples of zoom lens 10 provide the above-mentioned features and other features such as low breathing and telecentric radiation output at the sensor. In addition, example embodiments of zoom lens 10 are capable of achieving suitable levels of imaging performance for a number of important performance parameters, including image quality, resolution, contrast, high relative illumination for low shading, and efficient optical throughput at the image plane via substantially telecentric (i.e., near telecentric) radiation output at the image plane. In an example, the full field ray angle subtending the upper and lower rim rays (see, e.g., FIG. 4) is less than +/− 5 degrees from the perpendicular to the real image surface (i.e., image plane IP).

The novel configuration of moving zoom groups G2 and G3 and the axially moving stop AS may have less effect on the size, weight and cost for shorter focal length zoom lens versions of zoom lens 10. However, even for such shorter-focal-length versions, it is anticipated that zoom lens 10 will offer advantages with respect to field illumination and the desired (for sensor optical efficiency) substantially telecentric output of light at the image plane. For wide angle zooms (of any zoom ratio), e.g. about 25 mm focal length or less (based on about a 15 mm full field image height), the former item is important because conventional zoom lens designs tend to have very low relative illumination towards and at full field. This condition is acceptable when the image-capture medium is film, which is somewhat forgiving in this respect. However, it is less so (or not acceptable) when an electronic (image) sensor IS is used as the image-capture medium. Electronic sensors are less forgiving in this respect and so may produce shading when the loss of relative illumination across the field of view (normally center of field to full field) is more than about 1 stop or 50% light loss/difference. Moreover, with the advent and continuing embracement of digital cameras employing electronic sensors, the large back focal length that was once required for film cameras to accommodate a reflex mirror is less necessary.

In examples of zoom lens 10, the act of focusing causes less than a 10% change in size of the field of view or even less than a 5% change. In other examples, the size of the field of view changes by no more than 10% for the different zoom positions, or even less than a 5% change, including for positions in between the zoom positions.

General Zoom Lens Layout

Figure 1B:
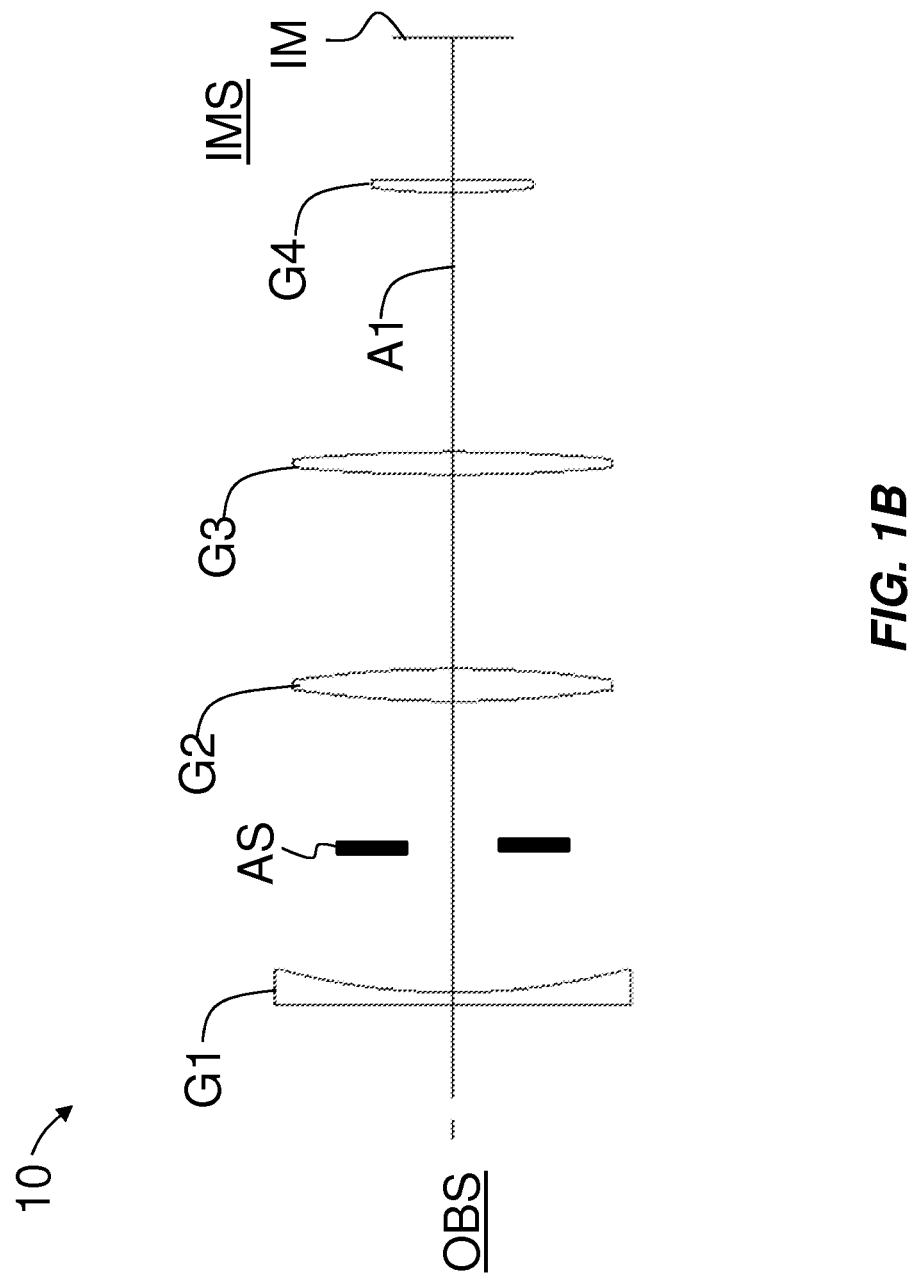
Figure 1C:
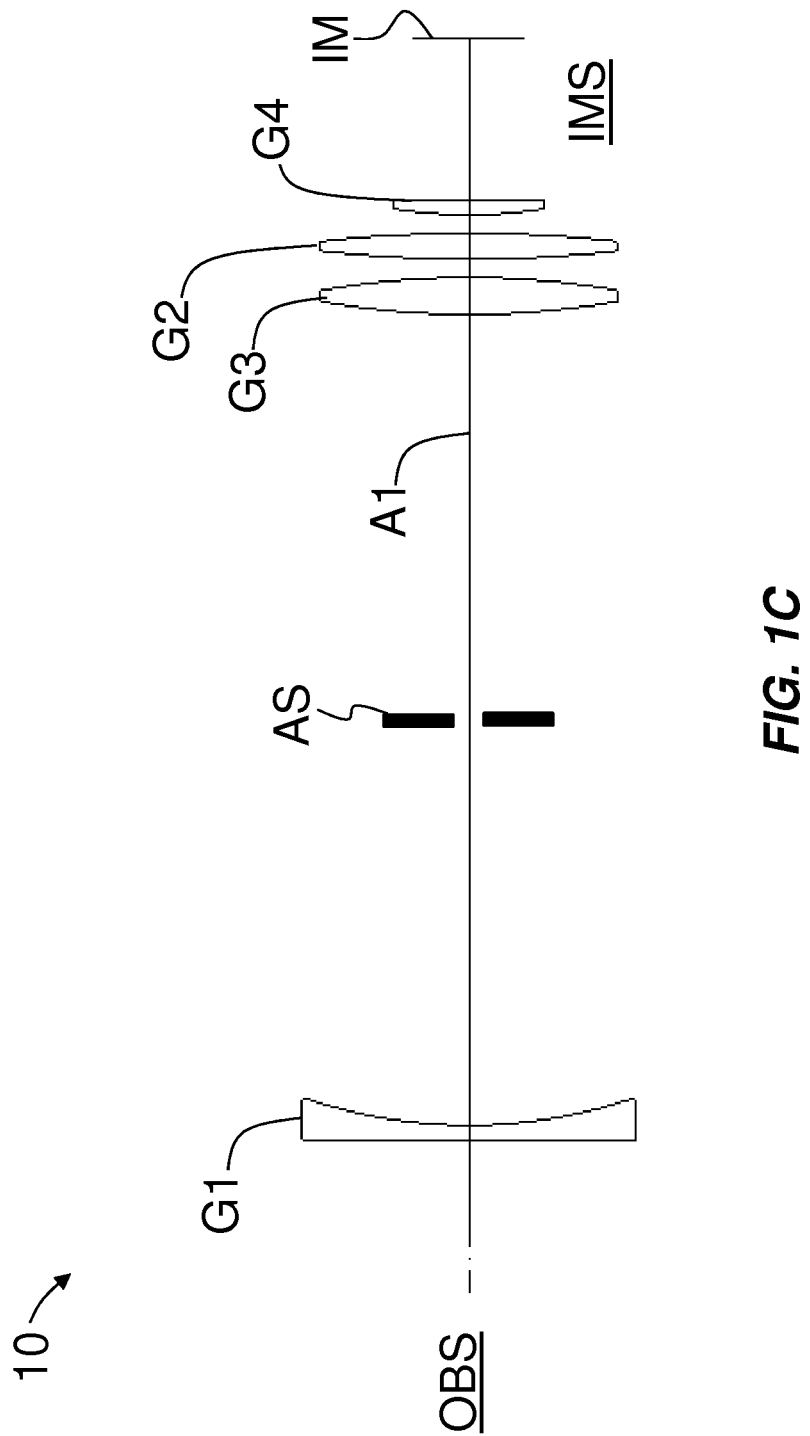
Figure 1E:
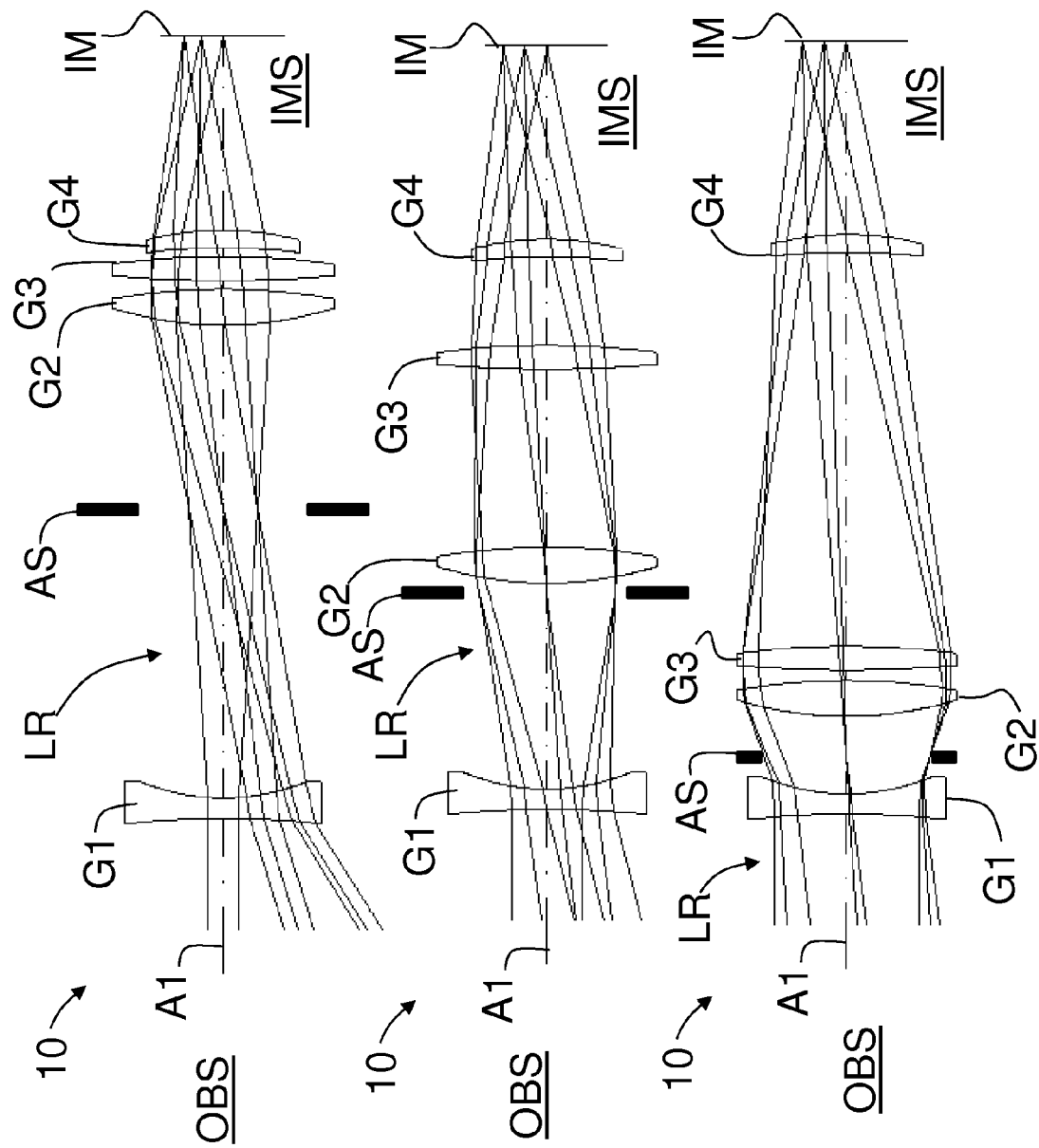
FIGS. 1E and 1F are optical diagrams that show light paths (ray traces) for wide to narrow (top to bottom) configurations for example zoom lenses according to the disclosure.
Figure 1F:
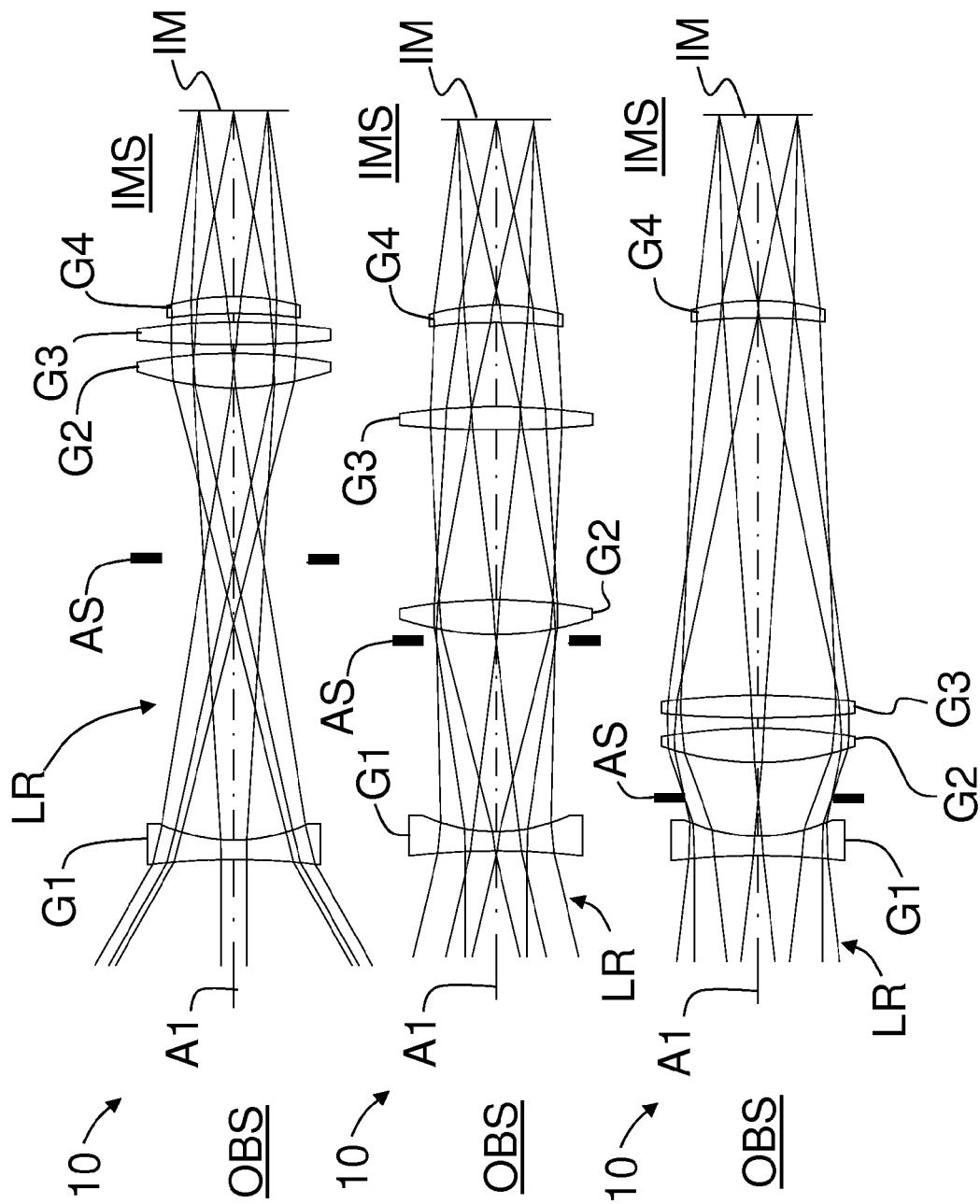

FIGS. 1A through 1F are optical diagrams of example embodiments of zoom lens 10 according to the disclosure. In particular, FIGS. 1A through 1C illustrate long, medium and short EFL configurations, respectively, for an example zoom lens 10. FIG. 1D illustrates example wide to narrow angle configurations (top to bottom) for example zoom lenses 10. FIGS. 1E and 1F shows the light paths (ray traces) for light rays LR for wide to narrow (top to bottom) configurations for an example zoom lenses 10. Light rays LR are also shown in a number of the other Figures.

Zoom lens 10 generally includes, along an optical axis A1 and in order from an object space OBS that includes an object plane OP (see FIG. 2) to an image space IMS that includes an image plane IP: a first lens group G1 having a negative (−) power, an aperture stop AS, a second lens group G2 having positive (+) power, a third lens group G3 having positive (+), and a fourth lens group G4. The second and third lens groups G2 and G3 are axially moveable to effectuate zooming. Lens groups G2 and G3 also enable the use of the negatively powered front (first) lens group G1. In an example, first lens group G1 can have a relatively small diameter, weight and cost relative to conventional zoom lenses that utilize a positively powered front lens group. In an example, first lens group G1 has a diameter that is no larger than about twice the diameter of any lens element in lens groups G2 through G4.

In an example, the fourth lens group G4 has positive (+) power. In another example, fourth lens group G4 has only an insubstantial amount of optical power (i.e., small positive or small negative) as compared to amount of optical power in the other lens groups. In this case, the fourth lens group G4 is used for aberration control and does not substantially contribute to the overall power of zoom lens 10. In an example embodiment, the fourth lens group G4 has the smallest magnitude of optical power (i.e., the modulus or absolute value of the optical power) of all the lens groups G1 through G4. In another example, the magnitude of the optical power of lens group G4 is no more than half the magnitude of the optical power of lens groups G1 through G3.

Figure 2:
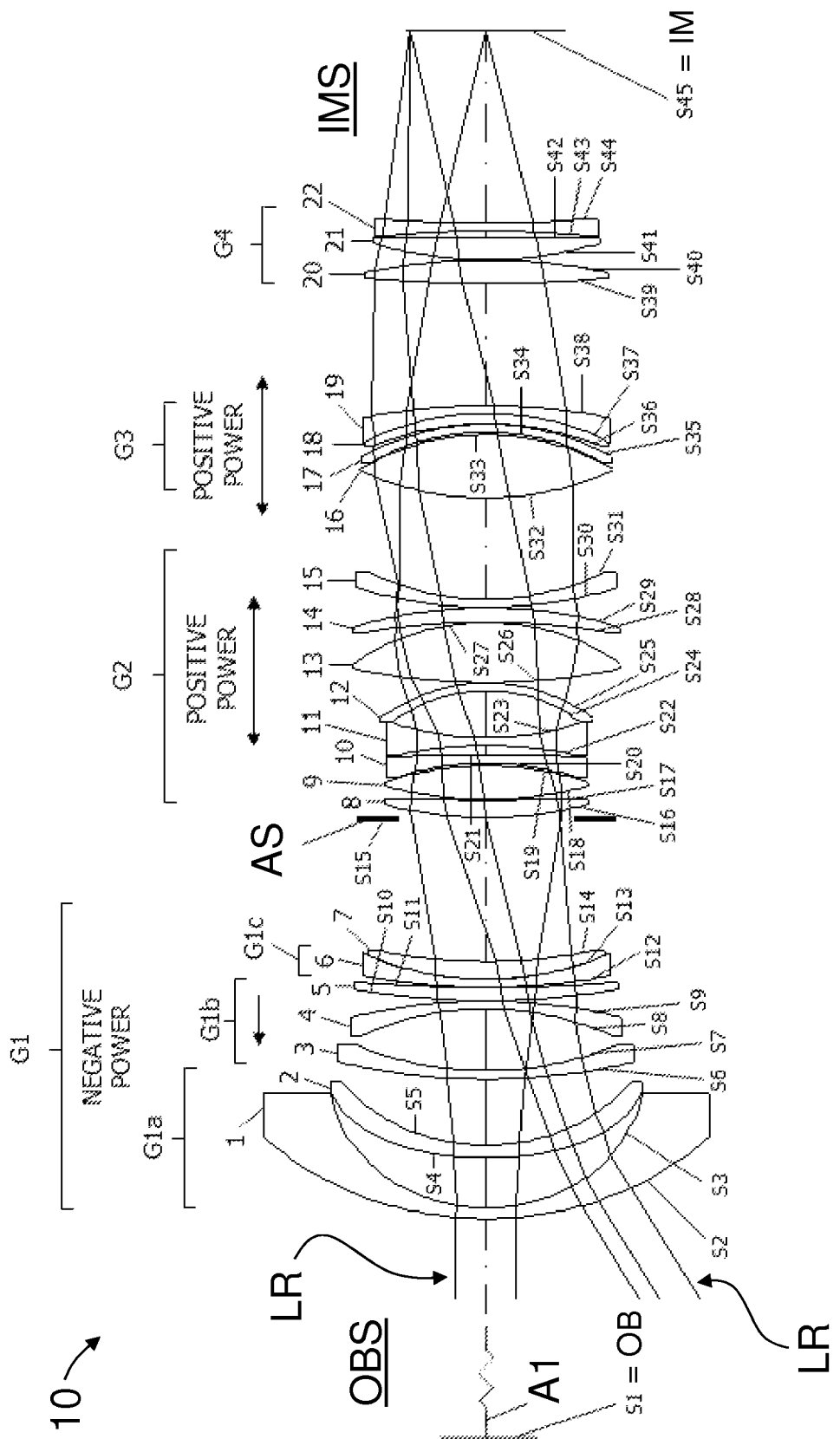
FIG. 2 is a lens diagram of a first main example embodiment of the zoom lens disclosed herein.

The negatively powered front lens group G1 may provide focusing by axial movement of at least one of the lens elements contained therein (e.g., elements 1 through 7, as shown in FIG. 2) and may exhibit low breathing in at least a portion of the zoom range. The fourth lens group G4 is adjacent the image space IMS (i.e., is the most imagewise lens group). In an example, fourth lens group G4 is used to match the optical characteristics of the zoom lens to an image sensor IS (see FIG. 1A) that resides at image plane IP (see, e.g., FIG. 1A). In particular, fourth lens group G4 is configured to deliver the radiation (light) (i.e., light rays LR) passing through zoom lens 10 to the image sensor IS with nearly (i.e., substantially) telecentric light paths and suitably high relative illumination, thereby increasing the efficiency of the electronic (image) sensor IS. In all three examples of zoom lens 10, the illumination is at least 40% throughout the zoom range and focus range, though in other examples the illumination could be made to be at least 50% for just the zoom range.

Specifications for Embodiments 1-3

The three example embodiments of zoom lens 10 disclosed herein are meant to represent three of the most common types of zoom lenses used in cinematography. The first is a small, compact, small zoom ratio, a fairly fast aperture (f/no.) lens primarily for light weight applications, such as hand-held operation of the camera system. The second is a medium size, medium zoom ratio, moderate aperture lens which would be a "workhorse" lens since it is suitable for many applications and shooting situations. The third is a larger, i.e. longer, but compact in diameter, larger zoom ratio, moderate aperture lens, which would be more suitable for use when supported on a tripod, dolly, crane, etc.

Zoom lens 10 can be configured to have substantially constant full aperture throughout the zooming and focus ranges, and good close-focusing capabilities. The example focal lengths used in the embodiments described below are based on the actual field of view achieved for a 15 mm image height. An example waveband for zoom lens 10 is at least 486 nm to 587 nm and this waveband is used in the MTF plots discussed below. An extended waveband may also be used. The waveband may be extended and the optical designs re-optimized to maximize image quality over the extended waveband without departing from the spirit and scope of the disclosure. Also, during such re-optimization, alternate glass types may be used without departing from the spirit and scope of the disclosure.

Embodiment 1

FIG. 2 is a lens diagram of a first main example embodiment ("embodiment 1") of zoom lens 10. FIG. 2 includes annotation for lenses 1 through 22 and surfaces S1 through S45 to match the Optical Prescription Tables set forth below. The focal length is 28.36 mm at a far focus distance. Axial movement is indicated in FIG. 2 by the straight single-ended and double-ended arrows.

First lens group G1 includes from objectwise to imagewise first lens sub-group G1a, a second lens sub-group G1b and a third lens sub-group G1c. First lens sub-group G1a includes lens elements 1 and 2. Second lens sub-group G1b includes lens elements 3, 4 and 5, and is shown as being axially movable for focusing. Third lens sub-group G1c includes lens elements 6 and 7. Second lens group G2 includes lens elements 8 through 15. Third lens group G3 includes lens elements 16 through 19. Fourth lens group G4 includes lens elements 20 through 22. Object plane OB is the same as surface S1 and image plane IM is the same as surface S45. Aperture stop AS is defined by surface 515.

FIG. 3A is a lens diagram of embodiment 1 of zoom lens 10 through zoom at focal lengths of 16.27, 28.36 and 49.65 mm (top to bottom) at the far focus distance.

FIG. 3B is a lens diagram of embodiment 1 of zoom lens 10 through focus at far, intermediate and close focus distances (top to bottom) and at a focal length of 28.36 mm.

Figure 4:
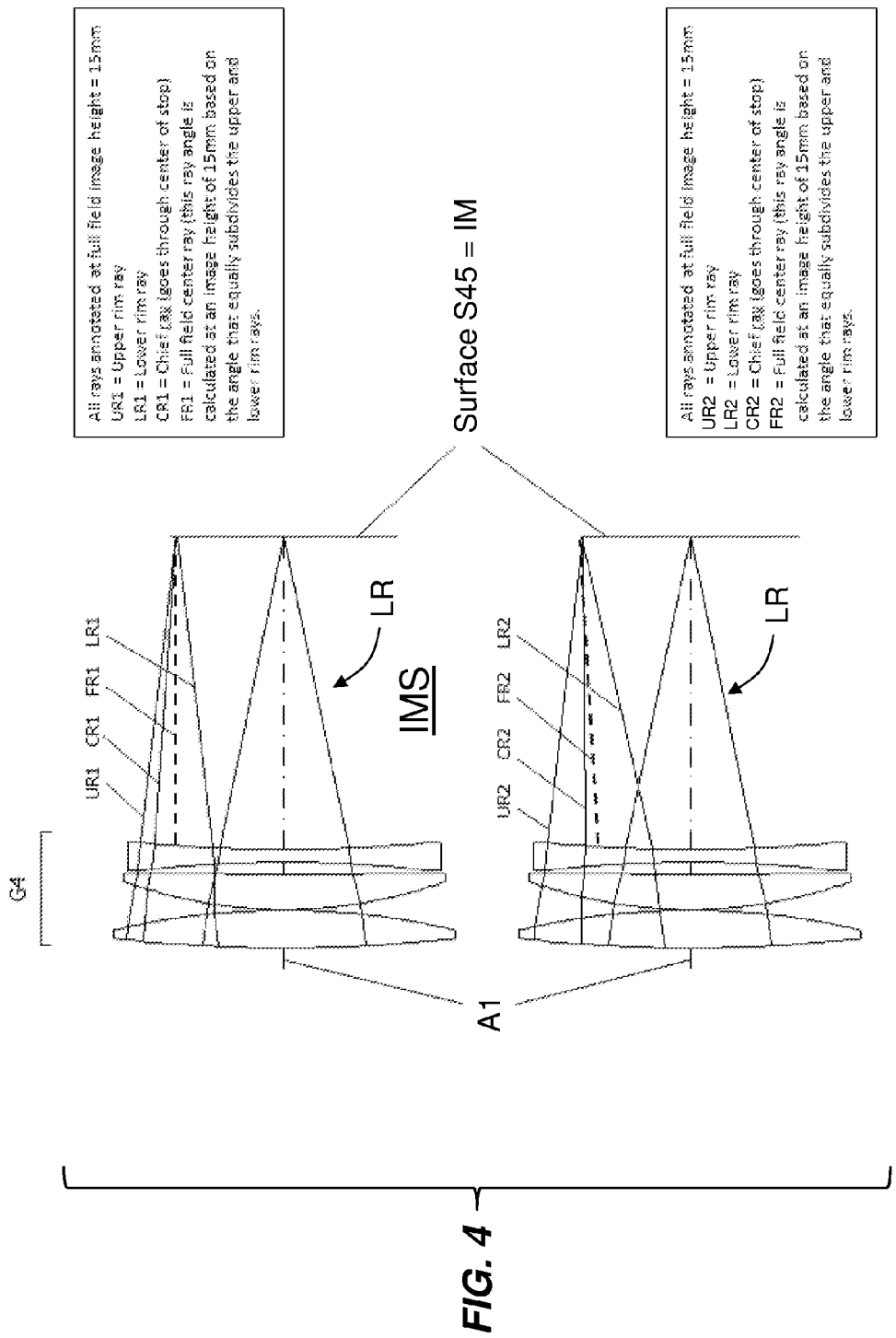
FIG. 4 shows two lens diagrams of fourth lens group G4 at short and long focal lengths of 16.27 mm and 49.65 mm (top and bottom, respectively) at the far focus distance for the first main example embodiment.
Figure 5:
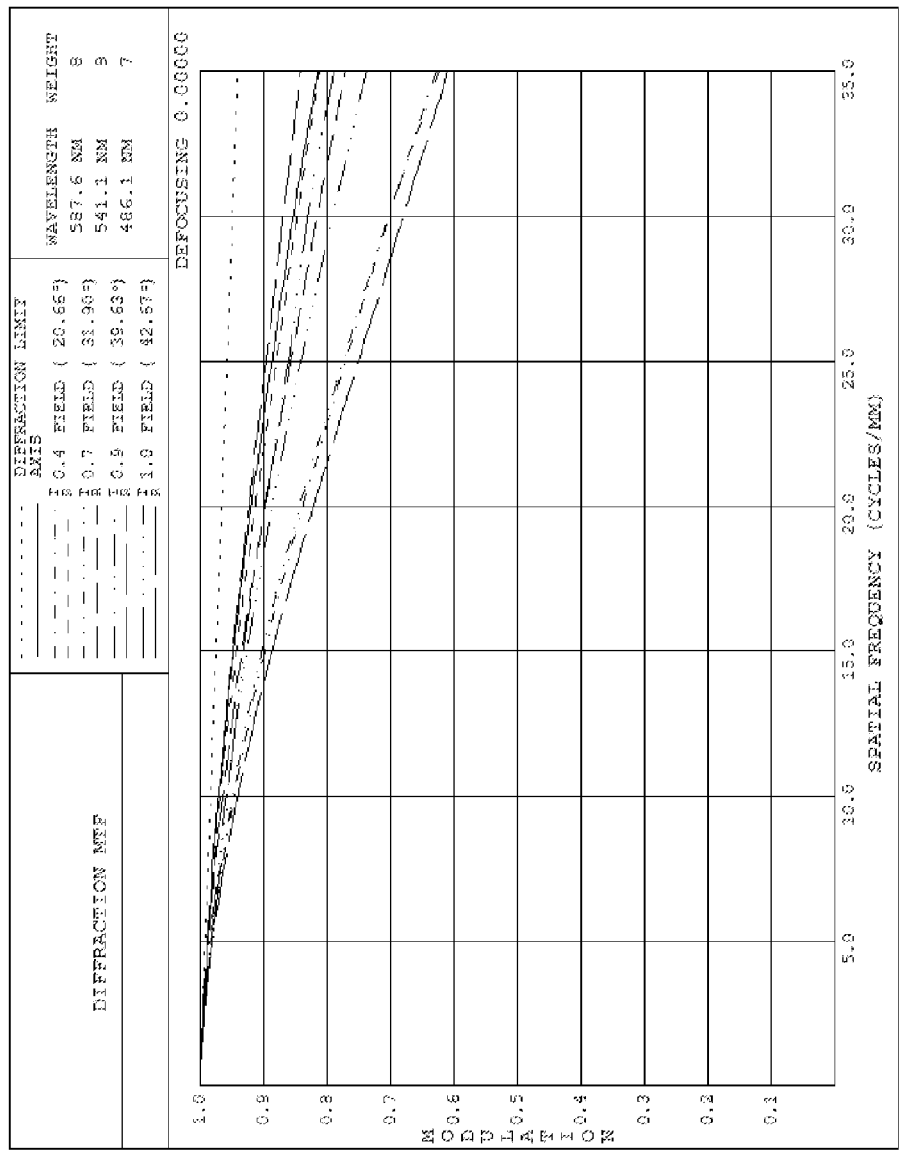
FIGS. 5 through 13 are MTF plots for the first main example embodiment.
Figure 6:
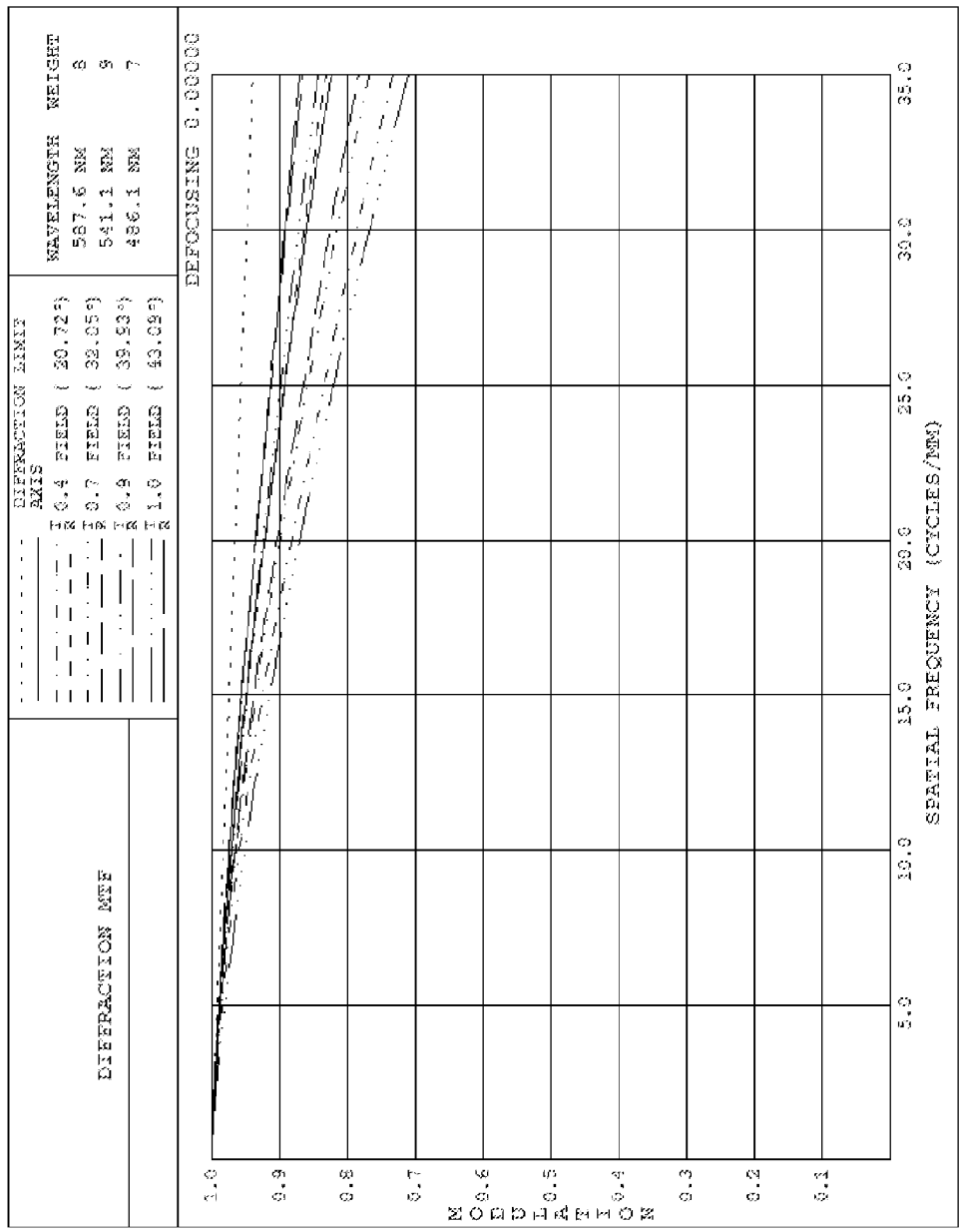
Figure 7:
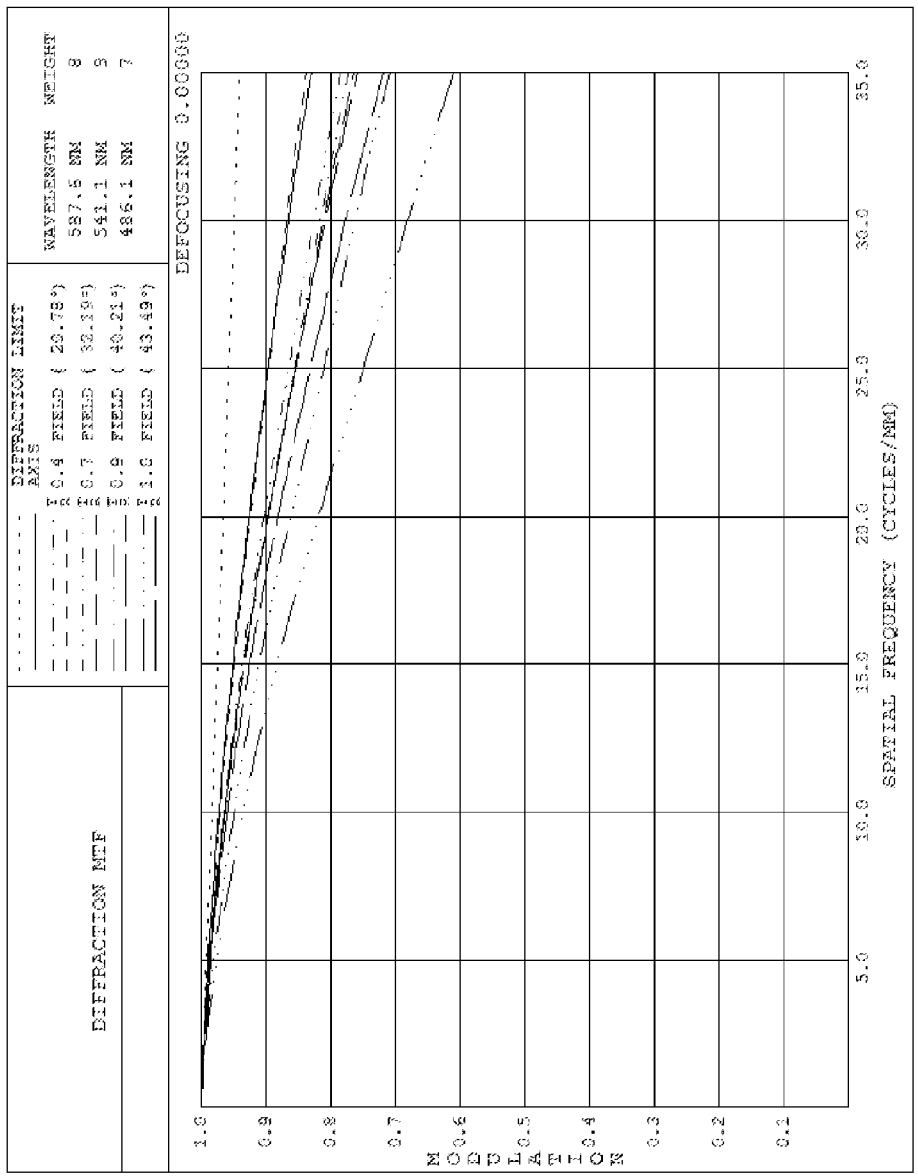
Figure 8:
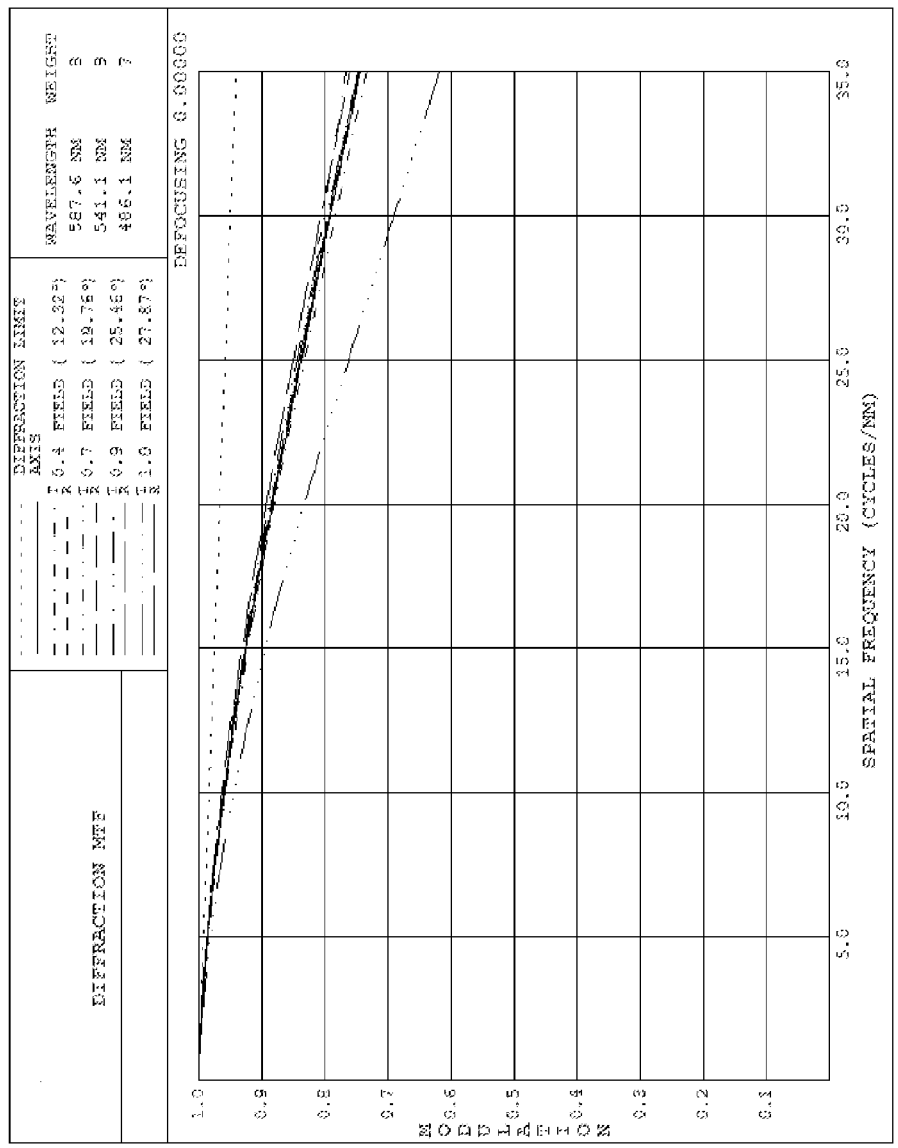
Figure 9:
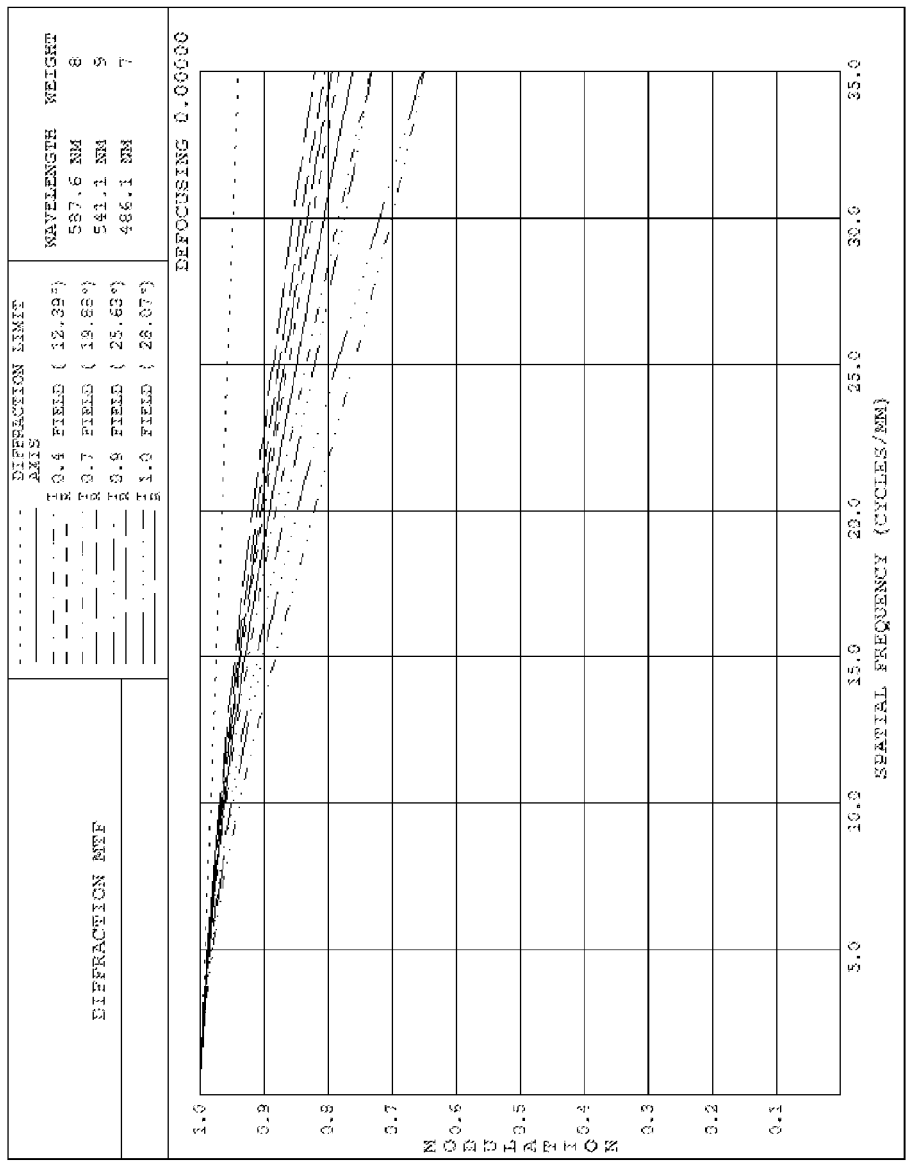
Figure 10:
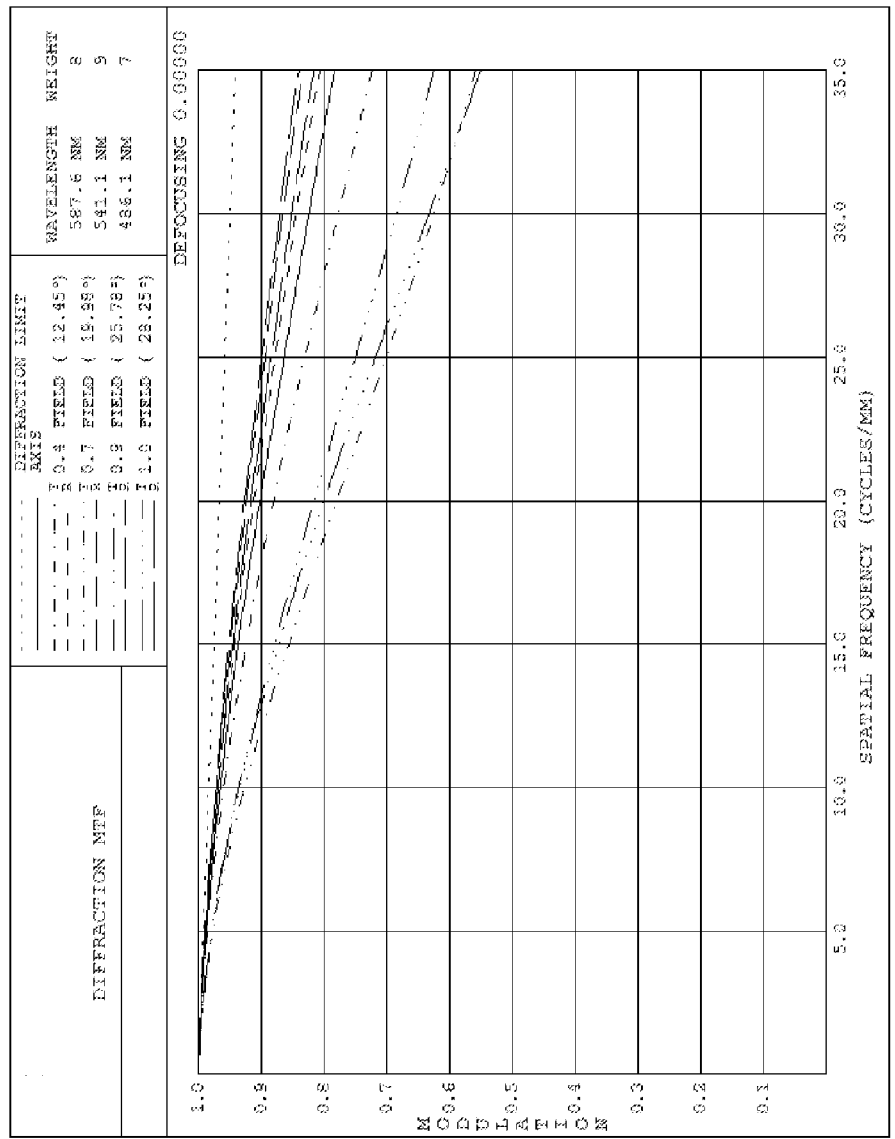
Figure 11:
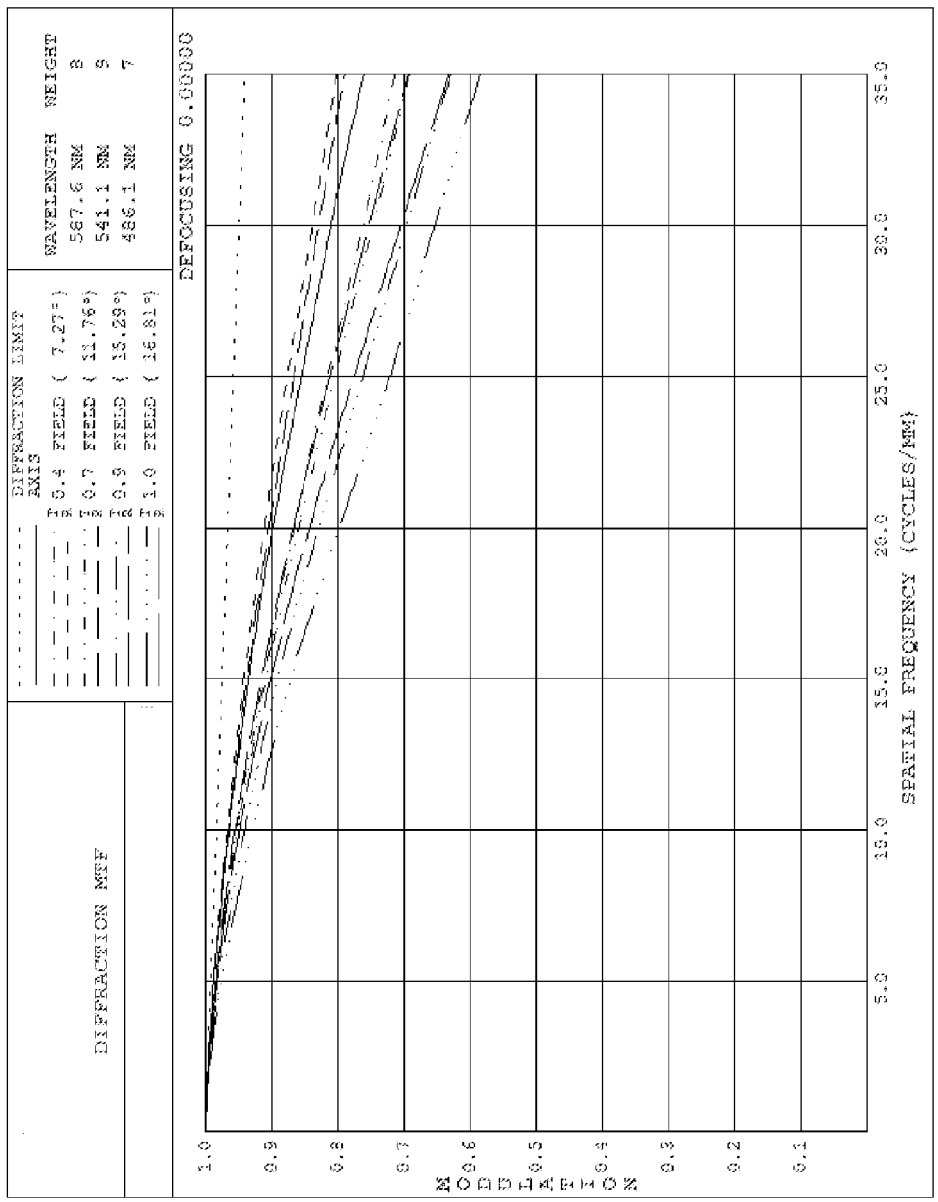
Figure 12:
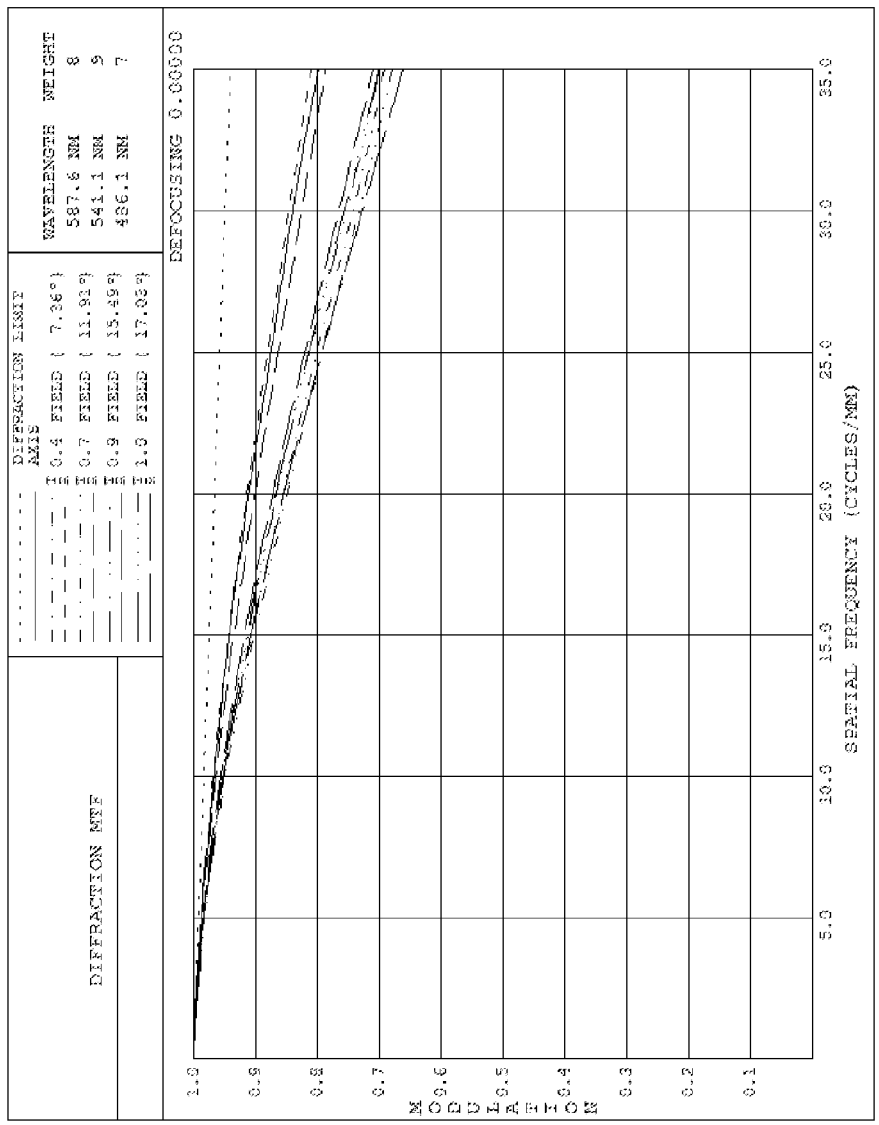
Figure 13:
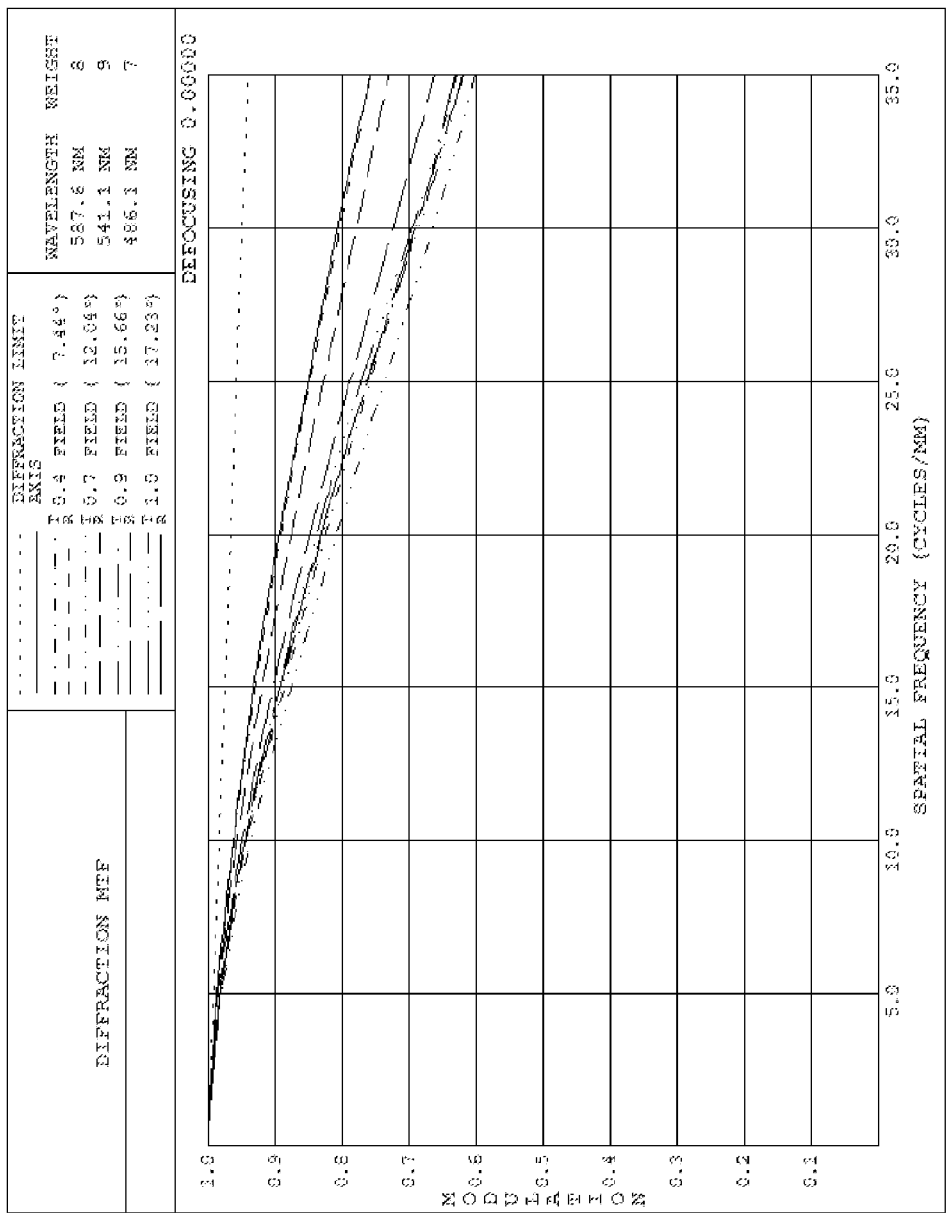

FIG. 4 shows two lens diagrams of fourth lens group G4 at short and long focal lengths of 16.27 mm and 49.65 mm (top and bottom, respectively) at the far focus distance. The legends in FIG. 4 describes the upper rim rays UR1 and UR2, lower rim rays LR1 and LR2, the chief rays CR1 and CR2, and the full-field center rays FR1 and FR2, all of which constitute example light rays LR.

FIGS. 5 through 13 are plots of the modulation vs. spatial frequency (cycles/mm) (hereinafter, "MTF plots") for embodiment 1 of zoom lens 10 for focal lengths of 16.27, 28.36 and 49.65 mm at far, intermediate and close focus distances, with five field positions shown from zero to full field in all of the MTF plots. The MTF plots show good performance for embodiment 1 of zoom lens 10 over the full field and for the range of focal lengths and focus distances. In particular, the MTF performance for embodiment 1 is shown to be greater than 55% at all field positions and greater than about 75% for all axial field positions at a spatial frequency of 35 cycles/mm.

Embodiment 1 of zoom lens 10 also has the following exemplary properties:

Focal Length Range: 16.27 mm to 49.65 mm
Zoom Ratio: ×3.1
Full Aperture: f/2.5 (constant all zoom and all focus)
Close Focus Distance (object to image): 731.88 mm
Back Focal Length (along optical axis): 44.00 mm
Front Diameter: 83.20 mm
Overall Length (front vertex to image): 272.50 mm
Full Field Image Height: 15 mm
Focal Lengths of the Lens Groups:
G1: −42.56 mm (at focus F1=infinity focus), −43.11 mm (at F2=intermediate focus) and −43.62 mm (at F3=close focus)
G2: 118.73 mm
G3: 123.48 mm G4: 211.20 mm G1a: −73.56 mm G1b: −130.39 mm G1c: 1220.94 mm Note that G1c is a doublet and has relatively weak power, so that it may be removed and the optical system re-optimized without adversely affecting performance.

Total Number of Lens Elements=22

It is noted that with further optimization within the means of someone skilled in the art, there are some pairs of lens elements that nearly form doublets and these could be joined to form doublets.

Embodiment 2

Figure 14:
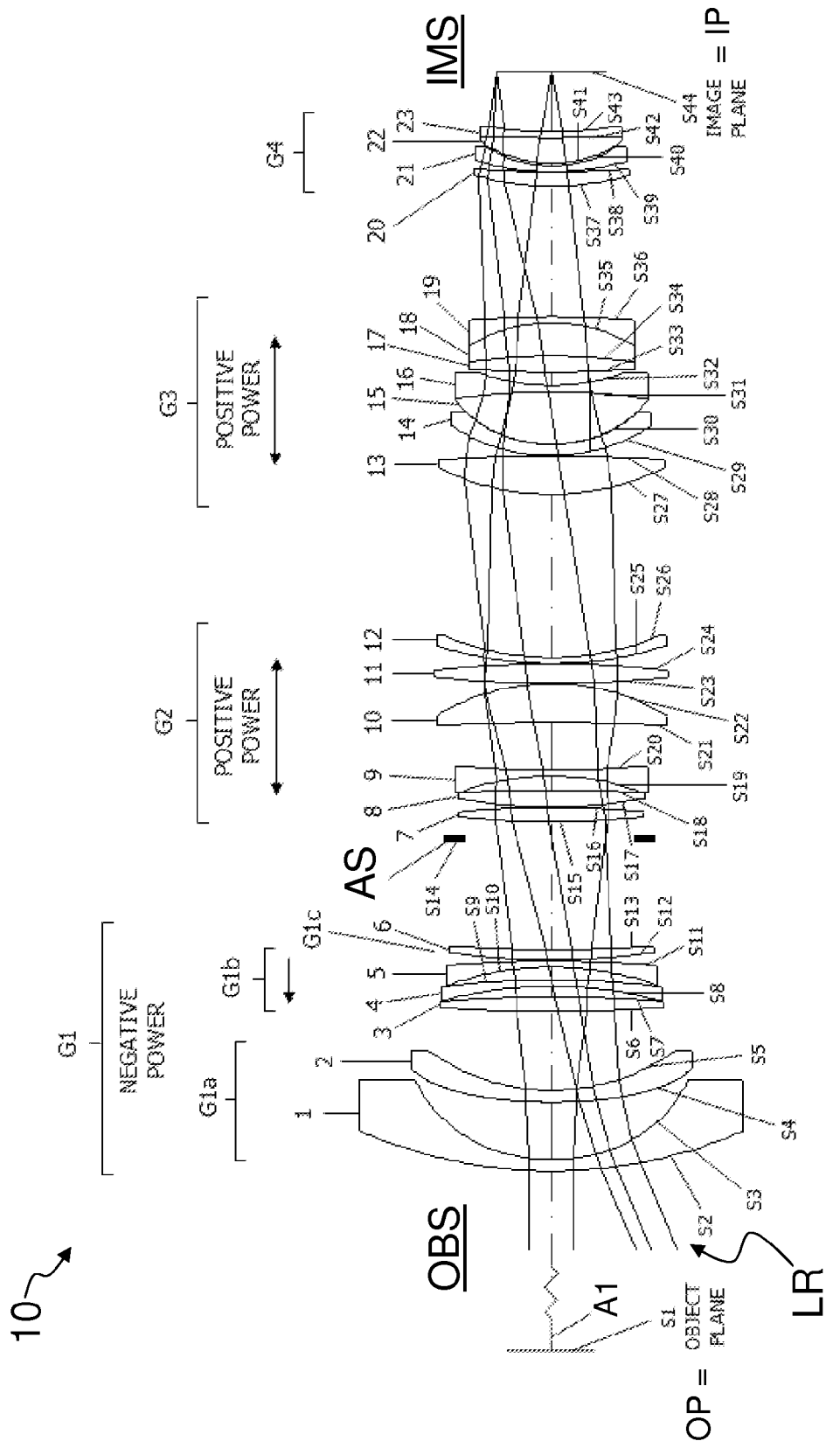
FIG. 14 is a lens diagram of a second main example embodiment of the zoom lens disclosed herein.

FIG. 14 is a lens diagram for a second main example embodiment ("embodiment 2"). FIG. 14 includes annotation for lenses 1 through 23 and surfaces S1 through S44 to match the Optical Prescription Tables set forth below. The focal length is 39.86 mm at a far focus distance. Axial movement is indicated in FIG. 14 by the straight single-ended and double-ended arrows.

The first lens group G1 of this second embodiment includes, from objectwise to imagewise, first lens sub-group G1a, second lens sub-group G1b and third lens sub-group G1c. First lens sub-group G1a includes lens elements 1 and 2. Second lens sub-group G1b includes lens elements 3, 4 and 5 and is shown as being axially movable for focusing. Third lens sub-group G1c includes lens element 6. Second lens group G2 includes lens elements 7 through 12. Third lens group G3 includes lens elements 13 through 19. Fourth lens group G4 includes lens elements 20 through 23. Object plane OB is the same as surface S1 and image plane IM is the same as surface S44. Aperture stop AS is defined by surface S14.

Figure 15A:
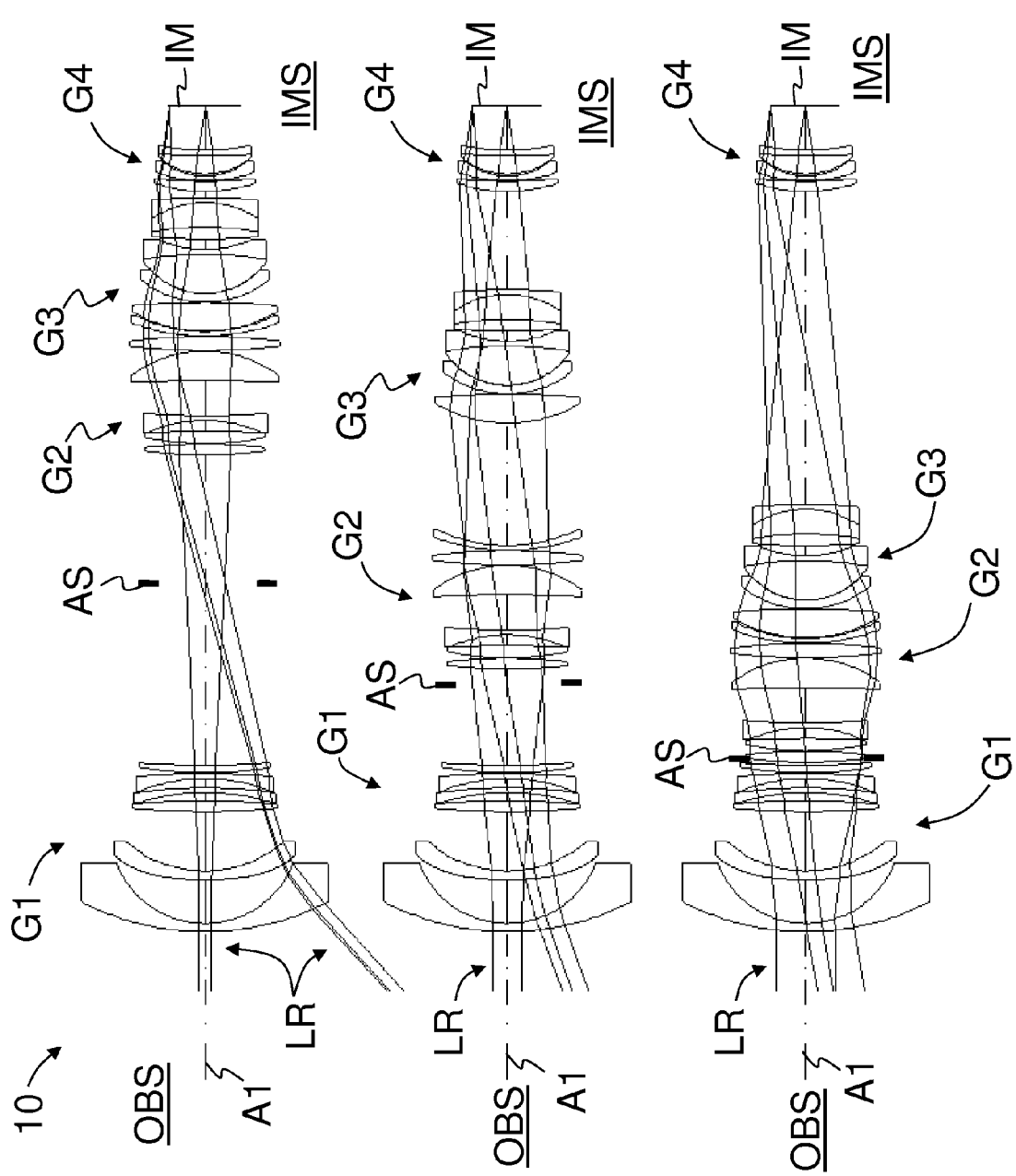
FIGS. 15A and 15B are lens diagrams that show the through-zoom positions (FIG. 15A) and through-focus positions (FIG. 15B) for the second main example embodiment.

FIG. 15A is a lens diagram of embodiment 2 of zoom lens 10 through zoom at focal lengths of 16.35, 39.86 and 84.04 mm (top to bottom) at the far focus distance.

Figure 15B:
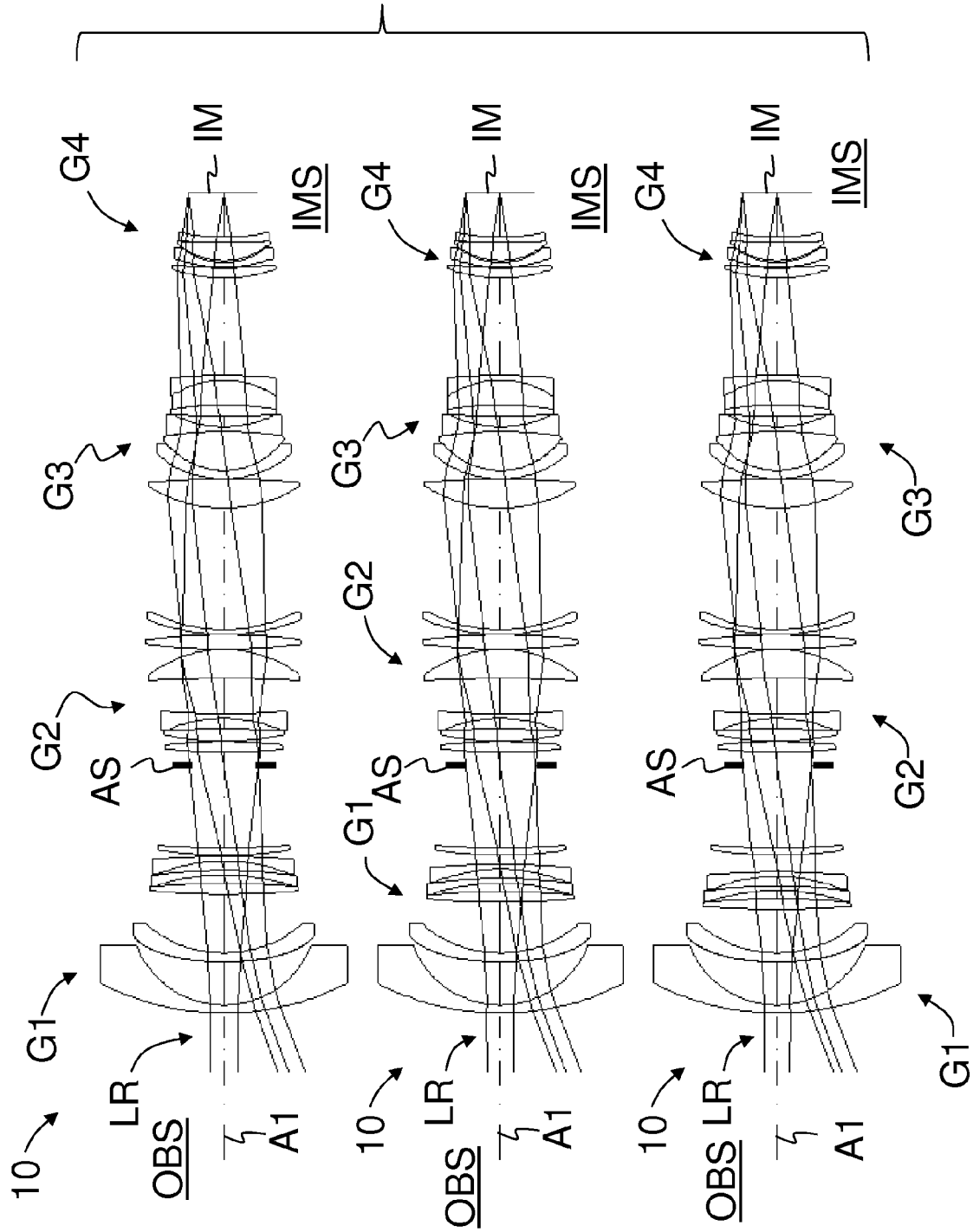

FIG. 15B is a lens diagram through focus at far, intermediate and a close focus distances (top to bottom) and at a focal length of 39.86 mm.

Figure 16:
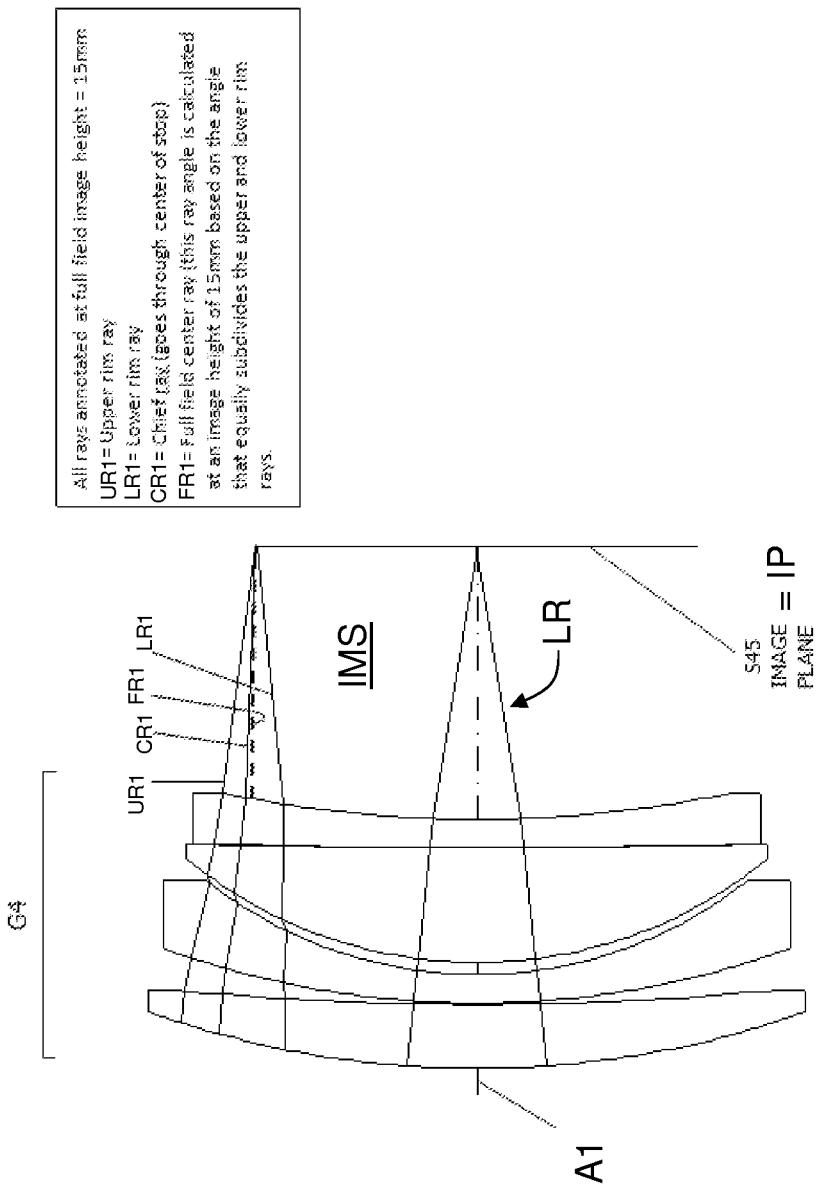
FIG. 16 is a lens diagram of the fourth lens group G4 at a focal length of 39.86 mm at the far focus distance.
Figure 17:
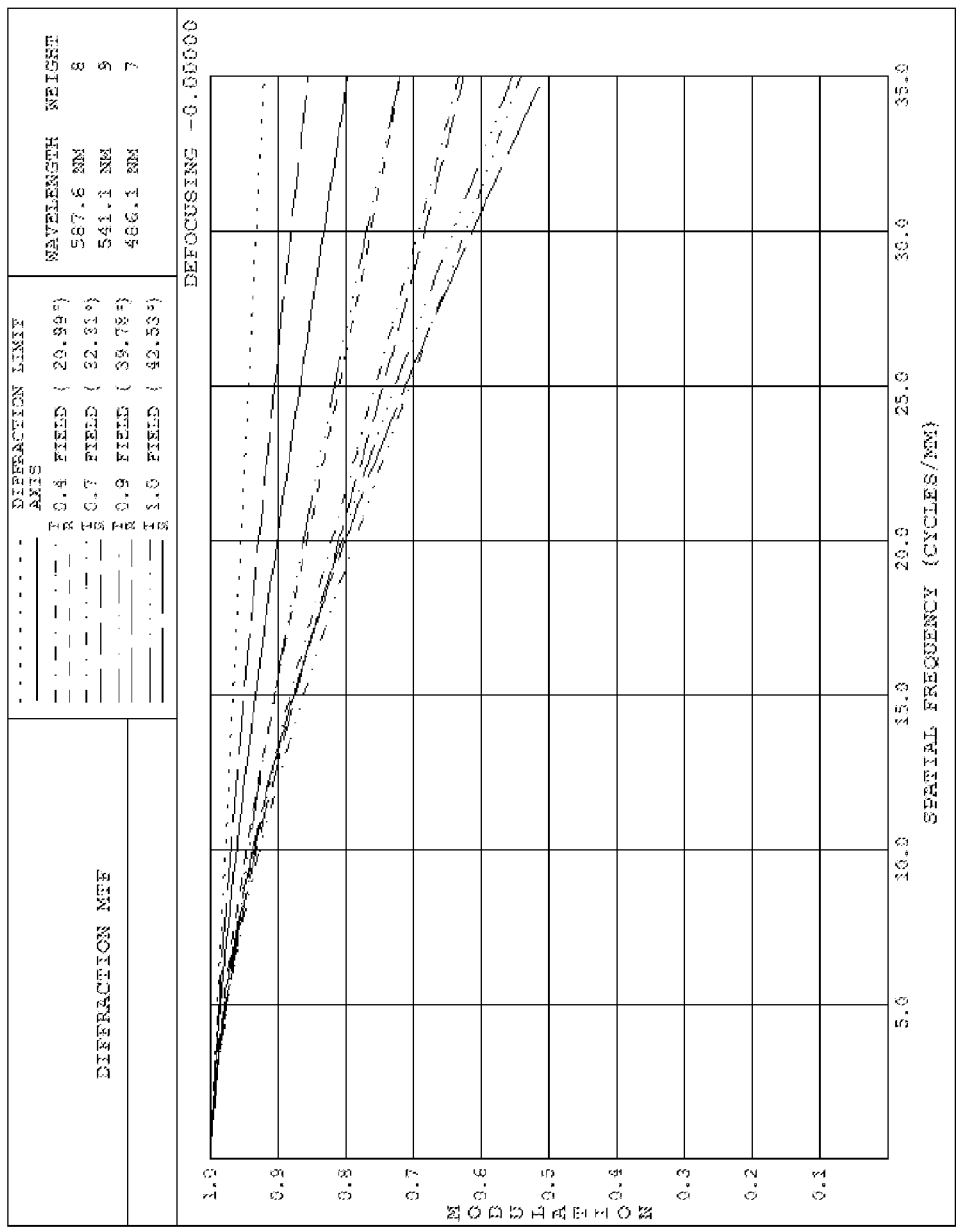
FIGS. 17 through 25 are MTF plots for the second main example embodiment.
Figure 18:
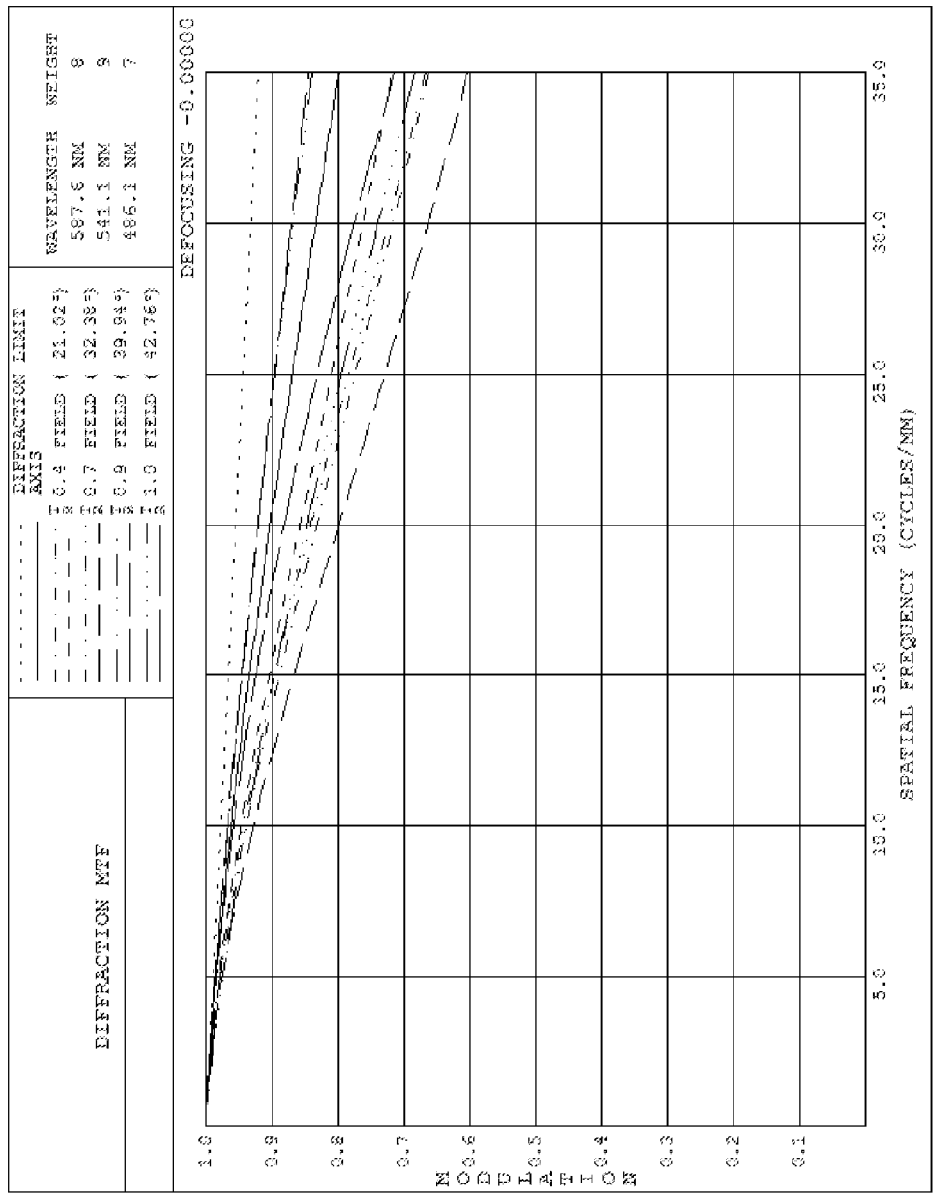
Figure 19:
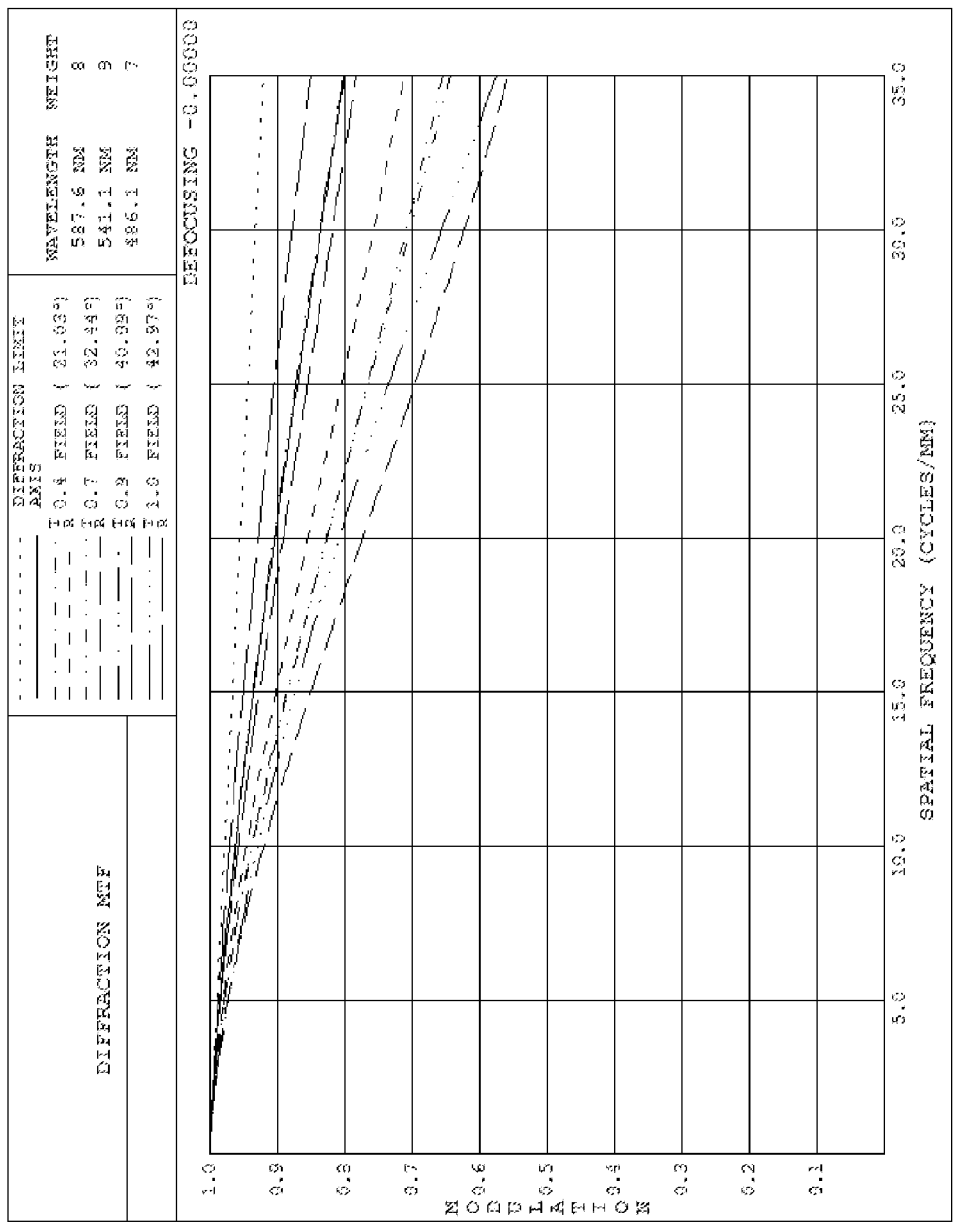
Figure 20:
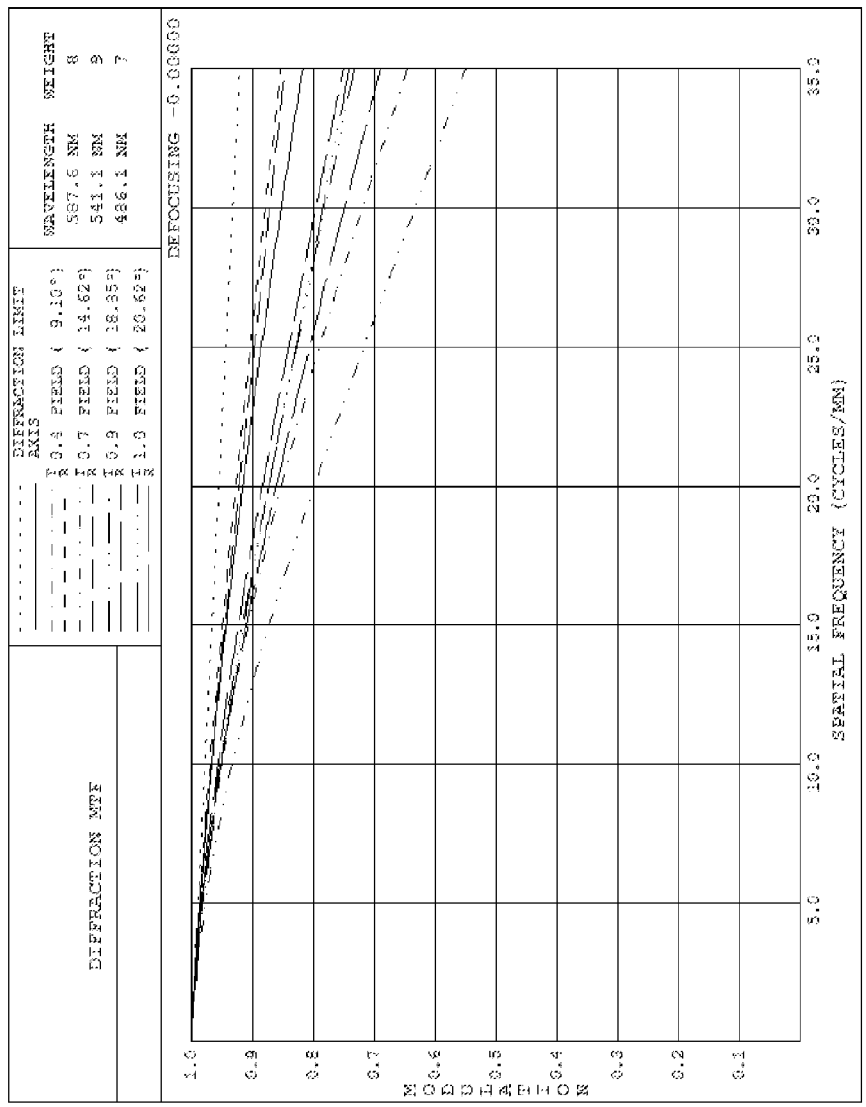
Figure 21:
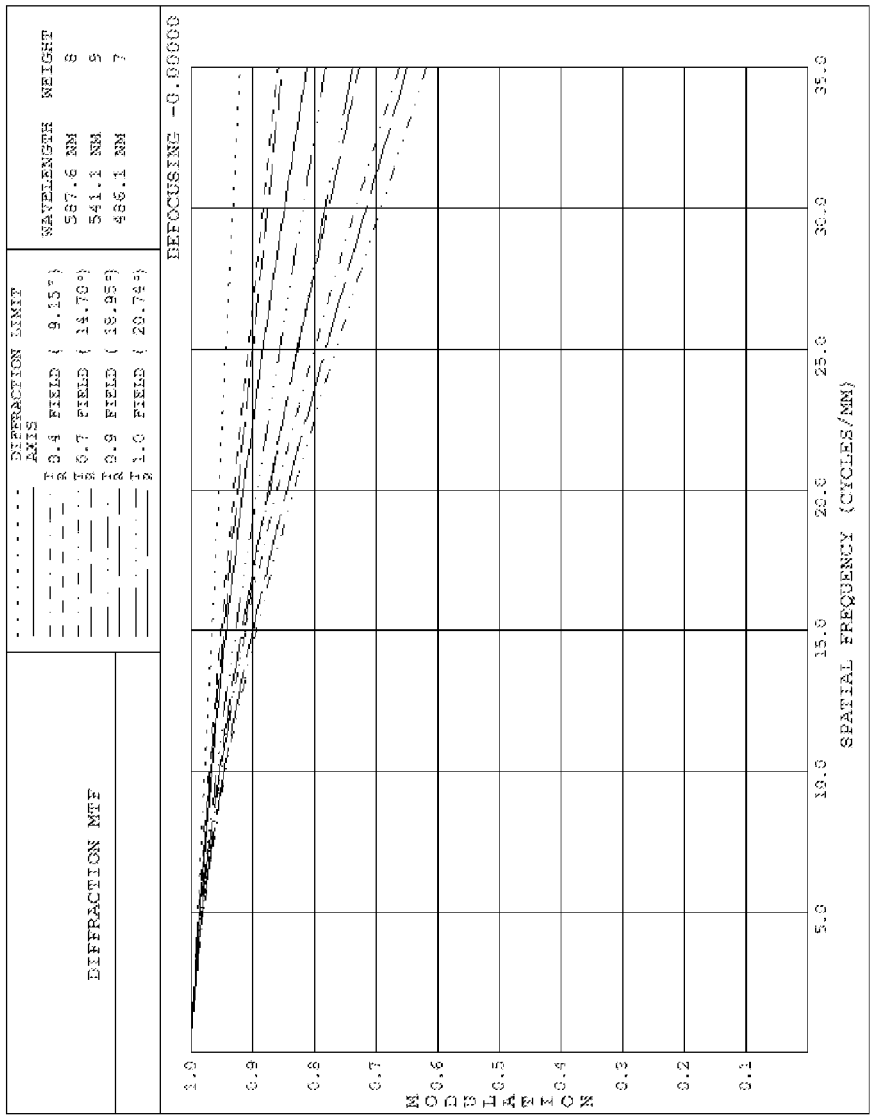
Figure 22:
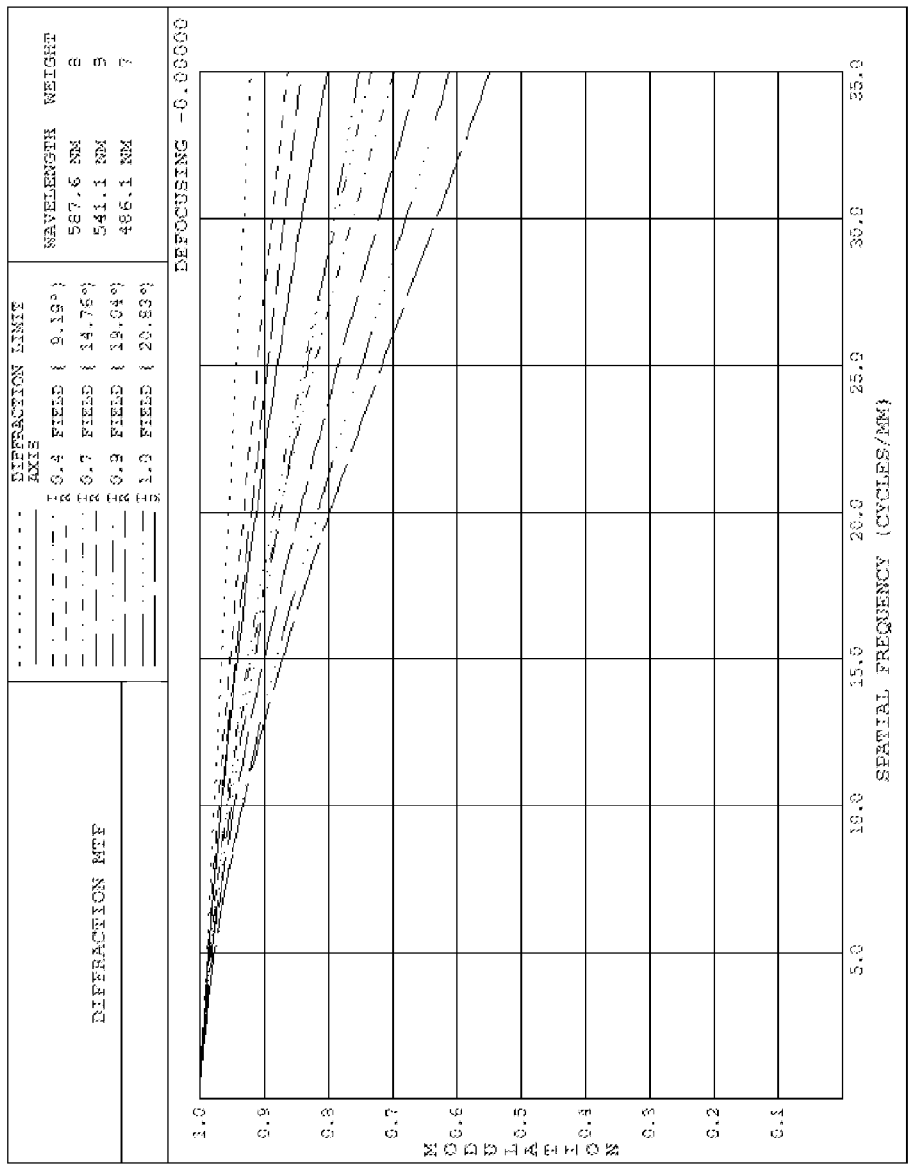
Figure 23:
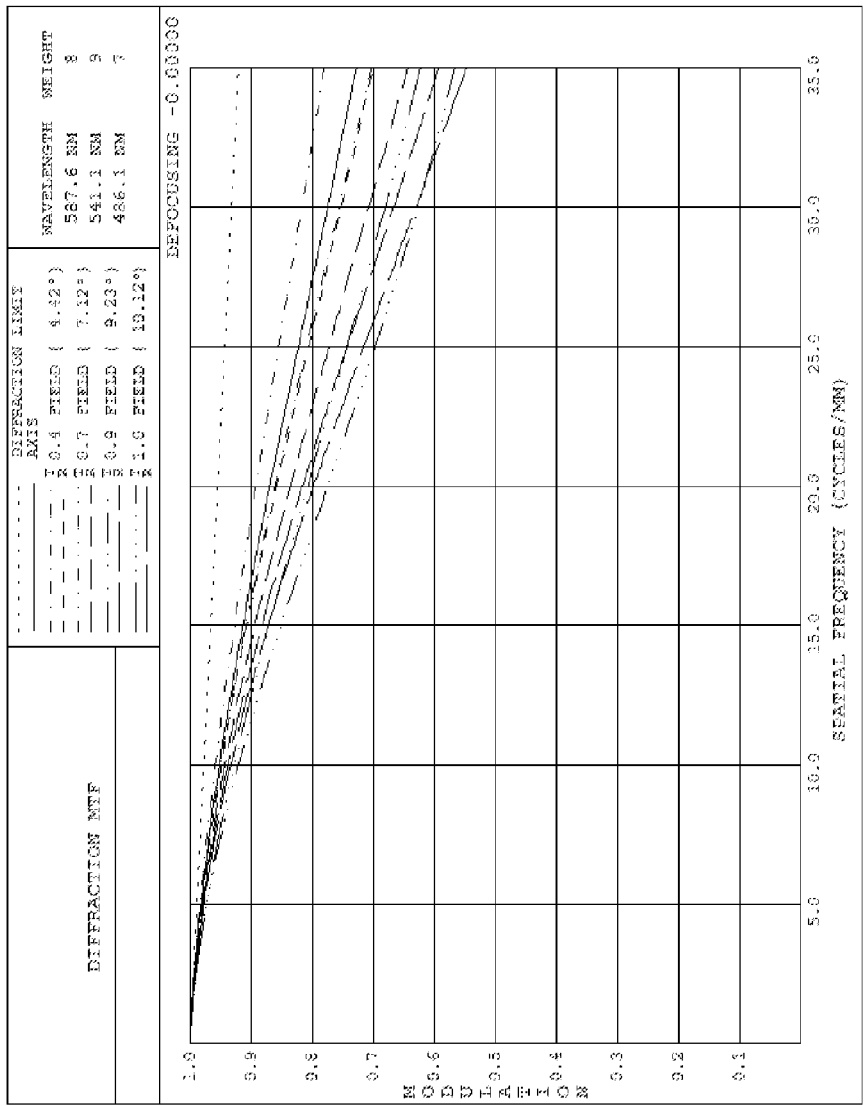
Figure 24:
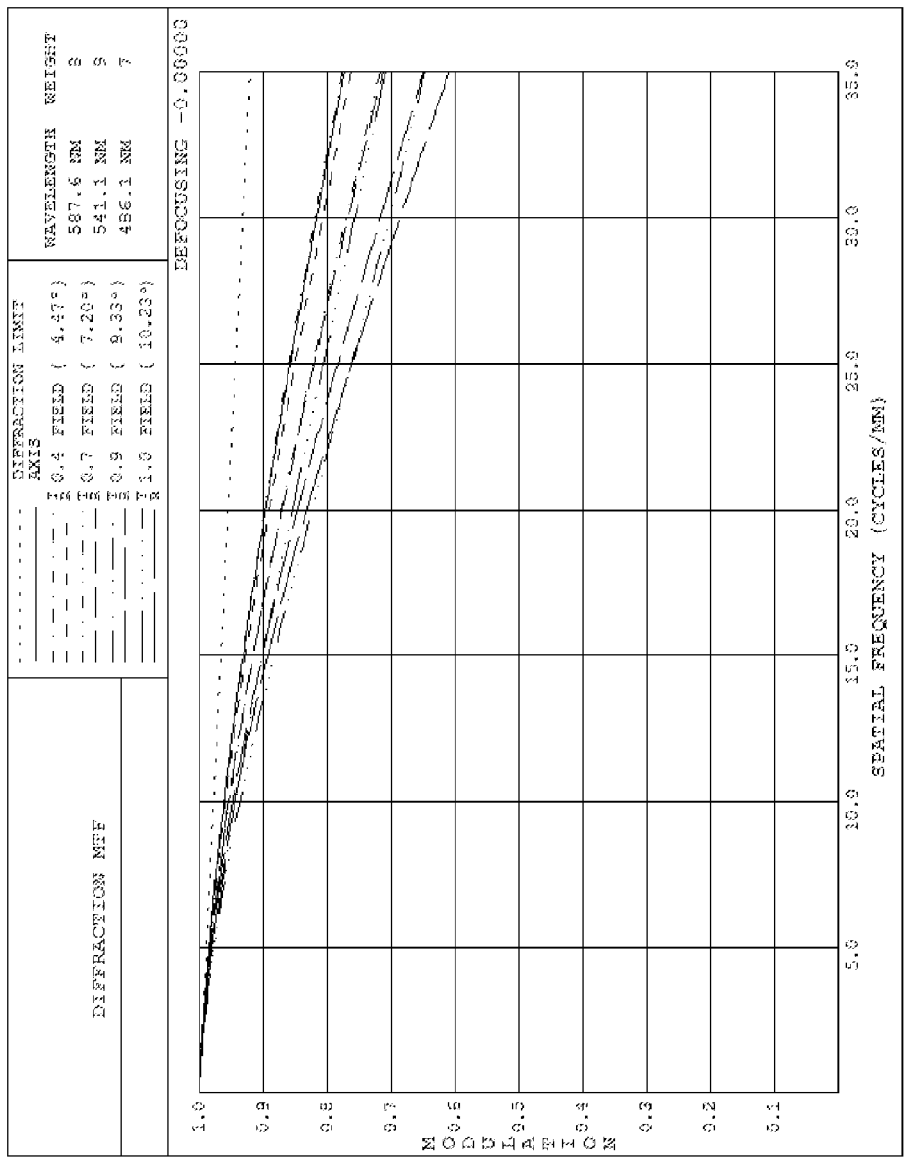
Figure 25:
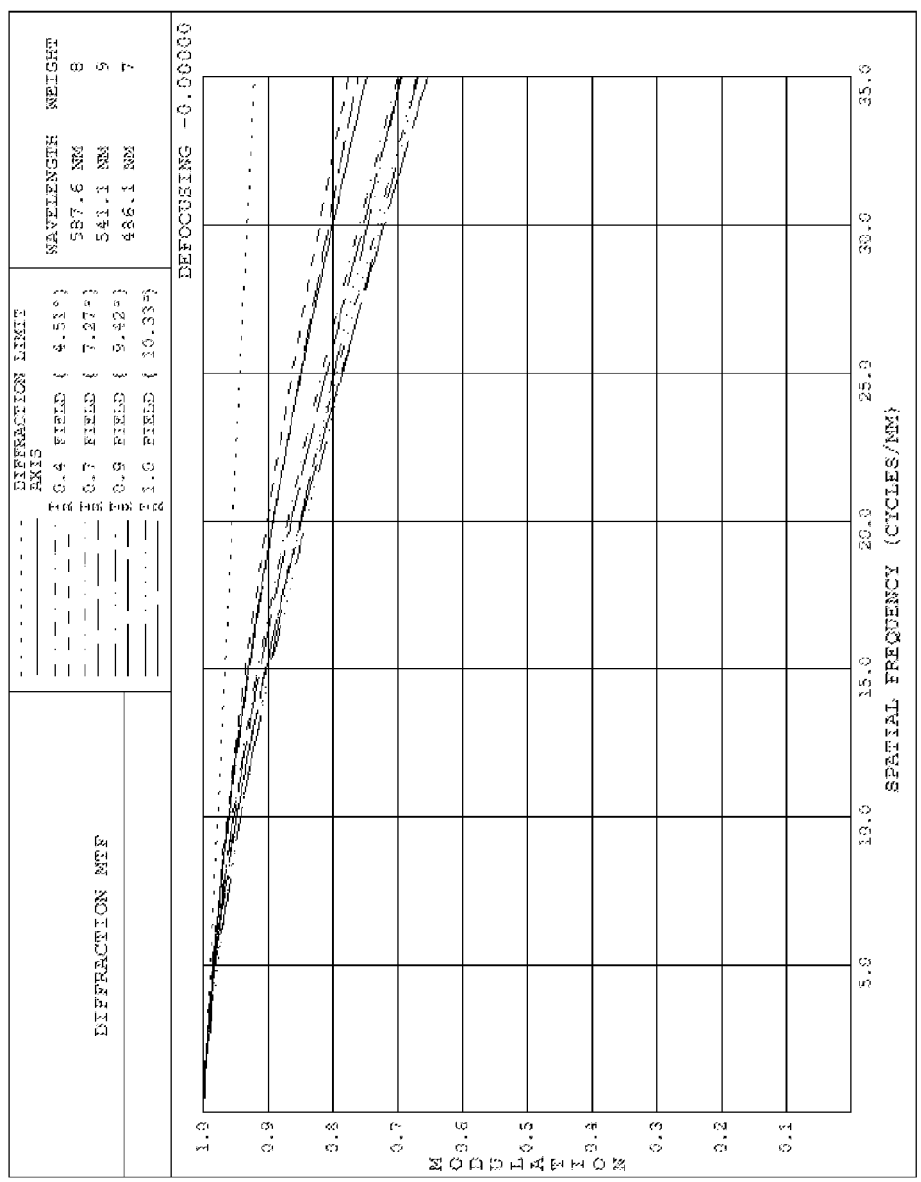

FIG. 16 is a lens diagram of the fourth lens group G4 at a focal length of 39.86 mm at the far focus distance.

FIGS. 17 through 25 are MTF plots of embodiment 2 of zoom lens 10 through zoom at focal lengths of 16.35, 39.86 and 84.04 mm at far, intermediate and close focus distances, with five fields shown from zero to full field in all of the MTF plots. The MTF plots show good performance for embodiment 2 of zoom lens 10 over the full field and for the range of focal lengths and focus distances. In particular, FIGS. 17 through 25, the MTF performance for the first embodiment is shown to be greater than 50% at all field positions and greater than about 70% for all axial field positions at a spatial frequency of 35 cycles/mm.

Embodiment 2 of zoom lens 10 also has the following exemplary properties:

Focal Length Range: 16.36 mm to 84.04 mm

Zoom Ratio: ×5.1

Full Aperture: f/3.3 (constant all zoom and all focus)

Close Focus Distance (Object to Image): 977.01 mm

Back Focal Length (along optical axis): 19.2 mm

Front Diameter: 101.21 mm

Overall Length (front vertex to image): 352.01 mm

Full Field Image Height: 15 mm

Focal Length of Lens Groups:

G1: −55.43 mm (at F1 infinity focus), −56.15 mm (at F2 intermediate focus) and −56.82 mm (at F3 close focus)

G2: 135.81 mm

G3: 234.36 mm

G4: 113.83 mm

G1a: −58.19 mm

G1b: −343.51 mm

G1c: 358.55 mm

Total Number of Lens Elements=23

Embodiment 3

Figure 26:
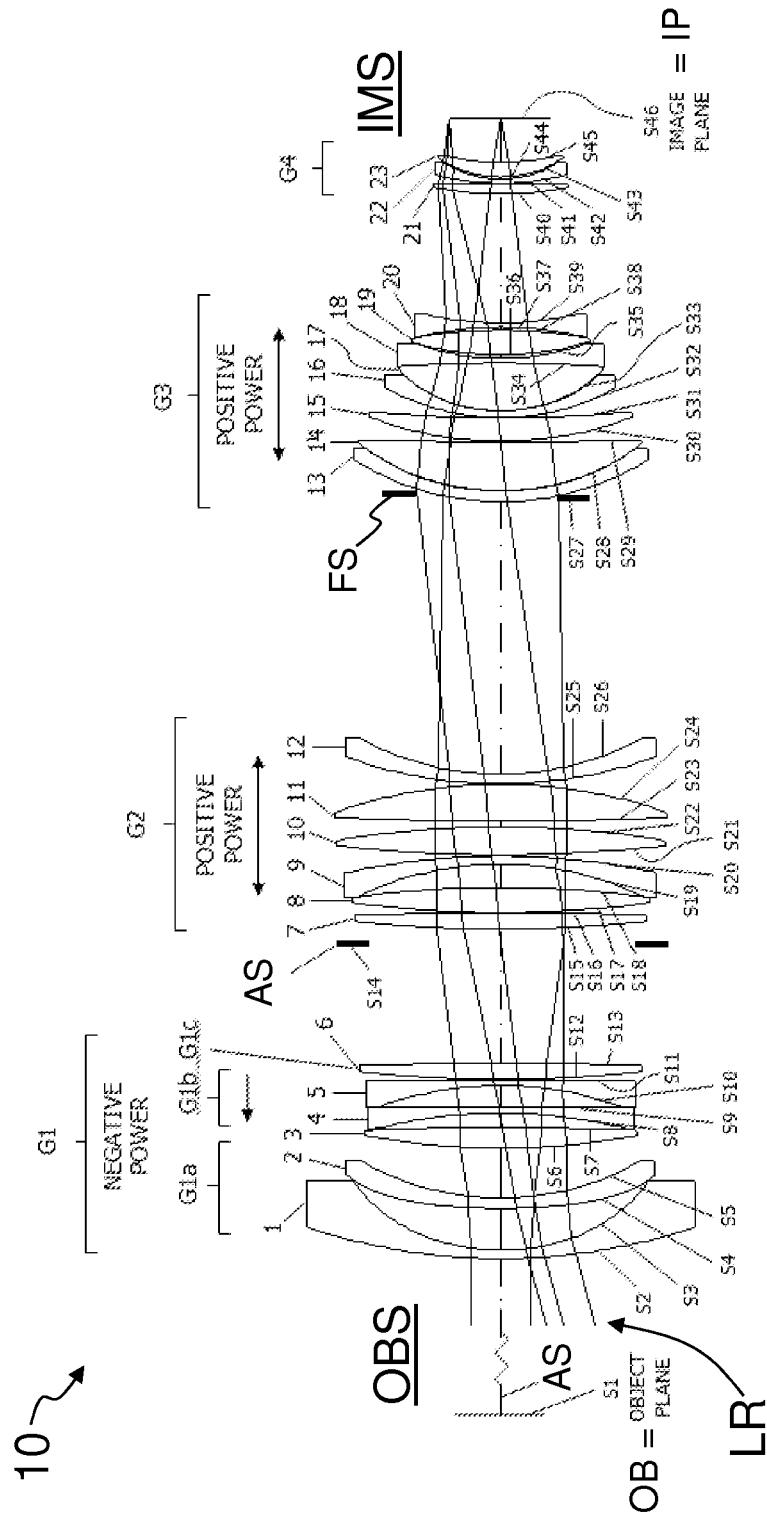
FIG. 26 is a lens diagram of a third main example embodiment of the zoom lens disclosed herein.

FIG. 26 is a lens diagram of a third main example embodiment ("embodiment 3"). FIG. 26 includes annotation for lenses 1 through 23 and surfaces S1 through S46 to match the Optical Prescription Tables set forth below. The focal length is 68.86 mm at a far focus distance. Axial movement is indicated in FIG. 26 by the straight single-ended and double-ended arrows.

The first lens group G1 of this second embodiment includes, from objectwise to imagewise, first lens sub-group G1a, second lens sub-group G1b and third lens sub-group G1c. First lens sub-group G1a includes lens elements 1 and 2. Second lens sub-group G1b includes lens elements 3, 4 and 5, and is shown as being axially movable for focusing. Third lens sub-group G1c includes lens element 6. Second lens group G2 includes lens elements 7 through 12. Third lens group G3 includes lens elements 13 through 20. Fourth lens group G4 includes lens elements 21 through 23. Object plane OB is the same as surface S1 and image plane IM is the same as surface S46. Aperture stop AS is defined by surface S14.

FIG. 27A is a lens diagram of embodiment 3 of zoom lens 10 through zoom at focal lengths of 20.50, 68.86 and 194.02 mm (top to bottom) at far focus distance with five fields shown from zero to full field.

FIG. 27B is a lens diagram of embodiment 3 of zoom lens 10 through focus at far, intermediate and a close focus distances (top to bottom) and at a focal length 68.86 mm.

Figure 28:
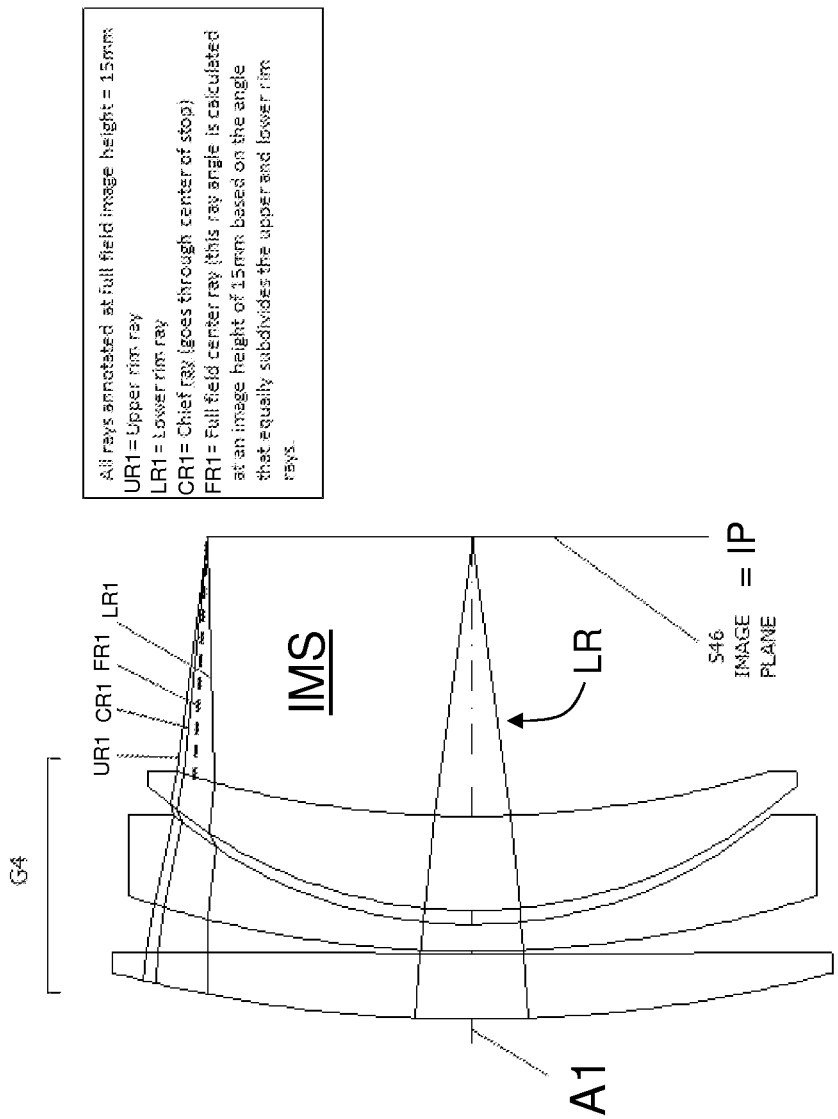
FIG. 28 is a lens diagram of the fourth lens group at a focal length 194.02 mm at the far focus distance.
Figure 29:
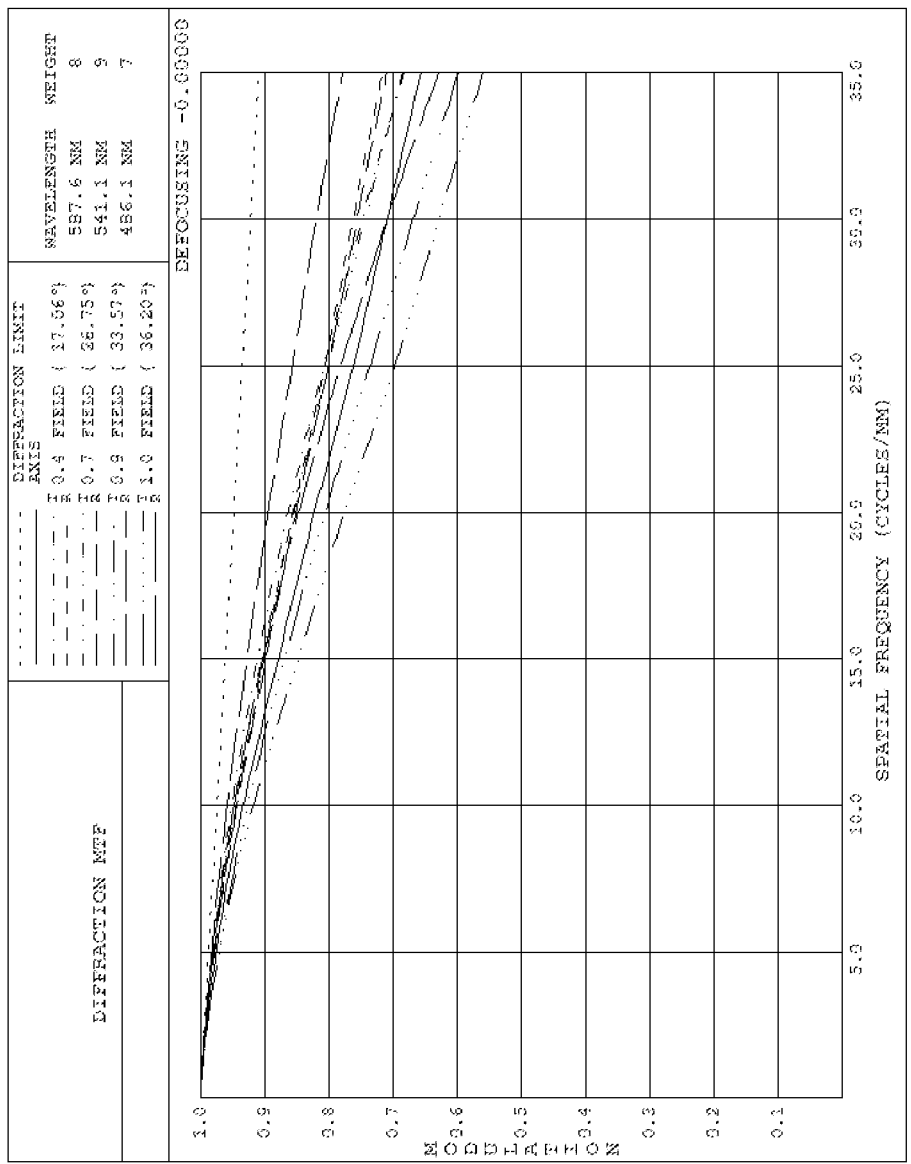
FIGS. 29 through 37 are MTF plots for the third main example embodiment.
Figure 30:
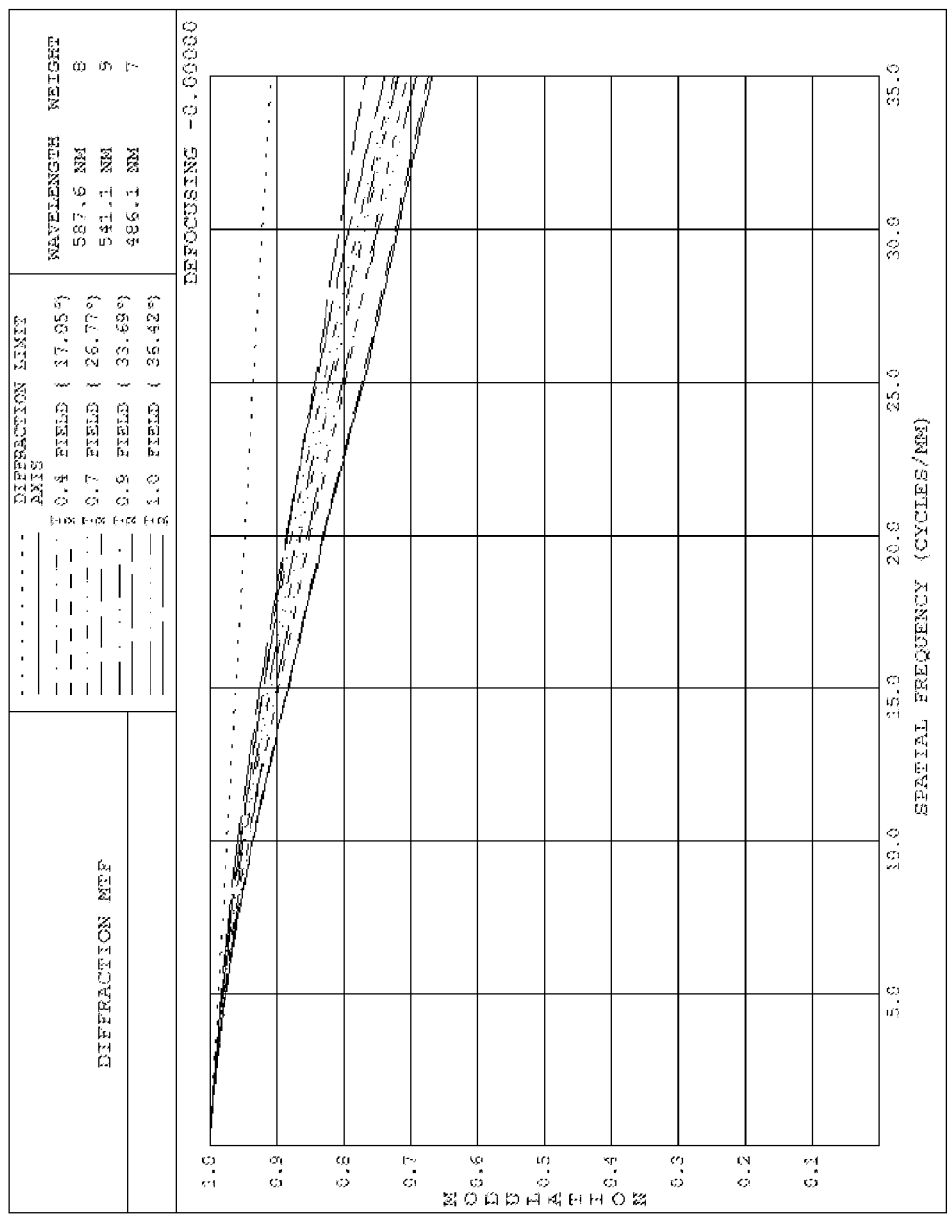
Figure 31:
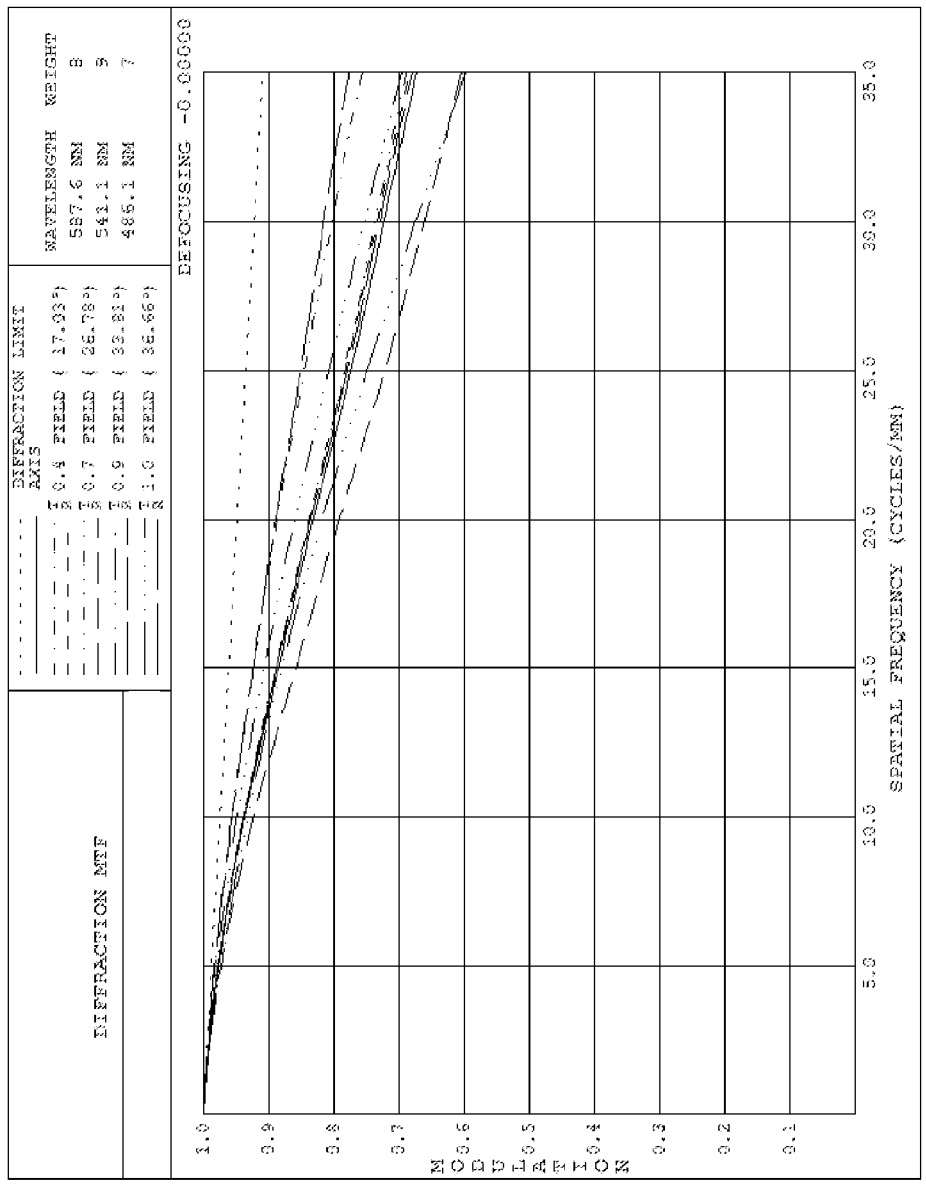
Figure 32:
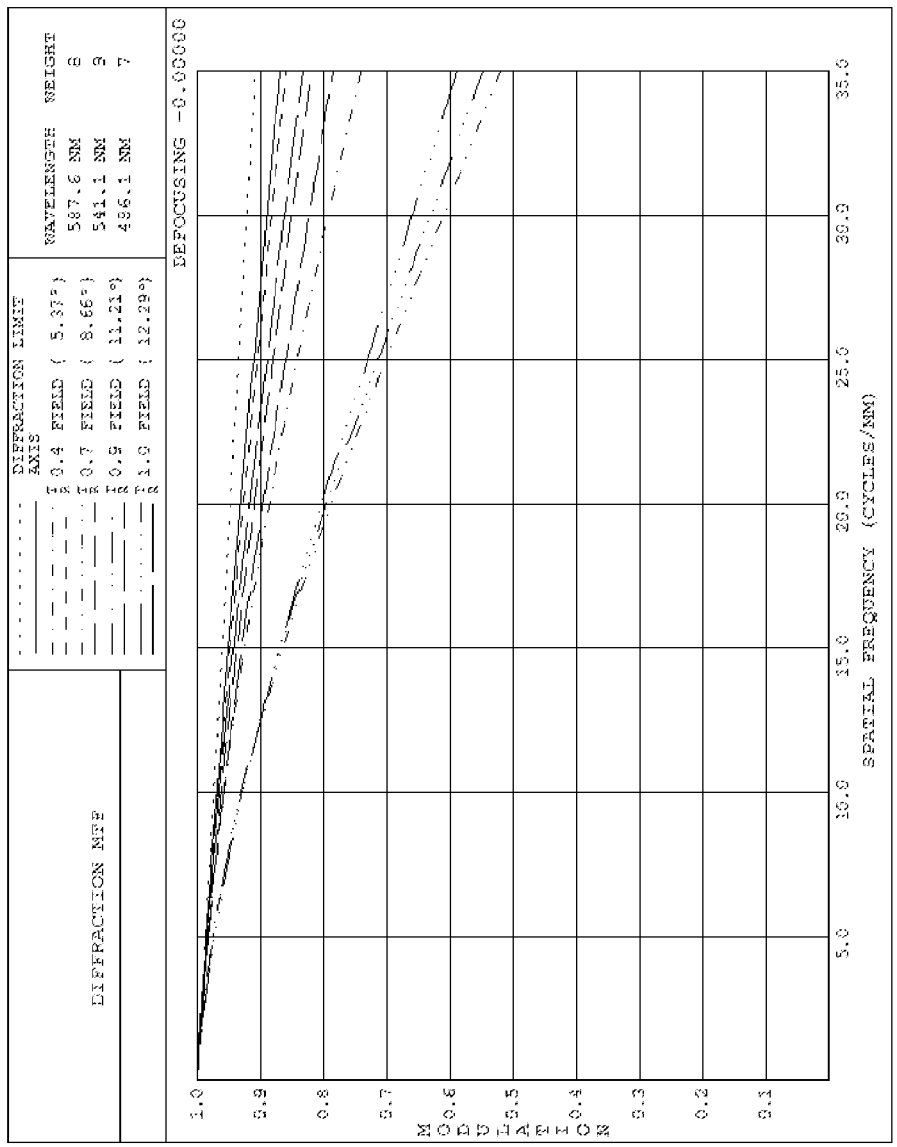
Figure 33:
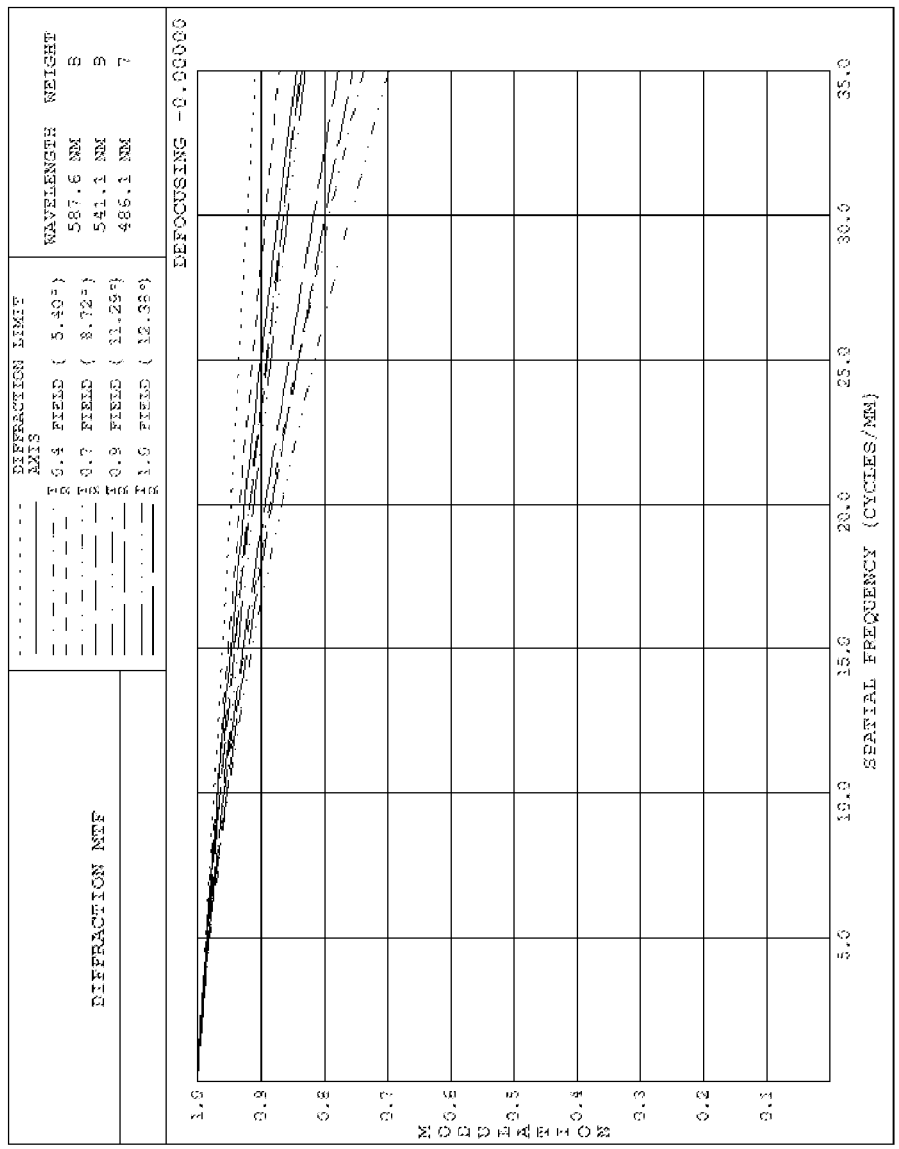
Figure 34:
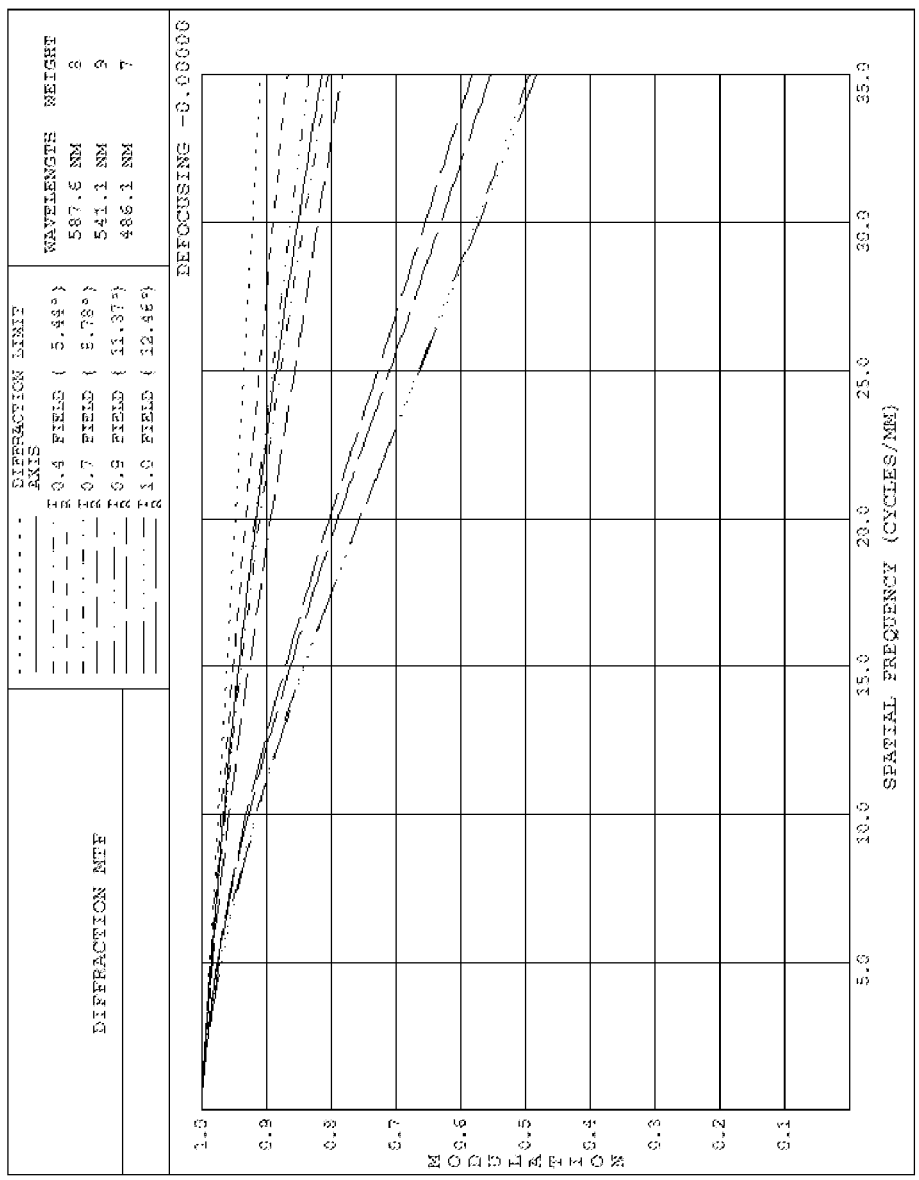
Figure 35:
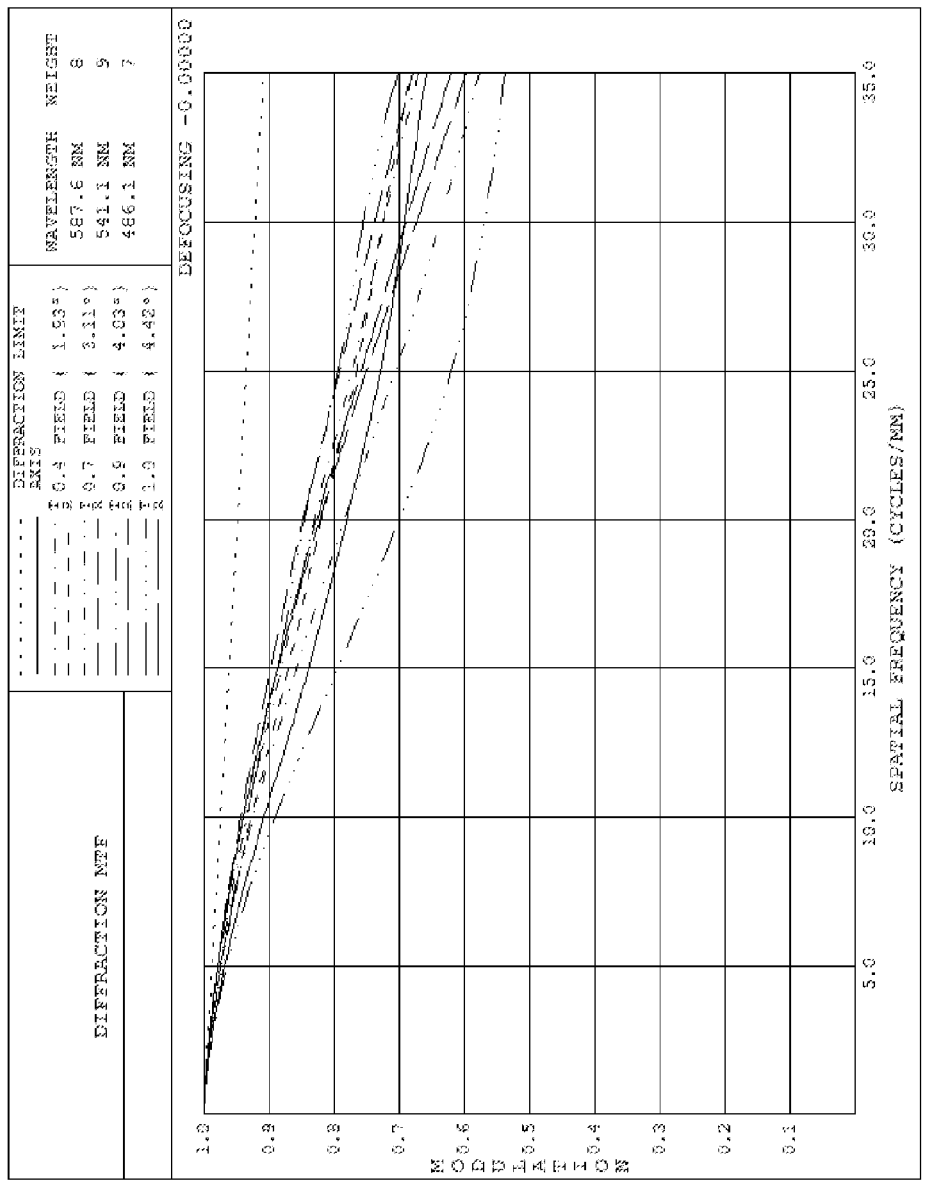
Figure 36:
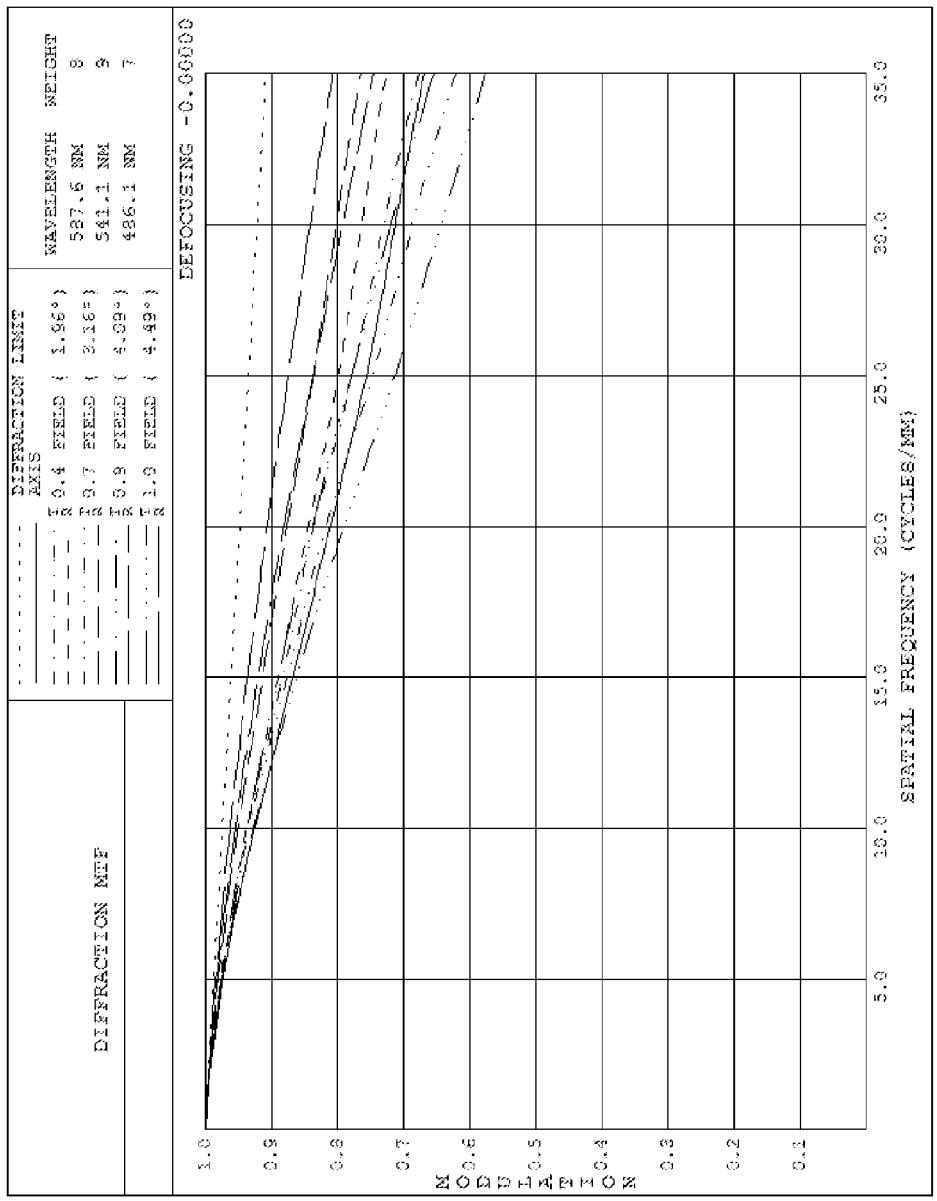
Figure 37:
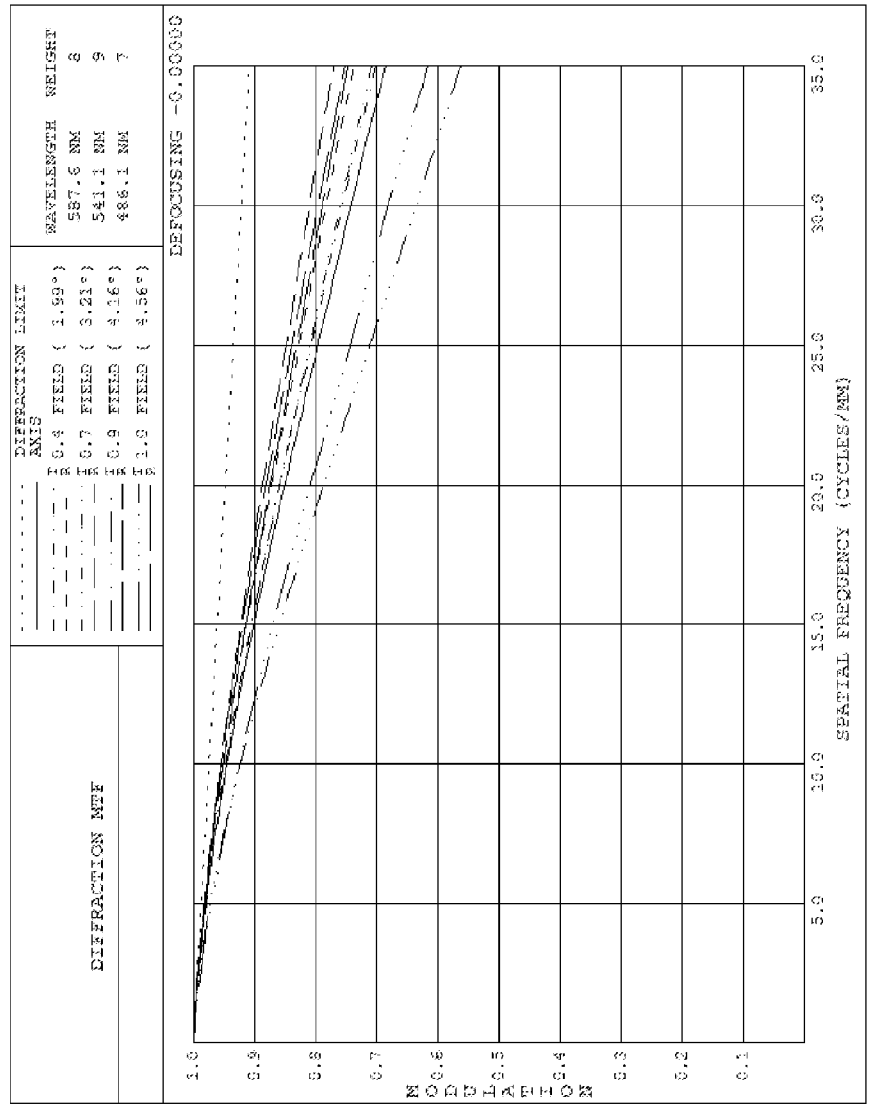

FIG. 28 is a lens diagram of the fourth lens group at a focal length 194.02 mm at the far focus distance.

FIGS. 29 through 37 are MTF plots of embodiment 3 of zoom lens 10 through zoom at focal lengths 20.50, 68.86 and 194.02 mm at far, intermediate and close focus distances with five fields shown from zero to full field, in all the MTF plots. The MTF plots show good performance for embodiment 3 of zoom lens 10 over the full field and for the range of focal lengths and focus distances. The MTF performance for the third embodiment is shown to be about 50% and greater at all field positions and greater than about 65% for all axial field positions at a spatial frequency of 35 cycles/mm.

Embodiment 3 of zoom lens 10 also has the following exemplary properties:

Focal Length Range: 20.50 mm to 194.02 mm

Zoom Ratio: ×9.5

Full Aperture: f/3.8 (constant all zoom and all focus)

Close Focus Distance (Object to Image): 1156.80 mm

Back Focal Length (along optical axis): 15.64 mm

Front Diameter: 110.00 mm

Overall Length (front vertex to image): 431.80 mm

Full Field Image Height: 15 mm

Focal Length of Lens Groups:

G1: −87.48 mm (at F1 infinity focus), −89.26 mm (at F2 intermediate focus) and −91.17 mm (at F3 close focus)

G2: +162.30 mm

G3: +241.03 mm

G4: +101.23 mm

G1a: −87.53 mm
G1b: −327.96 mm
G1c: 258.91 mm
Total No. Lens Elements: 23

Camera Embodiment

Figure 38:
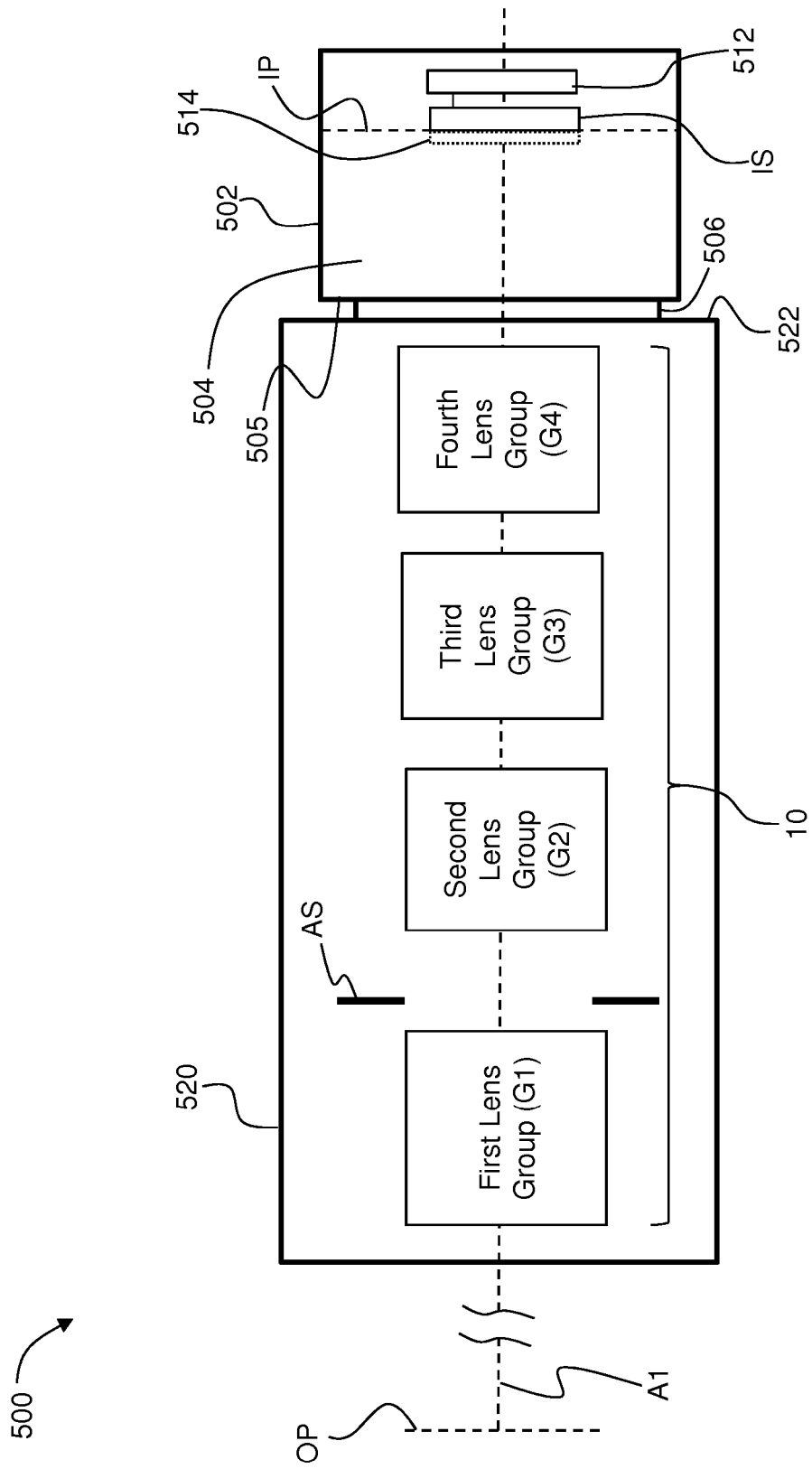
FIG. 38 is a schematic diagram of the zoom lens as part of a camera.

FIG. 38 is a schematic diagram of the zoom lens 10 as part of a camera 500. The camera 500 includes a camera housing 502 having interior 504 and a front side 505. Front side 505 includes a lens mounting fixture 506. Camera 500 operably supports within interior 504 an image sensor IS that is electrically connected to camera electronics 512. The camera electronics 512 are configured to receive and process the images captured by image sensor IS. Zoom lens 10 is operably supported in a lens barrel 520 having a back side 522. The lens barrel 520 is configured to operably support zoom lens 10 and is configured at back side 522 to mount to the camera housing 502 at lens mounting fixture 506. In an embodiment, the fourth lens group G4 can extend into the camera housing interior 504. Camera 500 can include an optional optical filter 514 arranged adjacent image sensor IS.

In all three main example embodiments, the MTF performance of zoom lens 10 is at a level suitable for use with electronic (image) sensors IS having around 4,000 pixels or more across the field of view, or as known by those skilled in the art, 4K image sensors.

Additional Aspects of the Zoom Lens

One or more variable aperture diameter field stops FS (see, e.g., FIG. 26), which vignette the radiation beams increasingly towards full field, may be employed in the zoom lens 10 disclosed herein. They may be preferably located toward the rear of the first zoom group or toward the front of the second zoom group and can be an integral part of the lens groups so that they travel along the optical axis A1 with the lens group(s). The purpose of the one or more field stops FS is to vignette the radiation beams, especially at larger field positions (i.e. towards larger image heights), thus improving the aberration correction and hence the MTF.

To avoid unacceptable losses of radiation and corresponding low relative illumination towards full field at short to medium focal lengths, the one or more field stops FS can open and close from the long to short focal length positions (configurations) during zooming, and inevitably would introduce greater mechanical complexity for the imaging performance improvement obtained.

Nevertheless, in very high-performance imaging applications, having one or more field stops FS may be worthwhile. For example, in embodiment 3 as shown in FIG. 26, field stop FS having a variable aperture diameter may be placed at surface 27 with apertures of 29.24, 29.10, 28.23, 24.82, 28.70 and 41.65 mm for focal length positions Z1 to Z6, respectively. This increases the vignetting, particularly at short to medium focal length positions, thus improving the overall MTF performance particularly towards the full field of view, while not adversely affecting the relative illumination at all focal length positions.

The benefit of having a relatively compact-diameter front optics and corresponding potential minimized weight and cost by having a forward-located aperture stop AS increases for lenses for use with larger-size sensors. For example, the size of the image sensor that the three example embodiments set forth herein cover have a diagonal (or image circle size) of 30 mm, which is 2× the image height of 15 mm. For cameras 500 with a still format image sensor size of 24 mm×30 mm and with a diagonal or image circle size of about 43.3 mm, the compact diameter, minimized weight and lower cost may even be more important.

Optical Prescription Tables

Optical prescription Tables 1 through 6 are set forth below and describe select examples embodiments of zoom lens 10 disclosed herein.

Tables 1, 3 and 5 respectively set forth the optical prescriptions for the first, second and third main example embodiments (i.e., embodiments 1, 2 and 3) of the zoom lens 10 as described above.

The Focal lengths (field angle based at about infinity focus distance) for Table 1 are:

Z1=16.27 mm

Z2=28.36 mm

Z3=49.65 mm

The Focal lengths (field angle based at about infinity focus distance) for Table 3 are:

Z1=16.35 mm

Z2=27.50 mm

Z3=39.86 mm

Z4=68.90 mm

Z5=84.04 mm

The Focal lengths (field angle based at about infinity focus distance) for Table 5 are:

Z1=20.50 mm

Z2=27.36 mm

Z3=39.99 mm

Z4=68.86 mm

Z5=122.55 mm

Z6=194.02 mm

Tables 2, 4 and 6 each contain distortion, relative illumination, breathing and full-field beam angle at the image plane IP for the first, second and third main example embodiments (embodiments 1, 2 and 3), respectively.

In Tables 2, 4 and 6, it is shown that the relative illumination is above 50%, which is sufficiently high for low shading across the field of view when the zoom lens is used in combination with an electronic (image) sensor at the image plane IP, such as when the zoom lens constitutes part of a digital camera. Also, the breathing at the various zoom positions is low and does not vary substantially over the zoom ranges. This is advantageous when focusing at objects within a scene at different distances because it keeps them substantially stationary in the scene and more natural-looking to the viewer.

In addition, the full field ray angle at the image plane IP is close to zero at any one zoom position so that there is substantially telecentric radiation output, and does not vary much through zoom. This may permit the image sensor to perform at optimum optical efficiency. Furthermore, the distortion is shown to be relatively low.

In embodiments 1, 2 and 3 of zoom lens 10, the axial position of the aperture stop AS can be adjusted to alternate positions to form a smoother locus of the curve of focal length versus aperture stop position. This may simplify the construction of a cam follower mechanism. These adjustments are most likely to happen at intermediate focal length positions. When these adjustments are made, it is important that the amount of field illumination should not be adversely affected. Consequently, the adjustments may require re-optimization of the optical design to increase the MTF performance using means that are known to those skilled in the art.

Tables 1-6 are set forth below beginning on the next page.

TABLE 1

| | | | | | | Separation | Radius of Curvature[1] | Material[2] | | | Aperture Half Diameter |
|---|---|---|---|---|---|---|---|---|---|---|---|
| Item | Group | Sub Group | Surface | Focus Position | Zoom Position | (mm) | (mm) | Type | Code | Name | (mm) |
| Object Plane | | | S1 | F1 | All | 735017.640 | Flat | Air | | | |
| | | | | F2 | All | 900.375 | | Air | | | |
| | | | | F3 | All | 459.375 | | Air | | | |
| 1 | G1 | G1a | S2 | All | All | 2.500 | 59.997 | Glass | 497816 | SFPL51 | 41.60 |
| | | | S3 | All | All | 11.425 | 30.758 | Air | | | 30.42 |
| 2 | G1 | G1a | S4 | All | All | 2.940 | 56.874 | Glass | 497816 | SFPL51 | 30.36 |
| | | | S5 | F1 | All | 15.154 | 34.810 | Air | | | 28.44 |
| | | | | F2 | All | 12.515 | | | | | |
| | | | | F3 | All | 10.147 | | | | | |
| 3 | G1 | G1b | S6 | All | All | 1.950 | 107.284 | Glass | 439950 | SFPL53 | 27.42 |
| | | | S7 | All | All | 14.200 | 57.520 | Air | | | 25.52 |
| 4 | G1 | G1b | S8 | All | All | 1.800 | −51.913 | Glass | 804466 | SLAH65 | 24.72 |
| | | | S9 | All | All | 0.100 | −95.439 | Air | | | 24.97 |
| 5 | G1 | G1b | S10 | All | All | 2.891 | 130.179 | Glass | 805254 | STIH6 | 24.27 |
| | | | S11 | F1 | All | 0.100 | 244.316 | Air | | | 24.00 |
| | | | | F2 | All | 2.741 | | | | | |
| | | | | F3 | All | 5.114 | | | | | |
| 6 | G1 | G1c | S12 | All | All | 1.800 | 115.699 | Glass | 439950 | SFPL53 | 22.77 |
| 7 | G1 | G1c | S13 | All | All | 4.159 | 50.686 | Glass | 640345 | STIM27 | 21.88 |
| | | | S14 | All | Z1 | 53.606 | 89.788 | Air | | | 21.46 |
| | | | | All | Z2 | 32.895 | | | | | |
| | | | | All | Z3 | 2.984 | | | | | |
| Stop | GS | | S15 | All | Z1 | 29.576 | Flat | Air | | | 17.95 |
| | | | | All | Z2 | 0.100 | | | | | 14.57 |
| | | | | All | Z3 | 0.100 | | | | | 10.10 |
| 8 | G2 | | S16 | All | All | 4.042 | 68.437 | Glass | 801350 | SLAM 66 | 18.60 |
| | | | S17 | All | All | 0.100 | 518.001 | Air | | | 18.60 |
| 9 | G2 | | S18 | All | All | 7.717 | 63.766 | Glass | 743493 | SLAM 60 | 18.67 |
| | | | S19 | All | All | 0.578 | −56.176 | Air | | | 18.47 |
| 10 | G2 | | S20 | All | All | 1.800 | −51.519 | Glass | 883408 | SLAH58 | 18.26 |
| | | | S21 | All | All | 2.323 | −584.826 | Air | | | 17.97 |
| 11 | G2 | | S22 | All | All | 1.800 | −69.635 | Glass | 750353 | SNBH51 | 17.93 |
| | | | S23 | All | All | 10.779 | 49.638 | Air | | | 18.21 |
| 12 | G2 | | S24 | All | All | 1.800 | −27.248 | Glass | 722292 | STIH18 | 18.31 |
| | | | S25 | All | All | 0.100 | −30.458 | Air | | | 19.44 |
| 13 | G2 | | S26 | All | All | 13.733 | 110.407 | Glass | 439950 | SFPL53 | 23.99 |
| | | | S27 | All | All | 0.100 | −40.775 | Air | | | 24.62 |
| 14 | G2 | | S28 | All | All | 3.302 | −125.643 | Glass | 808228 | SNPH1 | 24.65 |
| | | | S29 | All | All | 0.100 | −80.030 | Air | | | 24.81 |
| 15 | G2 | | S30 | All | All | 1.800 | 74.657 | Glass | 613443 | SNBM51 | 24.01 |
| | | | S31 | All | Z1 | 1.073 | 45.059 | Air | | | 23.20 |
| | | | | All | Z2 | 23.315 | | | | | |
| | | | | All | Z3 | 4.356 | | | | | |
| 16 | G3 | | S32 | All | All | 14.472 | 51.429 | Glass | 439950 | SFPL53 | 23.40 |
| | | | S33 | All | All | 0.585 | −42.734 | Air | | | 23.16 |
| 17 | G3 | | S34 | All | All | 1.800 | −40.546 | Glass | 883408 | SLAH58 | 22.99 |
| | | | S35 | All | All | 0.100 | −44.759 | Air | | | 23.21 |
| 18 | G3 | | S36 | All | All | 2.436 | −52.020 | Glass | 785257 | STIH11 | 22.54 |
| 19 | G3 | | S37 | All | All | 1.800 | −47.111 | Glass | 883408 | SLAH58 | 22.54 |
| | | | S38 | All | Z1 | 0.100 | −105.683 | Air | | | 22.70 |
| | | | | All | Z2 | 28.035 | | | | | |
| | | | | All | Z3 | 76.904 | | | | | |
| 20 | G4 | | S39 | All | All | 5.321 | 216.306 | Glass | 439950 | SFPL53 | 22.32 |
| | | | S40 | All | All | 0.100 | −100.490 | Air | | | 22.21 |

TABLE 1-continued

Optical Prescription

| Item | Sub Group | Group | Surface | Focus Position | Zoom Position | Separation (mm) | Radius of Curvature[1] (mm) | Material[2] Type | Code | Name | Aperture Half Diameter (mm) |
|---|---|---|---|---|---|---|---|---|---|---|---|
| 21 | G4 | | S41 | All | All | 4.947 | 65.608 | Glass | 497816 | SFPL51 | 20.97 |
|  |  |  | S42 | All | All | 1.702 | 876.624 | Air |  |  | 20.54 |
| 22 | G4 | | S43 | All | All | 1.800 | −170.670 | Glass | 883408 | SLAH58 | 20.46 |
|  |  |  | S44 | All | All | 44.000 | 211.914 | Air |  |  | 19.97 |
| Image Plane |  |  | S45 | All | All | 0.000 | Flat |  |  |  |  |

Notes:-
[1]Surface profile of aspheric surface 4 is governed by the following conventional equation:

$$Z = \frac{CURV(R)^2}{1 + (1 - (1+K)(CURV)^2 R^2)^{1/2}} + (A)R^4 + (B)R^6 + (C)R^8 + (D)R^{10} + (E)R^{12}$$

where:
CURV = 1/(Radius of Curvature)
K, A, B = Coefficients
Z = Position of surface profile for a given Y value or measured along the optical axis from the pole (i.e. axial vertex) of the surface
R = Radial aperture height of surface measured from the X and Y axis, where:
$R = (X^2 + Y^2)^{1/2}$
The coefficients for the surface S4 are:
$K = 2.3490, A = 1.3692 \times 10^{-06}, B = 2.1971 \times 10^{-11}, C = 1.3192 \times 10^{-12}, D = -2.2042 \times 10^{-15}, E = 1.6668 \times 10^{-18}$
[2]The glasses listed are available from Ohara Corporation.

TABLE 2

Distortion, Relative Illumination, Breathing and Image Full Field Ray Angle

| Zoom Position | Focal Length[1] (mm) | Distortion[2] (%) | Relative Illumination[2] (%) | Breathing[2,3] (%) | Full Field Ray Angle at Image[4] (degrees) |
|---|---|---|---|---|---|
| Z1 | 15.81 | −1.3 | 54 | −1.91 | 0.1 |
| Z2 | 28.36 | −3.9 | 78.2 | −1.3 | 1.0 |
| Z3 | 49.65 | −5.3 | 76.6 | −2.47 | 2.7 |

Notes:-
[1]Paraxial focal length is given at focus position F1.
[2]At full field image height of 15 mm.
[3]Breathing calculated as follows:

$$100 \times \frac{\text{(full field ray angle at F1 focus position)} - \text{(full field ray angle at F3 focus position)}}{\text{(full field ray angle at F1 focus position)}}$$

where: the full field ray angle is measured in degrees in object space.
[4]The full field ray angle is calculated at an image height of 15 mm based on the angle that equally subdivides the upper and lower rim ray angles for the full field beam.

TABLE 3

Optical Prescription

| Item | Sub Group | Group | Surface | Focus Position | Zoom Position | Separation (mm) | Radius of Curvature[1] (mm) | Material[2] Type | Code | Name | Aperture Half Diameter (mm) |
|---|---|---|---|---|---|---|---|---|---|---|---|
| Object Plane |  |  | S1 | F1 | All | 1000024.000 | Flat | Air |  |  |  |
|  |  |  |  | F2 | All | 1225.000 |  | Air |  |  |  |
|  |  |  |  | F3 | All | 625.000 |  | Air |  |  |  |
| 1 | G1 | G1a | S2 | All | All | 3.500 | 114.210 | Glass | 497816 | SFPL51 | 50.60 |
|  |  |  | S3 | All | All | 18.547 | 40.321 | Air |  |  | 37.55 |
| 2 | G1 | G1a | S4 | All | All | 3.800 | 131.464 | Glass | 678553 | SLAL12 | 36.93 |
|  |  |  | S5 | F1 | All | 25.195 | 51.119 | Air |  |  | 33.36 |
|  |  |  |  | F2 | All | 21.723 |  |  |  |  |  |
|  |  |  |  | F3 | All | 18.548 |  |  |  |  |  |
| 3 | G1 | G1b | S6 | All | All | 4.606 | 365.656 | Glass | 834372 | SLAH60 | 30.03 |
|  |  |  | S7 | All | All | 3.548 | −321.040 | Air |  |  | 29.62 |
| 4 | G1 | G1b | S8 | All | All | 2.000 | −95.552 | Glass | 497816 | SFPL51 | 29.49 |
|  |  |  | S9 | All | All | 4.006 | −211.469 | Air |  |  | 28.65 |
| 5 | G1 | G1b | S10 | All | All | 2.000 | −74.354 | Glass | 497816 | SFPL51 | 28.56 |
|  |  |  | S11 | F1 | All | 0.400 | −328.315 | Air |  |  | 28.09 |
|  |  |  |  | F2 | All | 3.871 |  |  |  |  |  |
|  |  |  |  | F3 | All | 7.048 |  |  |  |  |  |

TABLE 3-continued

| | | | | | | Radius of | | | | Aperture |
| | | Sub | Focus | Zoom | Separation | Curvature[1] | Material[2] | | | Half Diameter |
| Item | Group | Group | Surface | Position | Position | (mm) | (mm) | Type | Code | Name | (mm) |
|---|---|---|---|---|---|---|---|---|---|---|---|
| 6 | G1 | G1c | S12 | All | All | 3.242 | 166.209 | Glass | 801350 | SLAM66 | 26.51 |
| | | | S13 | All | Z1 | 78.962 | 387.045 | Air | | | 26.20 |
| | | | | All | Z2 | 54.845 | | | | | |
| | | | | All | Z3 | 35.436 | | | | | |
| | | | | All | Z4 | 6.924 | | | | | |
| | | | | All | Z5 | 1.002 | | | | | |
| Stop | GS | | S14 | All | Z1 | 53.173 | Flat | Air | | | 8.24 |
| | | | | All | Z2 | 18.680 | | | | | 11.83 |
| | | | | All | Z3 | 5.412 | | | | | 14.81 |
| | | | | All | Z4 | 1.477 | | | | | 20.11 |
| | | | | All | Z5 | 0.300 | | | | | 23.34 |
| 7 | G2 | | S15 | All | All | 4.695 | 198.189 | Glass | 805254 | STIH6 | 23.82 |
| | | | S16 | All | All | 0.100 | −231.674 | Air | | | 23.99 |
| 8 | G2 | | S17 | All | All | 5.322 | 115.207 | Glass | 439950 | SFPL53 | 24.29 |
| | | | S18 | All | All | 4.623 | −429.032 | Air | | | 24.27 |
| 9 | G2 | | S19 | All | All | 2.000 | −61.465 | Glass | 720347 | SNBH8 | 24.25 |
| | | | S20 | All | All | 15.080 | 314.693 | Air | | | 25.47 |
| 10 | G2 | | S21 | All | All | 12.521 | −534.420 | Glass | 439950 | SFPL53 | 29.95 |
| | | | S22 | All | All | 0.100 | −53.495 | Air | | | 30.83 |
| 11 | G2 | | S23 | All | All | 6.169 | 260.083 | Glass | 439950 | SFPL53 | 31.59 |
| | | | S24 | All | All | 0.100 | −248.299 | Air | | | 31.61 |
| 12 | G2 | | S25 | All | All | 2.000 | 88.052 | Glass | 722292 | STIH18 | 31.24 |
| | | | S26 | All | Z1 | 0.100 | 66.359 | Air | | | 30.56 |
| | | | | All | Z2 | 45.183 | | | | | |
| | | | | All | Z3 | 52.265 | | | | | |
| | | | | All | Z4 | 21.930 | | | | | |
| | | | | All | Z5 | 0.300 | | | | | |
| 13 | G3 | | S27 | All | All | 12.283 | 60.465 | Glass | 497816 | SFPL51 | 30.62 |
| | | | S28 | All | All | 0.100 | −363.423 | Air | | | 30.20 |
| 14 | G3 | | S29 | All | All | 3.666 | 43.575 | Glass | 804466 | SLAH65 | 27.16 |
| 15 | G3 | | S30 | All | All | 16.764 | 31.881 | Glass | 439950 | SFPL53 | 24.46 |
| 16 | G3 | | S31 | All | All | 2.013 | −153.424 | Glass | 804466 | SLAH65 | 23.26 |
| | | | S32 | All | All | 4.350 | 48.070 | Air | | | 21.26 |
| 17 | G3 | | S33 | All | All | 5.085 | 248.403 | Glass | 439950 | SFPL53 | 21.26 |
| 18 | G3 | | S34 | All | All | 10.610 | −132.871 | Glass | 808228 | SNPH1 | 21.15 |
| 19 | G3 | | S35 | All | All | 2.000 | −40.061 | Glass | 883408 | SLAH58 | 21.14 |
| | | | S36 | All | Z1 | 2.626 | −248.769 | Air | | | 21.30 |
| | | | | All | Z2 | 16.147 | | | | | |
| | | | | All | Z3 | 41.745 | | | | | |
| | | | | All | Z4 | 104.523 | | | | | |
| | | | | All | Z5 | 133.256 | | | | | |
| 20 | G4 | | S37 | All | All | 4.488 | 64.563 | Glass | 883408 | SLAH58 | 20.94 |
| | | | S38 | All | All | 0.100 | 206.232 | Air | | | 20.58 |
| 21 | G4 | | S39 | All | All | 2.000 | 60.810 | Glass | 805254 | STIH6 | 19.98 |
| | | | S40 | All | All | 0.865 | 28.715 | Air | | | 18.43 |
| 22 | G4 | | S41 | All | All | 8.066 | 30.384 | Glass | 678507 | SLAL56 | 18.49 |
| 23 | G4 | | S42 | All | All | 2.000 | 628.604 | Glass | 805254 | STIH6 | 18.02 |
| | | | S43 | All | All | 19.200 | 81.345 | Air | | | 17.25 |
| Image Plane | | | S44 | All | All | 0.000 | Flat | | | | |

Notes:-
[1]Surface profile of aspheric surface 4 is governed by the following conventional equation:

$$Z = \frac{CURV(R)^2}{1 + (1 - (1+K)(CURV)^2 R^2)^{1/2}} + (A)R^4 + (B)R^6 + (C)R^8 + (D)R^{10} + (E)R^{12}$$

where:
CURV = 1/(Radius of Curvature)
K, A, B = Coefficients
Z = Position of surface profile for a given Y value or measured along the optical axis from the pole (i.e. axial vertex) of the surface
R = Radial aperture height of surface measured from the X and Y axis, where:
$R = (X^2 + Y^2)^{1/2}$
The coefficients for the surface S4 are:
K = 9.0975, A = 9.3268 × $10^{-07}$, B = 2.4461 × $10^{-10}$, C = −3.8249 × $10^{-13}$, D = 2.7842 × $10^{-16}$, E = −6.0253 × $10^{-20}$
[2]The glasses listed are available from Ohara Corporation.

TABLE 4

Distortion, Relative Illumination, Breathing and Image Full Field Ray Angle

| Zoom Position | Focal Length[1] (mm) | Distortion[2] (%) | Relative Illumination[2] (%) | Breathing[2,3] (%) | Full Field Ray Angle at Image[4] (degrees) |
|---|---|---|---|---|---|
| Z1 | 16.36 | −3.3 | 52.5 | −1.1 | −2.7 |
| Z2 | 27.50 | −1.9 | 78.2 | −0.7 | −0.8 |
| Z3 | 39.86 | −0.4 | 79.1 | −0.5 | −0.7 |
| Z4 | 68.90 | 1.3 | 75.1 | −1.4 | −1.1 |
| Z5 | 84.04 | 1.7 | 73.7 | −1.8 | −1.1 |

Notes:-
[1]Paraxial focal length is given at focus position F1.
[2]At full field image height of 15 mm.
[3]Breathing calculated as follows:

$$100 \times \left( \frac{\text{(full field ray angle at F1 focus position)} - \text{(full field ray angle at F3 focus position)}}{\text{(full field ray angle at F1 focus position)}} \right)$$

where: the full field ray angle is measured in degrees in object space.
[4]The full field ray angle is calculated at an image height of 15 mm based on the angle that equally subdivides the upper and lower rim ray angles for the full field beam.

TABLE 5

Optical Prescription

| Item | Group | Sub Group | Surface | Focus Position | Zoom Position | Separation (mm) | Radius of Curvature[1] (mm) | Material[2] Type | Material[2] Code | Material[2] Name | Aperture Half Diameter (mm) |
|---|---|---|---|---|---|---|---|---|---|---|---|
| Object Plane | | | S1 | F1 | All | 1000024.000 | Flat | Air | | | |
| | | | | F2 | All | 1525.000 | | Air | | | |
| | | | | F3 | All | 725.000 | | Air | | | |
| 1 | G1 | G1a | S2 | All | All | 3.200 | 141.271 | Glass | 497816 | SFPL51 | 55.01 |
| | | | S3 | All | All | 15.872 | 49.375 | Air | | | 43.66 |
| 2 | G1 | G1a | S4 | All | All | 3.950 | 167.113 | Glass | 497816 | SFPL51 | 43.35 |
| | | | S5 | F1 | All | 18.692 | 67.138 | Air | | | 40.63 |
| | | | | F2 | All | 14.868 | | | | | |
| | | | | F3 | All | 10.872 | | | | | |
| 3 | G1 | G1b | S6 | All | All | 7.845 | 163.621 | Glass | 834372 | SLAH60 | 38.37 |
| | | | S7 | All | All | 5.543 | −947.303 | Air | | | 37.68 |
| 4 | G1 | G1b | S8 | All | All | 2.100 | −119.473 | Glass | 439950 | SFPL53 | 37.52 |
| | | | S9 | All | All | 8.388 | 2706.898 | Air | | | 35.46 |
| 5 | G1 | G1b | S10 | All | All | 2.100 | −83.025 | Glass | 497816 | SFPI51 | 35.37 |
| | | | S11 | F1 | All | 0.200 | −4002.075 | Air | | | 38.02 |
| | | | | F2 | All | 4.027 | | | | | |
| | | | | F3 | All | 8.025 | | | | | |
| 6 | G1 | G1c | S12 | All | All | 6.263 | 298.987 | Glass | 835427 | SLAH55 | 39.33 |
| | | | S13 | All | Z1 | 117.374 | −790.458 | Air | | | 39.74 |
| | | | | All | Z2 | 84.814 | | | | | |
| | | | | All | Z3 | 60.865 | | | | | |
| | | | | All | Z4 | 45.250 | | | | | |
| | | | | All | Z5 | 13.337 | | | | | |
| | | | | All | Z6 | 0.300 | | | | | |
| Stop | GS | | S14 | All | Z1 | 84.381 | Flat | Air | | | 7.94 |
| | | | | All | Z2 | 72.474 | | | | | 9.16 |
| | | | | All | Z3 | 47.396 | | | | | 11.65 |
| | | | | All | Z4 | 5.300 | | | | | 18.28 |
| | | | | All | Z5 | 0.300 | | | | | 26.82 |
| | | | | All | Z6 | 0.300 | | | | | 40.06 |
| 7 | G2 | | S15 | All | All | 6.097 | 309.285 | Glass | 883408 | SLAH58 | 40.95 |
| | | | S16 | All | All | 0.150 | −1049.365 | Air | | | 41.17 |
| 8 | G2 | | S17 | All | All | 9.547 | 252.067 | Glass | 439950 | SFPL53 | 41.72 |
| | | | S18 | All | All | 8.814 | −251.113 | Air | | | 41.81 |
| 9 | G2 | | S19 | All | All | 3.100 | −78.427 | Glass | 720347 | SNBH8 | 41.80 |
| | | | S20 | All | All | 0.502 | −168.124 | Air | | | 44.04 |
| 10 | G2 | | S21 | All | All | 10.571 | 352.055 | Glass | 439950 | SFPL53 | 46.08 |
| | | | S22 | All | All | 2.117 | −228.952 | Air | | | 46.38 |
| 11 | G2 | | S23 | All | All | 13.984 | 892.946 | Glass | 439950 | SFPL53 | 46.88 |
| | | | S24 | All | All | 0.150 | −117.170 | Air | | | 46.96 |
| 12 | G2 | | S25 | All | All | 3.700 | 106.239 | Glass | 801350 | SLAM66 | 43.84 |
| | | | S26 | All | Z1 | 0.200 | 70.245 | Air | | | 41.59 |
| | | | | All | Z2 | 43.657 | | | | | |
| | | | | All | Z3 | 83.482 | | | | | |
| | | | | All | Z4 | 103.146 | | | | | |
| | | | | All | Z5 | 65.783 | | | | | |
| | | | | All | Z6 | 0.200 | | | | | |
| 13 | G3 | | S27 | All | All | 4.100 | 66.378 | Glass | 805254 | STIH6 | 41.64 |
| 14 | G3 | | S28 | All | All | 18.653 | 57.154 | Glass | 497816 | SFPL51 | 39.87 |
| | | | S29 | All | All | 0.150 | 2474.036 | Air | | | 39.33 |
| 15 | G3 | | S30 | All | All | 8.881 | 85.662 | Glass | 439950 | SFPL53 | 36.91 |
| | | | S31 | All | All | 0.150 | 321.330 | Air | | | 36.02 |

TABLE 5-continued

Optical Prescription

| Item | Sub Group | Group | Focus Surface | Zoom Position | Position | Separation (mm) | Radius of Curvature[1] (mm) | Material[2] Type | Code | Name | Aperture Half Diameter (mm) |
|---|---|---|---|---|---|---|---|---|---|---|---|
| 16 | G3 | | S32 | All | All | 2.500 | 56.711 | Glass | 804466 | SLAH65 | 32.21 |
| 17 | G3 | | S33 | All | All | 18.042 | 36.779 | Glass | 439950 | SFPL53 | 28.70 |
| 18 | G3 | | S34 | All | All | 1.800 | −362.517 | Glass | 804466 | SLAH65 | 27.32 |
| | | | S35 | All | All | 1.371 | 59.017 | Air | | | 24.74 |
| 19 | G3 | | S36 | All | All | 9.289 | 72.836 | Glass | 805254 | STIH6 | 24.69 |
| | | | S37 | All | All | 1.178 | −115.253 | Air | | | 24.04 |
| 20 | G3 | | S38 | All | All | 1.600 | −83.454 | Glass | 883408 | SLAH58 | 23.80 |
| | | | S39 | All | Z1 | 0.487 | 76.691 | Air | | | 22.21 |
| | | | | All | Z2 | 1.486 | | | | | |
| | | | | All | Z3 | 10.697 | | | | | |
| | | | | All | Z4 | 48.741 | | | | | |
| | | | | All | Z5 | 123.017 | | | | | |
| | | | | All | Z6 | 201.634 | | | | | |
| 21 | G4 | | S40 | All | All | 3.920 | 76.622 | Glass | 805254 | STIH6 | 19.13 |
| | | | S41 | All | All | 0.150 | 1618.960 | Air | 762265 | STIH14 | 18.93 |
| 22 | G4 | | S42 | All | All | 1.600 | 59.937 | Glass | 804466 | SLAH65 | 18.28 |
| | | | S43 | All | All | 0.832 | 25.363 | Air | | | 16.96 |
| 23 | G4 | | S44 | All | All | 5.625 | 26.471 | Glass | | | 17.19 |
| | | | S45 | All | All | 16.635 | 54.716 | Air | | | 16.78 |
| Image Plane | | | S46 | All | All | 0.000 | Flat | | | | |

Notes:-
[1]Surface profile of aspheric surface 4 is governed by the following conventional equation:

$$Z = \frac{CURV(R)^2}{1+(1-(1+K)(CURV)^2 R^2)^{1/2}} + (A)R^4 + (B)R^6 + (C)R^8 + (D)R^{10} + (E)R^{12}$$

where:
CURV = 1/(Radius of Curvature)
K, A, B = Coefficients
Z = Position of surface profile for a given Y value or measured along the optical axis from the pole (i.e. axial vertex) of the surface
R = Radial aperture height of surface measured from the X and Y axis, where:
R = $(X^2 + Y^2)^{1/2}$
The coefficients for the surface S4 are:
K = −5.6613, A = 1.0395 × $10^{-06}$, B = 7.1523 × $10^{-11}$, C = 2.3939 × $10^{-13}$, D = −1.7708 × $10^{-16}$, E = 5.7213 × $10^{-20}$
[2]The glasses listed are available from Ohara Corporation.

TABLE 6

Distortion, Relative Illumination, Breathing and Image Full Field Ray Angle

| Zoom Position | Focal Length[1] (mm) | Distortion[2] (%) | Illumination[2] (%) | Relative Breathing[2,3] (%) | Full Field Ray Angle at Image[4] (degrees) |
|---|---|---|---|---|---|
| Z1 | 21.13 | −3.0 | 61.8 | −1.3 | −2.7 |
| Z2 | 28 | −2.3 | 62.7 | −0.1 | −2.6 |
| Z3 | 39.99 | −0.8 | 70.9 | −1.1 | −2.1 |
| Z4 | 68.01 | 1.2 | 73.6 | −1.4 | −1.9 |
| Z5 | 120.03 | 2.1 | 64.1 | −2.6 | −2.5 |
| Z6 | 189.72 | 2.3 | 57.2 | −3.2 | −2.9 |

Notes:-
[1]Paraxial focal length is given at focus position F1.
[2]At full field image height of 15 mm.
[3]Breathing calculated as follows:

$$100 \times \frac{\text{(full field ray angle at F1 focus position)} - \text{(full field ray angle at F3 focus position)}}{\text{(full field ray angle at F1 focus position)}}$$

where: the full field ray angle is measured in degrees in object space.
[4]The full field ray angle is calculated at an image height of 15 mm based on the angle that equally subdivides the upper and lower rim ray angles for the full field beam.

Although the present invention has been fully described in connection with embodiments thereof with reference to the accompanying drawings and tables, it is to be noted that various changes and modifications including smaller and larger zoom ranges, smaller and larger image sizes, smaller and larger wavebands, etc. (e.g., 435 nm to 656 nm) as will be apparent to those skilled in the art. Such changes and modifications are to be understood as being included within the scope of the present invention as defined by the appended claims.

What is claimed is:

1. A zoom lens consisting of along an optical axis and in order from an object space to an image space that includes an image plane:
   a first lens group having negative (−) power and that is non-zooming;
   an aperture stop;
   a second lens group having positive (+) power;
   a third lens group having positive (+) power;
   a fourth lens group that is non-zooming; and
   wherein only the second and third lens groups and the aperture stop are independently axially movable for zooming over a zoom range that includes short focal length zoom position, an intermediate focal length zoom position and a long focal length zoom position, wherein a spacing between the second and third lens groups is greatest at the intermediate focal length zoom position, and wherein the aperture stop has a clear aperture that varies during zooming to define a substantially constant full aperture f-number over the zoom range.

2. The zoom lens according to claim 1, wherein the fourth lens group has positive (+) power.

3. The zoom lens according to claim 1, wherein the positive power of the fourth lens group is less than the positive power of the second lens group and third lens group.

4. The zoom lens according to claim 1, wherein the fourth lens group has an optical power, wherein all of the lens groups have a magnitude of their optical power, and wherein the magnitude of the optical power of the fourth lens group is no more than half the magnitude of the optical power of the first, second or third lens groups.

5. A zoom lens according to claim 1, wherein the first lens group includes at least one aspherical optical surface.

6. The zoom lens according to claim 1, wherein the first group includes at least one axially movable lens element that provides focusing.

7. The zoom lens according to claim 6, wherein the zoom lens has a focus range and a focus breathing, and wherein the focus breathing varies over the zoom range and the focus range by no more than five percent.

8. A zoom lens according to claim 6, wherein the first lens group comprises at least one axially stationary lens sub-group and at least one axially movable lens sub-group, wherein the at least one axially movable lens sub-group provides said focusing.

9. A zoom lens according to claim 6, wherein the zoom lens has a field of view with a size, and wherein said focusing causes less than a 10% change in size of the field of view.

10. A zoom lens according to claim 9, wherein the zoom lens includes a plurality of zoom positions within the zoom range, and wherein at all of the zoom positions, the size of the field of view changes by no more than 10%.

11. A zoom lens system according to claim 1, wherein the zoom lens includes over the zoom range a plurality of zoom positions each having a plurality of full field ray angles, and wherein at all zoom positions the full field ray angle is less than +/−five degrees as measured relative to perpendicular to the image plane.

12. A zoom lens system according to claim 11, wherein the variation in full field ray angle subtending the upper and lower rim rays is less than +/−five degrees as measured relative to the perpendicular to the image plane between any of the plurality of zoom positions.

13. A zoom lens system according to claim 1, wherein the zoom lens has a full field relative illumination, and wherein the full field relative illumination is at least 40% throughout the zoom range.

14. A zoom lens system according to claim 1, wherein the zoom lens has a range of focus, and a full field relative illumination, and wherein the full field relative illumination is at least 50% throughout the zoom range and throughout a range of focus.

15. A zoom lens system according to claim 1, further comprising at least one variable-aperture field stop.

16. A zoom lens system according to claim 15, wherein the at least one variable-aperture field stop is located in either the second lens group or the third lens group.

17. The zoom lens system according to claim 1, wherein each of the second, third and fourth lens groups includes at least one lens element, and wherein the first lens group has a diameter that is no greater than twice a diameter of any lens element in the second, third or fourth lens group.

18. A camera system, comprising:
the zoom lens of claim 1;
a lens barrel having a back end, the lens barrel operably supporting the zoom lens;
a camera housing having an interior and a front end that supports a lens mounting fixture to which the back end of the lens barrel attaches;
an image sensor operably disposed within the camera housing interior and at the image plane of the zoom lens when the lens barrel is attached to the camera housing; and
camera electronics electrically connected to the image sensor.

19. A zoom lens consisting of along an optical axis and in order from an object space to an image space that includes an image plane:
a first lens group having negative (−) power and that is non-zooming, and that has at least one lens element that is axially movable for focusing;
an aperture stop;
a second lens group having positive (+) power;
a third lens group having positive (+) power;
a fourth lens group having positive (+) power and that is non-zooming;
wherein a magnitude of the positive power of the fourth lens group is less than a magnitude of the negative power of the first lens group and less than respective magnitudes of the positive powers of the second and third lens groups; and
wherein only the second and third lens groups and the aperture stop are independently axially movable for zooming over a zoom range that includes a short focal length zoom position, an intermediate focal length zoom position and a long focal length zoom position, wherein a spacing between the second and third lens groups is greatest at the intermediate focal length zoom position, and wherein the aperture stop has a clear aperture that varies during zooming to define a substantially constant full aperture f-number over the zoom range.

20. A camera system, comprising:
the zoom lens of claim 19;
a lens barrel having a back end, the lens barrel operably supporting the zoom lens;
a camera housing having an interior and a front end that supports a lens mounting fixture to which the back end of the lens barrel attaches;
an image sensor operably disposed within the camera housing interior and at the image plane of the zoom lens when the lens barrel is attached to the camera housing; and
camera electronics electrically connected to the image sensor.

* * * * *